(12) United States Patent
Miura et al.

(10) Patent No.: US 7,706,127 B2
(45) Date of Patent: Apr. 27, 2010

(54) CAPACITOR

(75) Inventors: Teruhisa Miura, Kyoto (JP); Hideki Shimamoto, Kyoto (JP); Motohiro Sakata, Osaka (JP); Shusaku Kawasaki, Osaka (JP); Kouji Ueoka, Nara (JP); Shinji Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 216 days.

(21) Appl. No.: 11/917,833

(22) PCT Filed: Jul. 26, 2006

(86) PCT No.: PCT/JP2006/314754

§ 371 (c)(1),
(2), (4) Date: Dec. 17, 2007

(87) PCT Pub. No.: WO2007/013500

PCT Pub. Date: Feb. 1, 2007

(65) Prior Publication Data

US 2009/0086411 A1  Apr. 2, 2009

(30) Foreign Application Priority Data

| Jul. 26, 2005 | (JP) | 2005-215345 |
| Jul. 26, 2005 | (JP) | 2005-215346 |
| Jul. 26, 2005 | (JP) | 2005-215347 |
| Jul. 26, 2005 | (JP) | 2005-215348 |
| Jul. 26, 2005 | (JP) | 2005-215349 |
| Jul. 26, 2005 | (JP) | 2005-215350 |

(51) Int. Cl.
*H01G 9/00* (2006.01)
*H01G 9/10* (2006.01)

(52) U.S. Cl. ............... 361/502; 361/519; 361/521

(58) Field of Classification Search .......... 361/502, 361/517–521

See application file for complete search history.

(56) References Cited

U.S. PATENT DOCUMENTS 4,007,405 A * 2/1977 Maijers et al. ............ 361/521

(Continued)

FOREIGN PATENT DOCUMENTS

JP 2004-134632 A 4/2004

(Continued)

OTHER PUBLICATIONS

International Search Report for PCT/JP2006/314754, dated Oct. 31, 2006.

*Primary Examiner*—Eric Thomas
(74) *Attorney, Agent, or Firm*—RatnerPrestia

(57) ABSTRACT

A capacitor includes a metal case and a terminal plate. The metal case accommodates a capacitor element together with a driving electrolyte and is joined to one of the electrodes of the capacitor element at its inner bottom surface. The terminal plate is joined to the other electrode at its inner surface so as to seal the opening of the metal case. The terminal plate is provided with a pressure regulating valve also functioning as a driving-electrolyte filling hole. The pressure regulating valve includes a ring-shaped elastic member which is pressed into the wall formed on the terminal plate.

52 Claims, 65 Drawing Sheets

U.S. PATENT DOCUMENTS

| | | | |
|---|---|---|---|
| 4,074,417 A * | 2/1978 | Pearce et al. | 29/25.03 |
| 4,131,935 A * | 12/1978 | Clement | 361/520 |
| 4,296,186 A * | 10/1981 | Wolf | 429/54 |
| 4,992,910 A * | 2/1991 | Evans | 361/502 |
| 6,310,756 B1 * | 10/2001 | Miura et al. | 361/301.3 |
| 6,493,212 B1 * | 12/2002 | Clarke et al. | 361/521 |
| 6,687,116 B2 * | 2/2004 | Hudis | 361/502 |

FOREIGN PATENT DOCUMENTS

| | | |
|---|---|---|
| JP | 2005-116955 A | 4/2005 |
| JP | 2005-123423 A | 5/2005 |
| JP | 2005-183754 A | 7/2005 |

\* cited by examiner

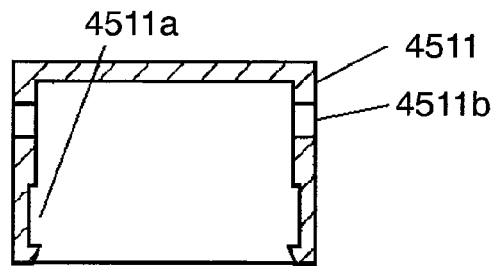
FIG. 4A
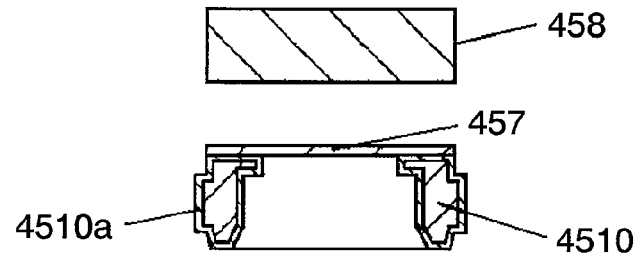
FIG. 4B
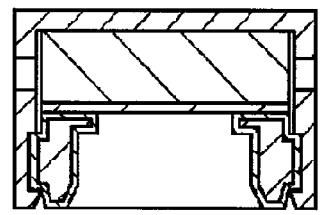
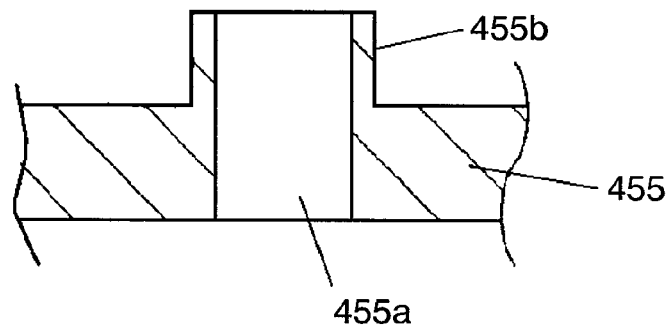
FIG. 4C
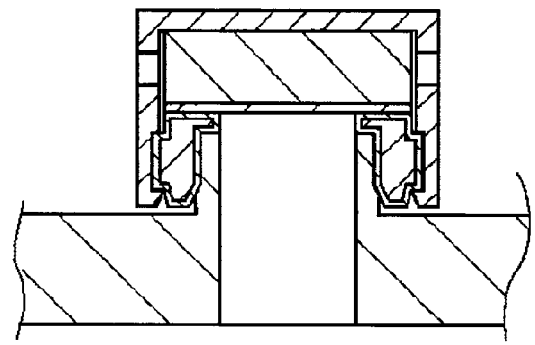

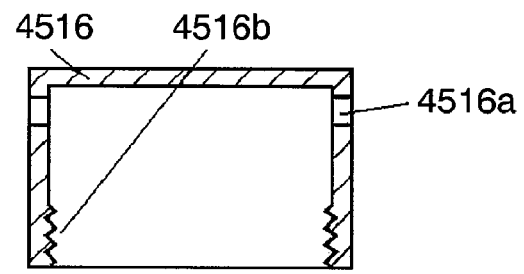
FIG. 6A
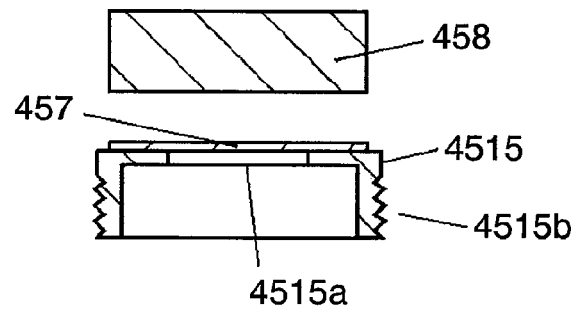
FIG. 6B
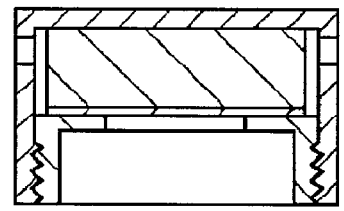
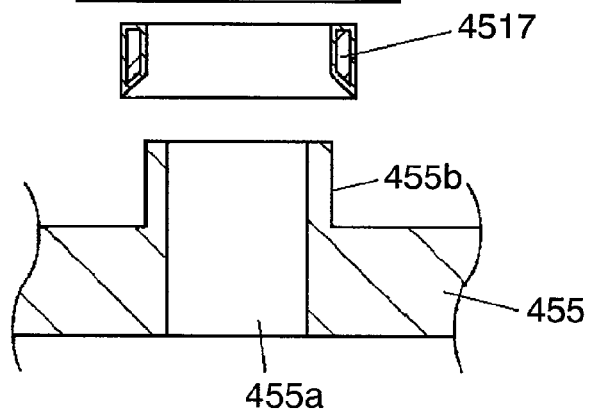
FIG. 6C
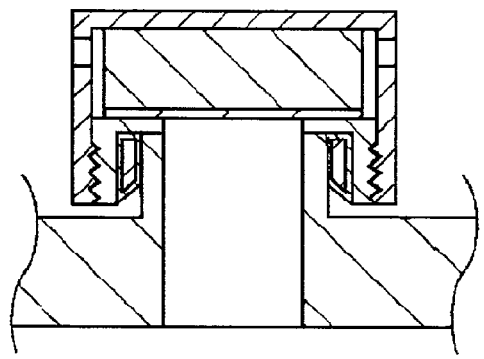

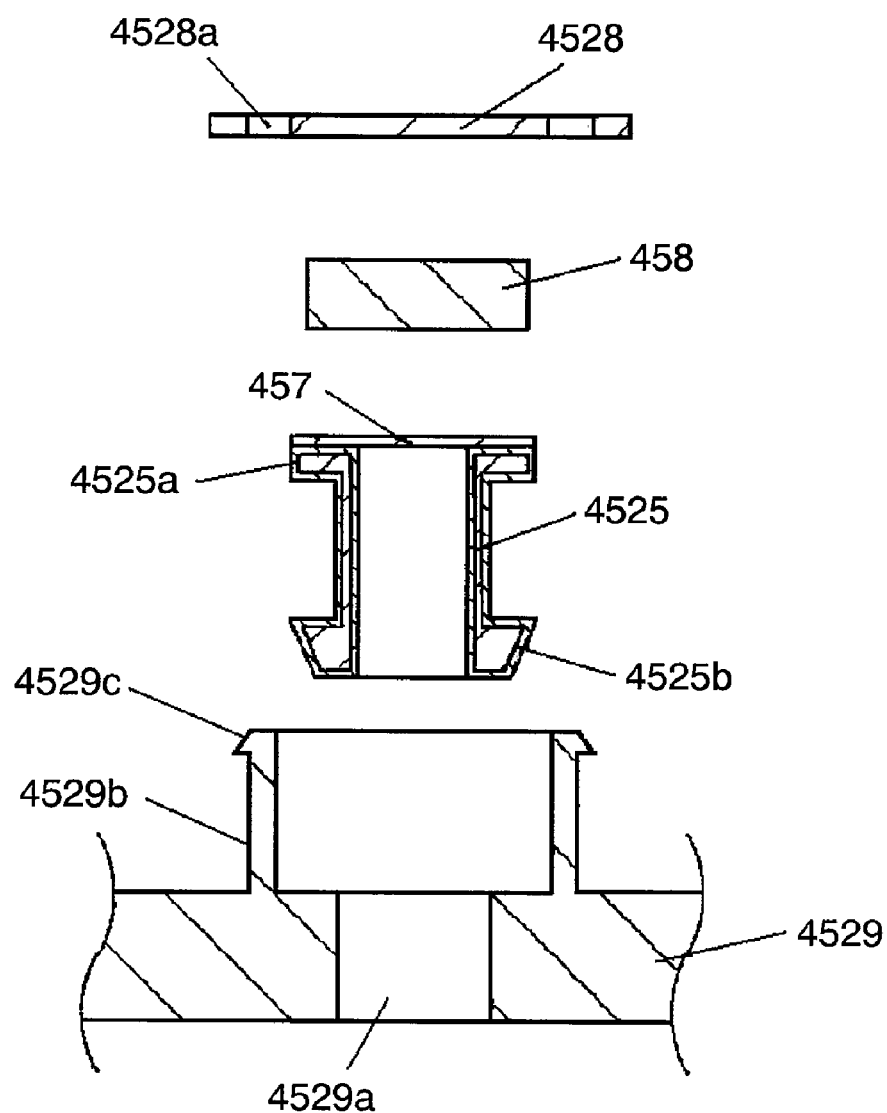
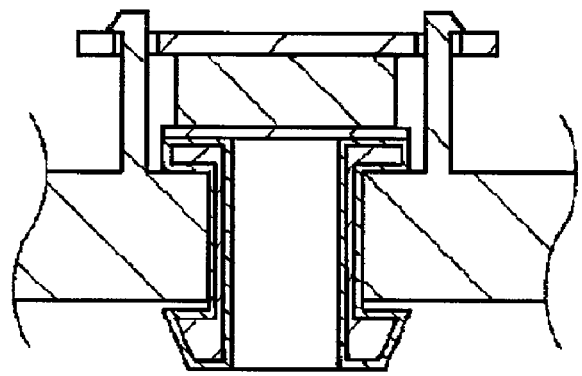
FIG. 13A
FIG. 13B

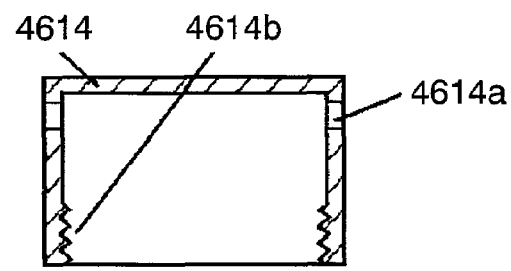
FIG. 28A
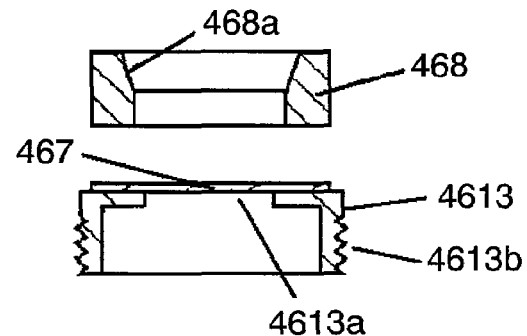
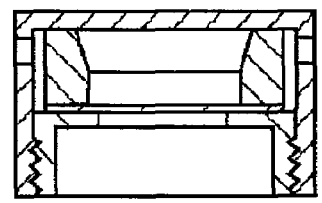
FIG. 28B
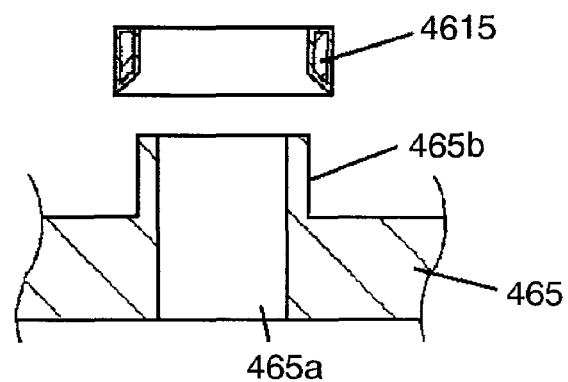
FIG. 28C
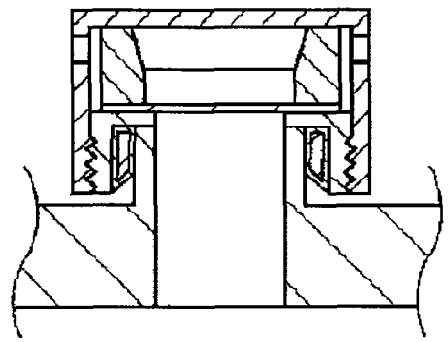

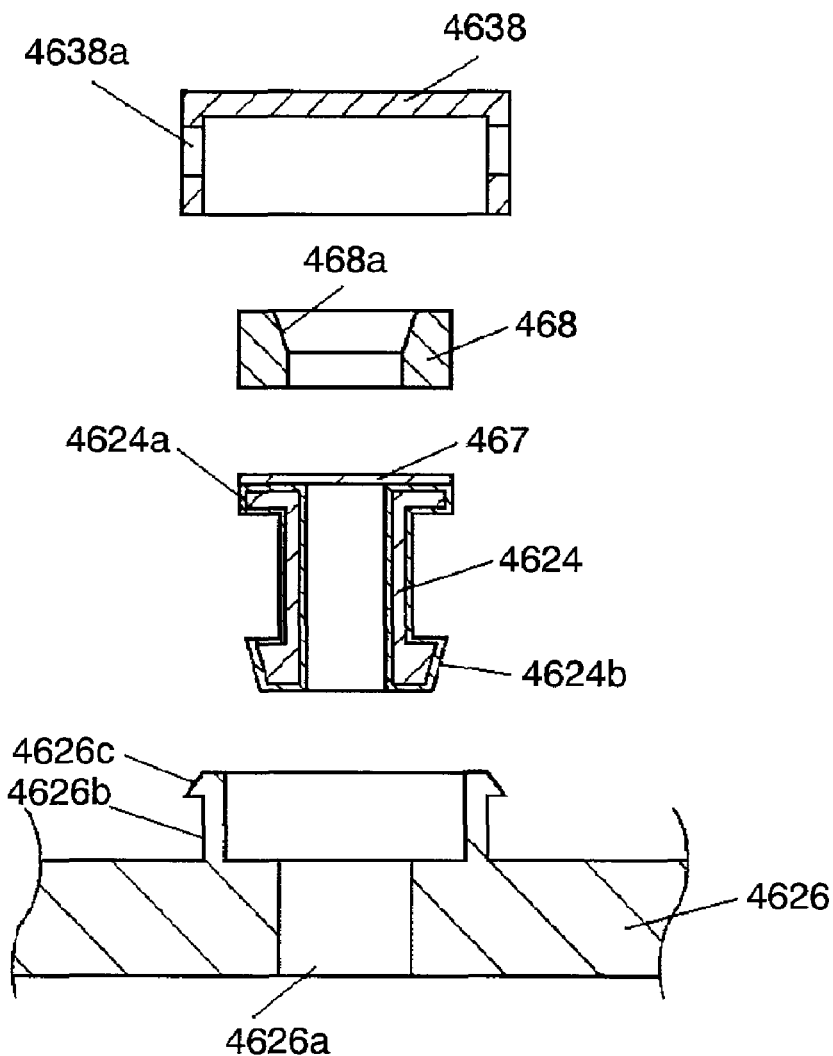
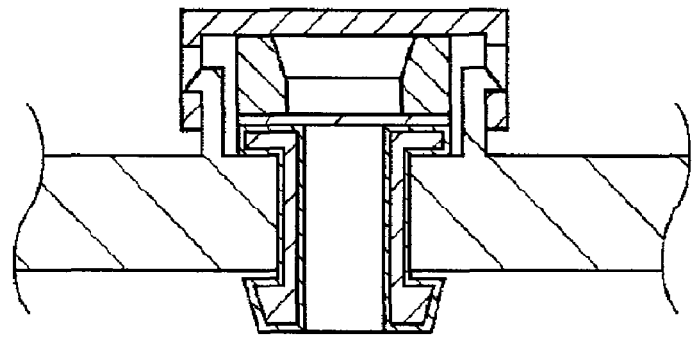
FIG. 40A
FIG. 40B

CAPACITOR

This application is a U.S. National Phase Application of PCT International Application PCT/JP2006/314754.

TECHNICAL FIELD

The present invention relates to capacitors for use in various electronic devices, hybrid vehicles using regenerative braking, electric power storage, and other similar applications.

BACKGROUND ART

FIG. 66 is a sectional view of a conventional capacitor. FIG. 67 is a sectional view of a pressure regulating valve used in the conventional capacitor. In FIGS. 66 and 67, the capacitor includes capacitor element 20 having hollow portion 20a. Capacitor element 20 is formed by winding a pair of positive and negative electrodes which are displaced from each other in opposite directions with a separator interposed therebetween (all unillustrated). The positive and negative electrodes are each composed of a current collector made of aluminum foil and a polarizable electrode layer formed thereon. Capacitor element 20 is structured so that the anode and the cathode can be removed from the end faces (the top and the bottom of FIG. 66).

The capacitor further includes metal case 21, which is a bottomed aluminum cylindrical case to accommodate capacitor element 20 together with an unillustrated driving electrolyte. Metal case 21 has cathode terminal 21a, which is an external-connection terminal integral with the outer bottom surface thereof. Metal case 21 further has protrusion 21b, which is integral with its inner bottom surface and inserted into hollow portion 20a of capacitor element 20. Protrusion 21b is thus inserted into hollow portion 20a of capacitor element 20, so that the cathode-side surface of capacitor element 20 in metal case 21 is mechanically and electrically joined by, for example, laser welding to the inner bottom surface of metal case 21.

The capacitor further includes sealing plate 22 made of aluminum. Sealing plate 22 has anode terminal 22a integral with its front surface and protrusion 22b, which is inserted into hollow portion 20a of capacitor element 20. The anode-side surface of capacitor element 20 is joined by, for example, laser welding to the inner surface of sealing plate 22 so as to be mechanically and electrically connected thereto. The anode-side surface of capacitor element 20 is then sealed by applying a curling process (generally called "curling") to the opening of metal case 21 on the periphery of sealing plate 22.

The capacitor further includes pressure regulating valve 23 having gas-permeable member 24 and blocking member 25 which are disposed on electrolyte filling hole 22c of sealing plate 22. Pressure regulating valve 23 further has metal cap 26, which covers and fixes gas-permeable member 24 and blocking member 25 so as to bias blocking member 25 constantly in the closing direction. Metal cap 26 has hole 26a for communication with outside. Metal cap 26 is fixed by, for example, caulking annular projection 22d against metal cap 26. Annular projection 22d is previously disposed on sealing plate 22 in such a manner as to enclose electrolyte filling hole 22c.

Pressure regulating valve 23 is of self-recovery type and releases the pressure to the outside when the internal pressure of the capacitor exceeds a predetermined value. Pressure regulating valve 23 allows the gas generated in the capacitor to be released to the outside so as to prevent a pressure increase in the capacitor. After the operation, pressure regulating valve 23 returns to the original state so as to keep the airtightness of the inside of the capacitor. As a result, when the gas generation causes a pressure increase in the capacitor, the capacitor can maintain its properties without exhibiting any apparent abnormalities.

Pressure regulating valve 23 functions to prevent the permeation of the driving electrolyte. Gas-permeable member 24 in close contact with sealing plate 22 is made of a material that allows the gas generated in the capacitor to pass through to the outside. This prevents the driving electrolyte from adhering to blocking member 25 and hence damaging the function of pressure regulating valve 23. Pressure regulating valve 23 further functions to prevent the driving electrolyte from leaking to the outside of the capacitor.

In the conventional capacitors having the above-described structure, pressure regulating valve 23 is fixedly attached to electrolyte filling hole 22c so as to reduce the number of locations from which the driving electrolyte might leak out. One of the prior arts related to the present application is Japanese Patent Unexamined Publication No. 2004-134632.

In the conventional capacitor, pressure regulating valve 23 is fixedly attached to electrolyte filling hole 22c so as to reduce the leakage of the driving electrolyte. However, gas-permeable member 24 and sealing plate 22 are not joined to each other and therefore the driving electrolyte is likely to leak through their boundaries. The leakage can be prevented by joining gas-permeable member 24 and sealing plate 22 by bonding or welding; however, the joining is very difficult due to the differences in their material properties.

SUMMARY OF THE INVENTION

In view of the conventional problems, it is an object of the present invention to provide a highly reliable capacitor free from leakage of a driving electrolyte.

The present invention is a capacitor including a capacitor element; a bottomed cylindrical metal case; and a terminal plate. The capacitor element has a pair of positive and negative electrodes which are disposed in opposite directions and wound together with a separator interposed therebetween, the pair of positive and negative electrodes being each composed of a current collector made of metal foil and a polarizable electrode layer formed thereon. The metal case accommodates the capacitor element together with a driving electrolyte, the metal case being joined to one of the pair of positive and negative electrodes at its inner bottom surface. The terminal plate is joined to the other of the pair of positive and negative electrodes at its inner surface so as to seal the opening of the metal case. The terminal plate has a pressure regulating valve functioning also as a driving-electrolyte filling hole. The pressure regulating valve includes a ring-shaped elastic member; a gas-permeable sheet sealedly joined to the upper surface of the elastic member; a rubber valve body disposed on the gas-permeable sheet; and a cap for holding the valve body in the compressed state. The elastic member is pressed into the annular wall formed in the upper portion of the periphery of the hole of the terminal plate.

In this structure, the gas-permeable sheet is sealedly joined to the upper surface of the ring-shaped elastic member, thereby making the elastic member in close contact with the hole. This provides a highly reliable capacitor free from leakage of a driving electrolyte.

BRIEF DESCRIPTION OF THE DRAWINGS

FIG. 4A is an exploded sectional view of a pressure regulating valve used in a capacitor according to a second embodiment of the present invention.

FIG. 4B is a sectional view before assembly of the pressure regulating valve used in the capacitor according to the second embodiment of the present invention.

FIG. 4C is a sectional view after assembly of the pressure regulating valve used in the capacitor according to the second embodiment of the present invention.

FIG. 6A is an exploded sectional view of a pressure regulating valve used in a capacitor according to a fourth embodiment of the present invention.

FIG. 6B is a sectional view before assembly of the pressure regulating valve used in the capacitor according to the fourth embodiment of the present invention.

FIG. 6C is a sectional view after assembly of the pressure regulating valve used in the capacitor according to the fourth embodiment of the present invention.

FIG. 13A is an exploded sectional view of a pressure regulating valve used in a capacitor according to a ninth embodiment of the present invention.

FIG. 13B is a sectional view after assembly of the pressure regulating valve used in the capacitor according to the ninth embodiment of the present invention.

FIG. 28A is an exploded sectional view of a pressure regulating valve used in a capacitor according to a twentieth embodiment of the present invention.

FIG. 28B is a sectional view before assembly of the pressure regulating valve used in the capacitor according to the twentieth embodiment of the present invention.

FIG. 28C is a sectional view after assembly of the pressure regulating valve used in the capacitor according to the twentieth embodiment of the present invention.

FIG. 40A is an exploded sectional view of a pressure regulating valve used in a capacitor according to a thirtieth embodiment of the present invention.

FIG. 40B is a sectional view after assembly of the pressure regulating valve used in the capacitor according to the thirtieth embodiment of the present invention.

FIG. 48E is another sectional view of the essential part showing assembling of the pressure regulating valve used in the capacitor according to the thirty-seventh embodiment of the present invention.

FIG. 49A is an exploded sectional view of a pressure regulating valve used in a capacitor according to a thirty-eighth embodiment of the present invention.

FIG. 49B is a sectional view before assembly of the pressure regulating valve used in the capacitor according to the thirty-eighth embodiment of the present invention.

FIG. 49C is a sectional view after assembly of the pressure regulating valve used in the capacitor according to the thirty-eighth embodiment of the present invention.

FIG. 50A is an exploded sectional view of a pressure regulating valve used in a capacitor according to a thirty-ninth embodiment of the present invention.

FIG. 50B is a plan view of an essential part excluding a cover of the capacitor according to the thirty-ninth embodiment of the present invention.

FIG. 50C is a sectional view after assembly of the pressure regulating valve used in the capacitor according to the thirty-ninth embodiment of the present invention.

FIG. 51 is a perspective view of FIG. 50A.

FIG. 52A is an exploded sectional view of a pressure regulating valve used in a capacitor according to a fortieth embodiment of the present invention.

FIG. 52B is a sectional view before assembly of the pressure regulating valve used in the capacitor according to the fortieth embodiment of the present invention.

FIG. 52C is a plan view of an essential part excluding a cover of the capacitor according to the fortieth embodiment of the present invention.

FIG. 52D is a sectional view after assembly of the pressure regulating valve used in the capacitor according to the fortieth embodiment of the present invention.

Figure 53A:
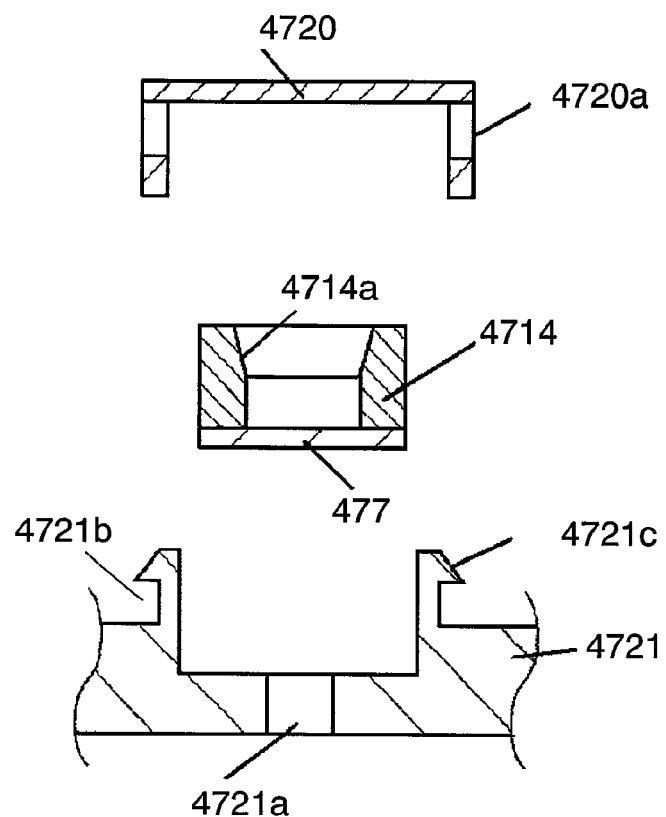

FIG. 53A is an exploded sectional view of a pressure regulating valve used in a capacitor according to a forty-first embodiment of the present invention.

Figure 53B:
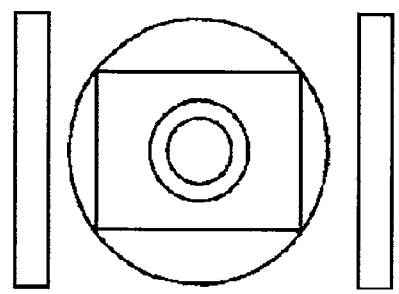

FIG. 53B is a plan view of an essential part excluding a cover of the capacitor according to the forty-first embodiment of the present invention.

Figure 53C:
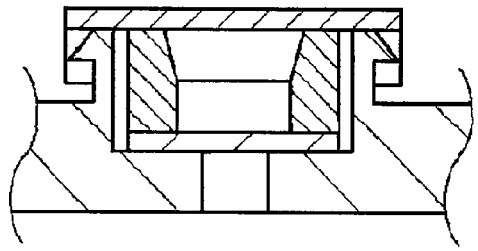

FIG. 53C is a sectional view after assembly of the pressure regulating valve used in the capacitor according to the forty-first embodiment of the present invention.

Figure 54:
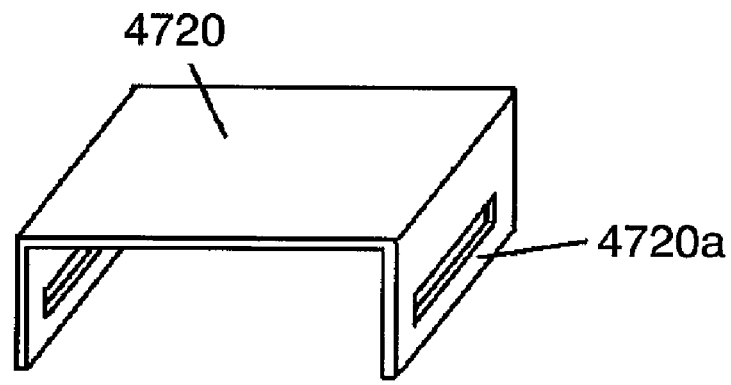
Figure 54:
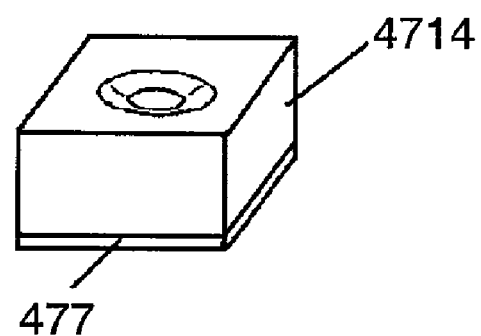
Figure 54:
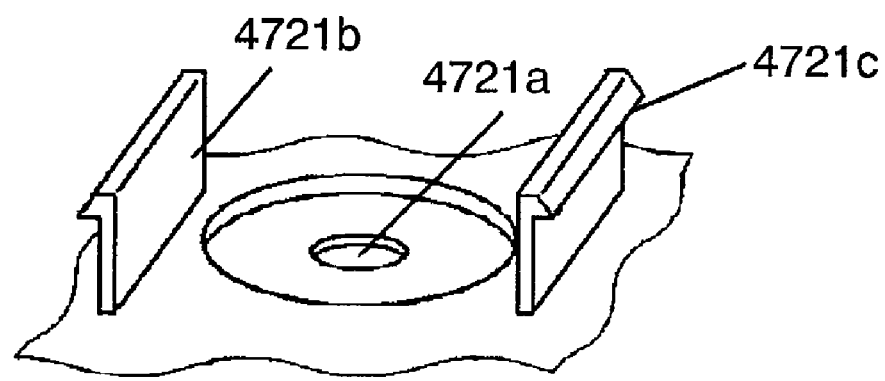

FIG. 54 is a perspective view of FIG. 53A.

Figure 55A:
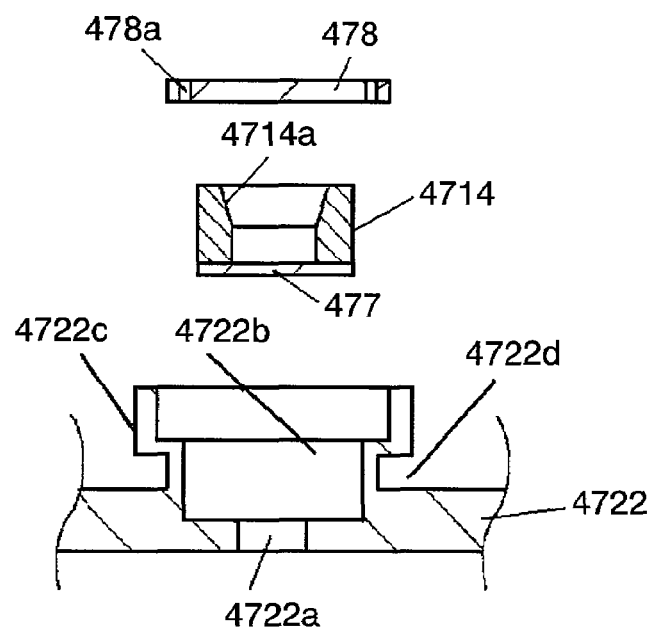

FIG. 55A is an exploded sectional view of a pressure regulating valve used in a capacitor according to a forty-second embodiment of the present invention.

Figure 55B:
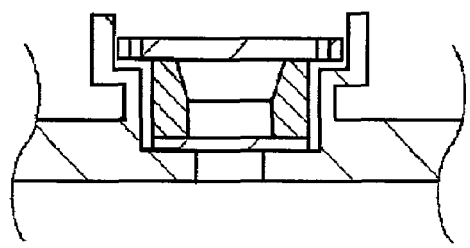

FIG. 55B is a sectional view before assembly of the pressure regulating valve used in the capacitor according to the forty-second embodiment of the present invention.

Figure 55C:
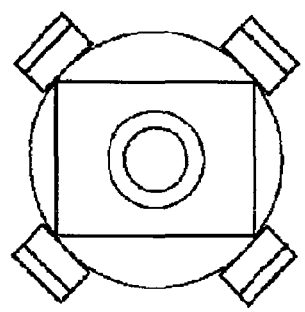

FIG. 55C is a plan view of an essential part excluding a cover of the capacitor according to the forty-second embodiment of the present invention.

Figure 55D:
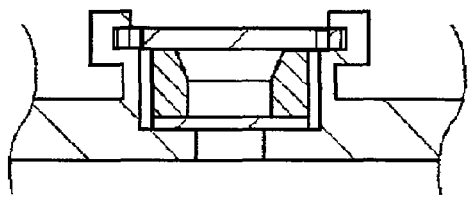

FIG. 55D is a sectional view after assembly of the pressure regulating valve used in the capacitor according to the forty-second embodiment of the present invention.

Figure 56A:
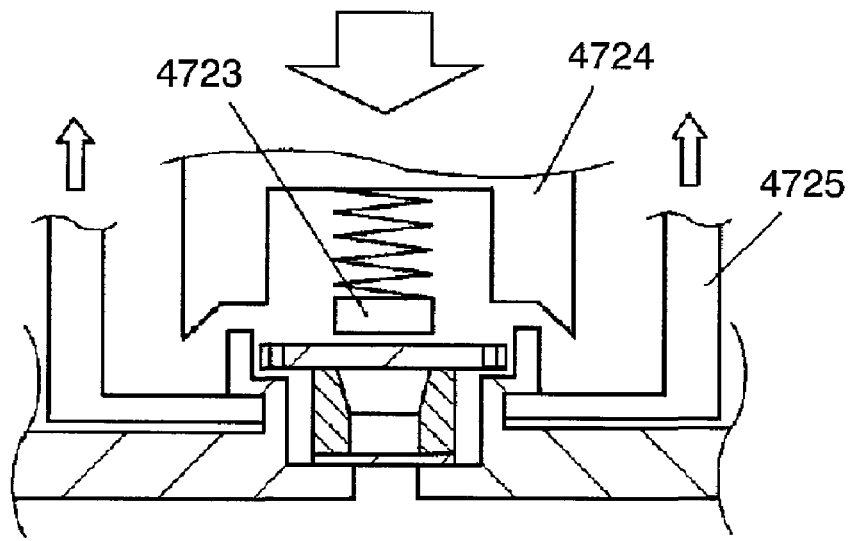

FIG. 56A is a sectional view showing assembling of the capacitor according to the forty-second embodiment of the present invention.

Figure 56B:
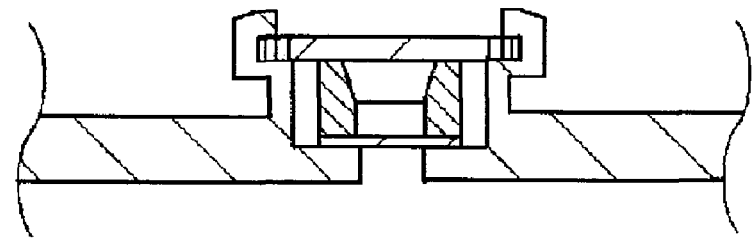

FIG. 56B is another sectional view showing assembling of the capacitor according to the forty-second embodiment of the present invention.

Figure 57A:
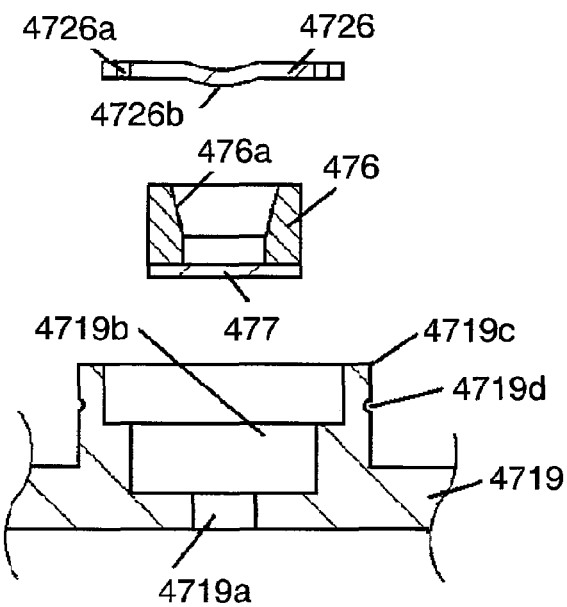

FIG. 57A is an exploded sectional view of a pressure regulating valve used in a capacitor according to a forty-third embodiment of the present invention.

Figure 57B:
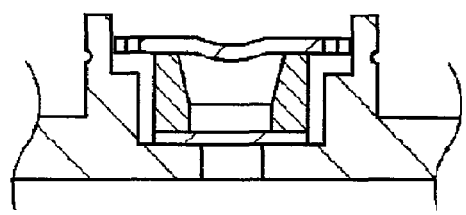

FIG. 57B is a sectional view before assembly of the pressure regulating valve used in the capacitor according to the forty-third embodiment of the present invention.

Figure 57C:
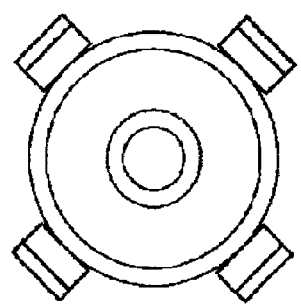

FIG. 57C is a plan view of an essential part excluding a cover of the capacitor according to the forty-third embodiment of the present invention.

Figure 57D:
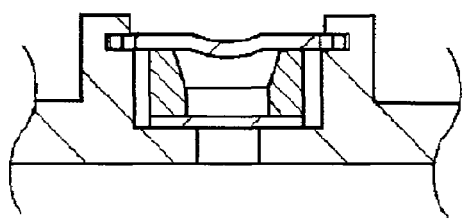

FIG. 57D is a sectional view after assembly of the pressure regulating valve used in the capacitor according to the forty-third embodiment of the present invention.

Figure 58A:
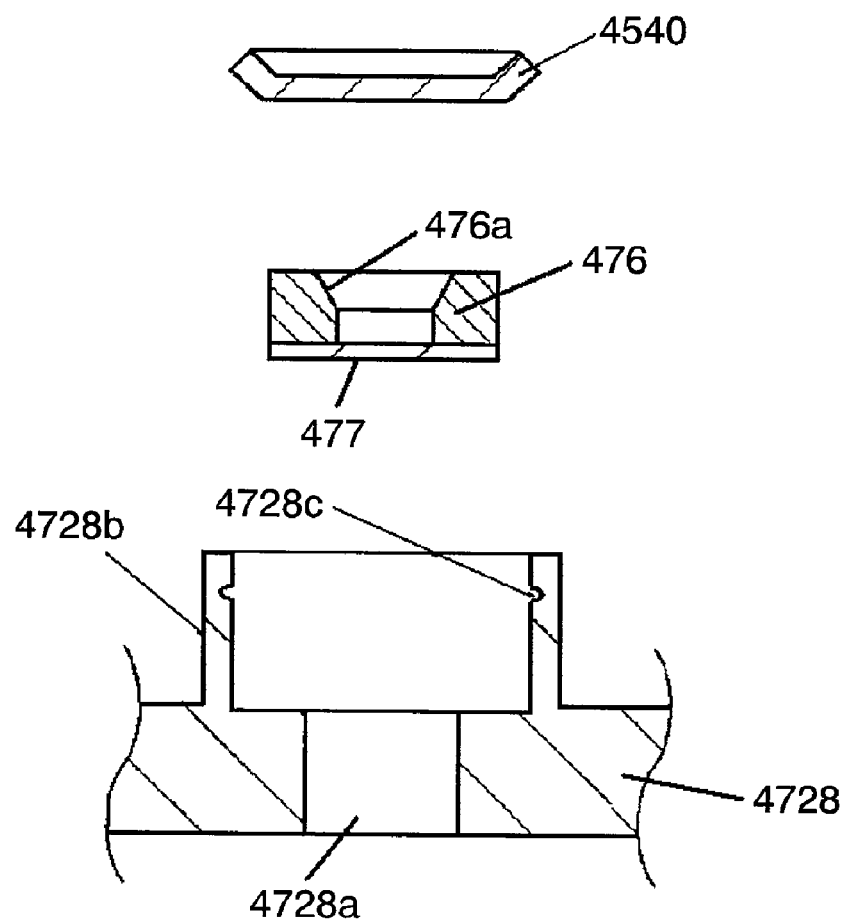

FIG. 58A is an exploded sectional view of a pressure regulating valve used in a capacitor according to a forty-fourth embodiment of the present invention.

Figure 58B:
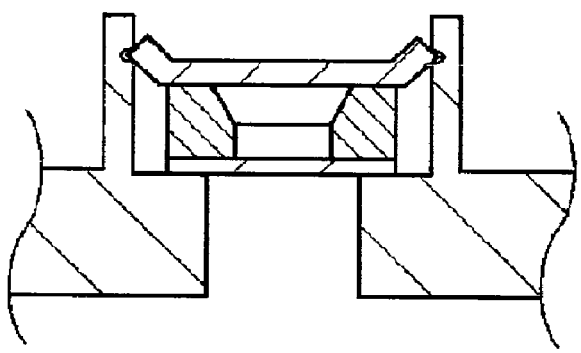

FIG. 58B is a sectional view after assembly of the pressure regulating valve used in the capacitor according to the forty-fourth embodiment of the present invention.

Figure 59A:
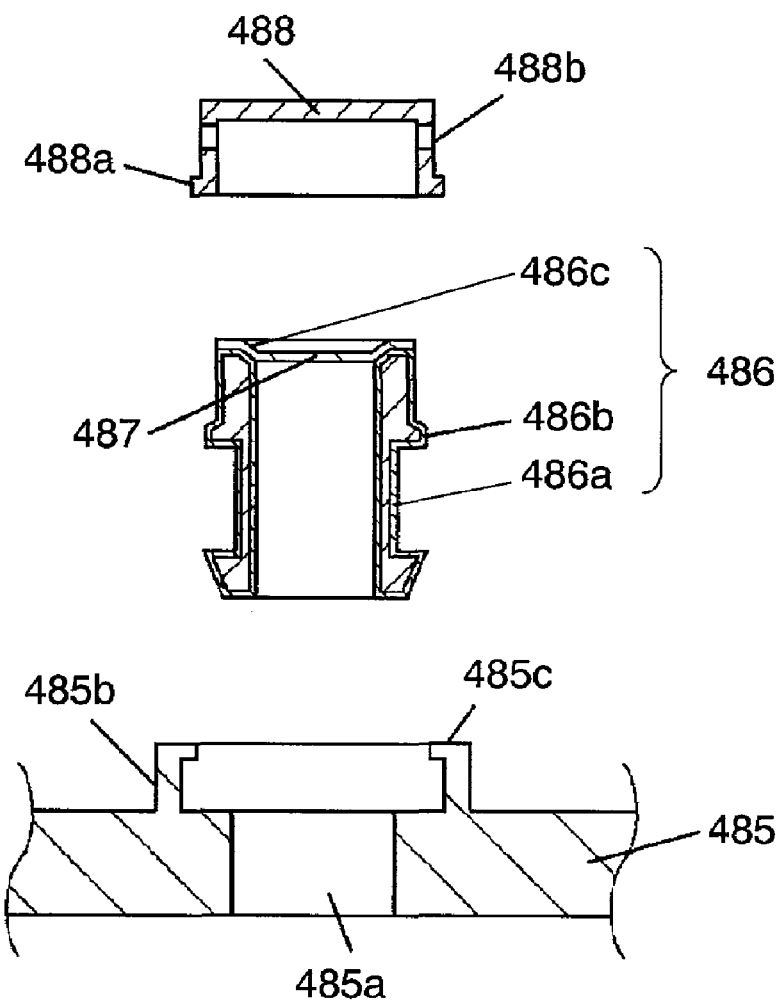

FIG. 59A is an exploded sectional view of a pressure regulating valve used in a capacitor according to a forty-fifth embodiment of the present invention.

Figure 59B:
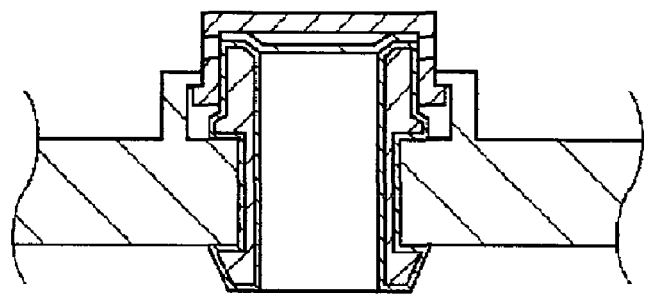

FIG. 59B is a sectional view after assembly of the pressure regulating valve used in the capacitor according to the forty-fifth embodiment of the present invention.

Figure 60A:
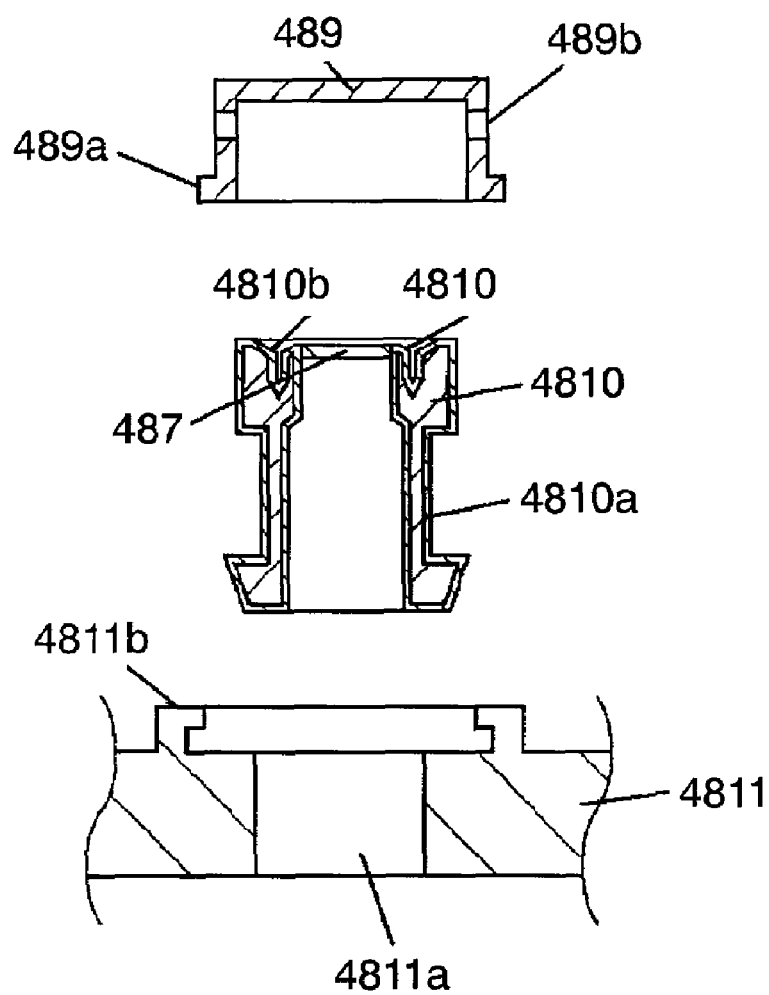

FIG. 60A is an exploded sectional view of a pressure regulating valve used in a capacitor according to a forty-sixth embodiment of the present invention.

Figure 60B:
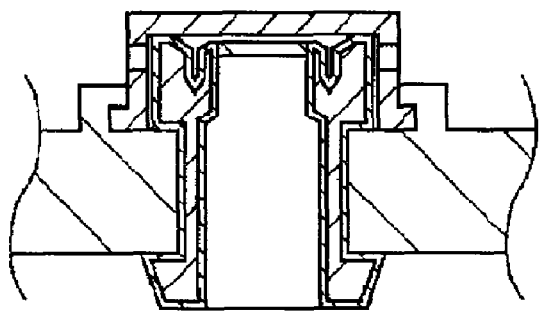

FIG. 60B is a sectional view after assembly of the pressure regulating valve used in the capacitor according to the forty-sixth embodiment of the present invention.

Figure 61A:
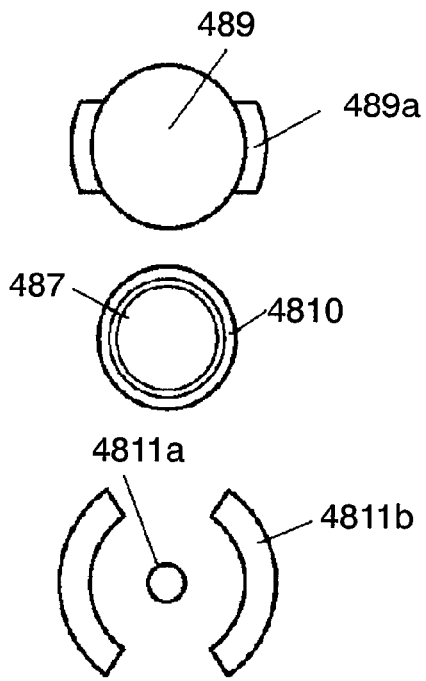

FIG. 61A is a plan view showing assembling of the pressure regulating valve used in the capacitor according to the forty-sixth embodiment of the present invention.

Figure 61B:
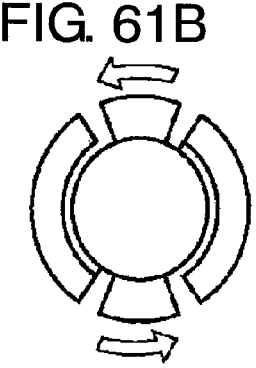

FIG. 61B is another plan view showing assembling of the pressure regulating valve used in the capacitor according to the forty-sixth embodiment of the present invention.

Figure 61D:
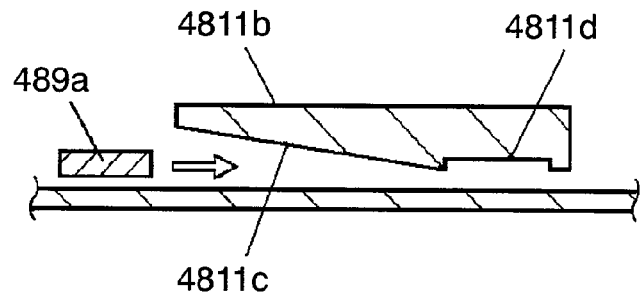
Figure 61C:
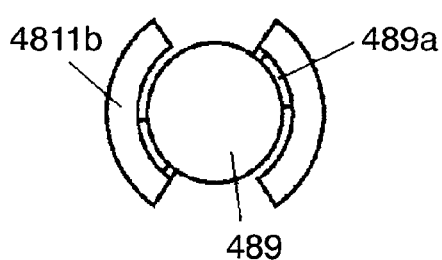

FIG. 61C is another plan view showing assembling of the pressure regulating valve used in the capacitor according to the forty-sixth embodiment of the present invention.

FIG. 61D is a sectional view of an essential part showing assembling of the pressure regulating valve used in the capacitor according to the forty-sixth embodiment of the present invention.

Figure 61E:
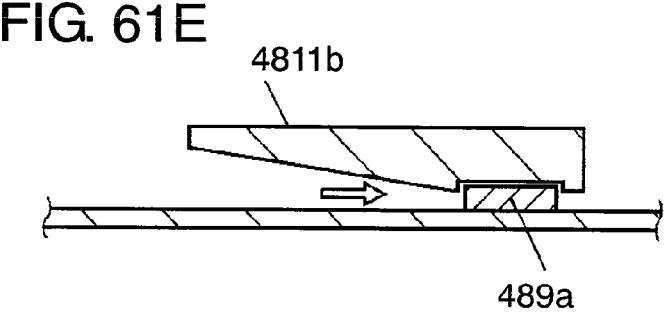

FIG. 61E is another sectional view of the essential part showing assembling of the pressure regulating valve used in the capacitor according to the forty-sixth embodiment of the present invention.

Figure 62A:
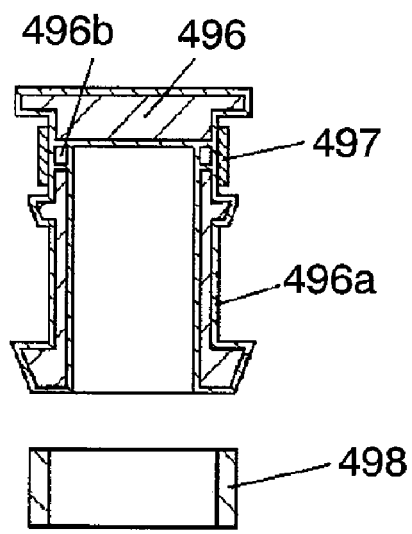

FIG. 62A is an exploded sectional view of a pressure regulating valve used in a capacitor according to a forty-seventh embodiment of the present invention.

Figure 62B:
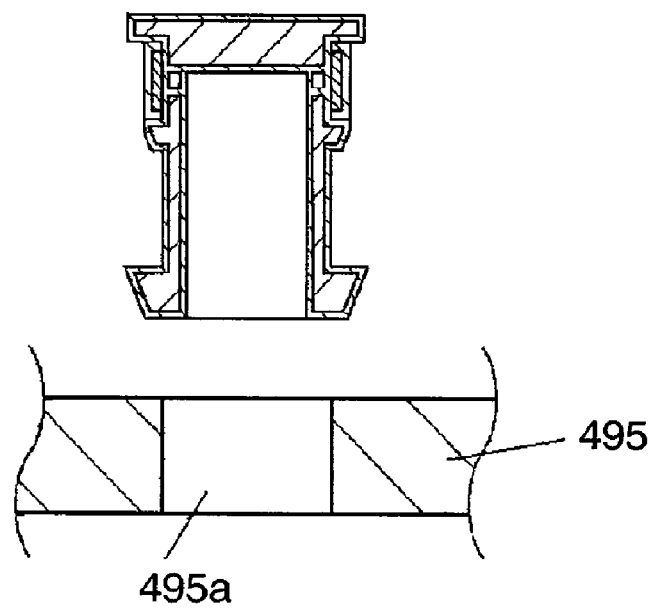

FIG. 62B is a sectional view before assembly of the pressure regulating valve used in the capacitor according to the forty-seventh embodiment of the present invention.

Figure 62C:
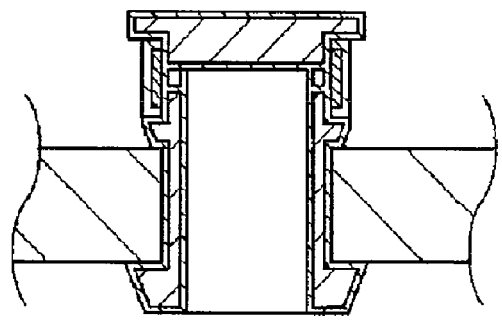

FIG. 62C is a sectional view after assembly of the pressure regulating valve used in the capacitor according to the forty-seventh embodiment of the present invention.

Figure 63A:
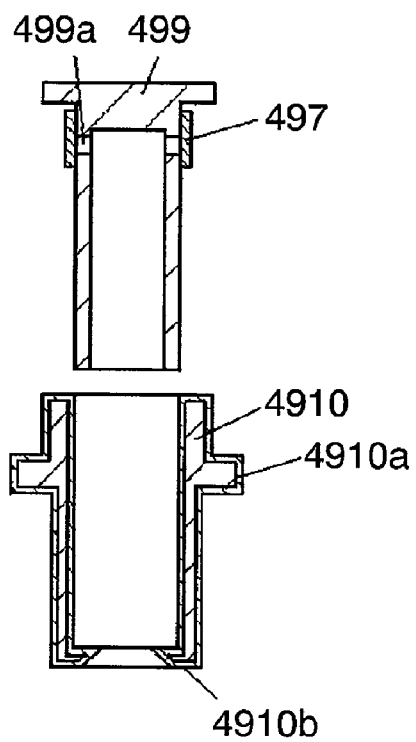

FIG. 63A is an exploded sectional view of a pressure regulating valve used in a capacitor according to a forty-eighth embodiment of the present invention.

Figure 63B:
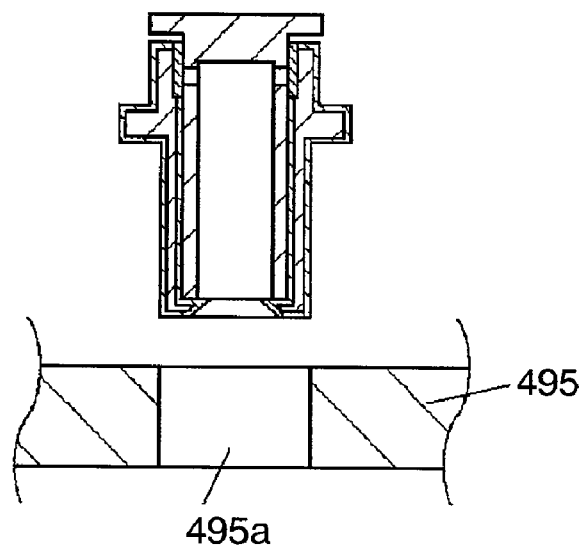

FIG. 63B is a sectional view before assembly of the pressure regulating valve used in the capacitor according to the forty-eighth embodiment of the present invention.

Figure 63C:
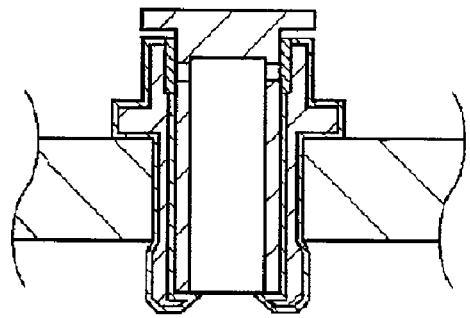

FIG. 63C is a sectional view after assembly of the pressure regulating valve used in the capacitor according to the forty-eighth embodiment of the present invention.

Figure 64A:
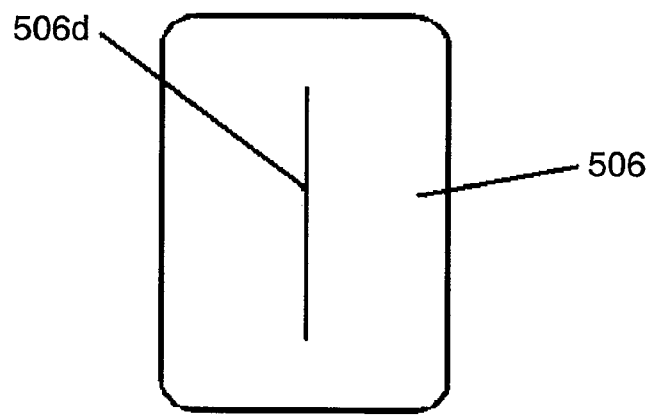

FIG. 64A is a plan view of a pressure regulating valve used in a capacitor according to a forty-ninth embodiment of the present invention.

Figure 64B:
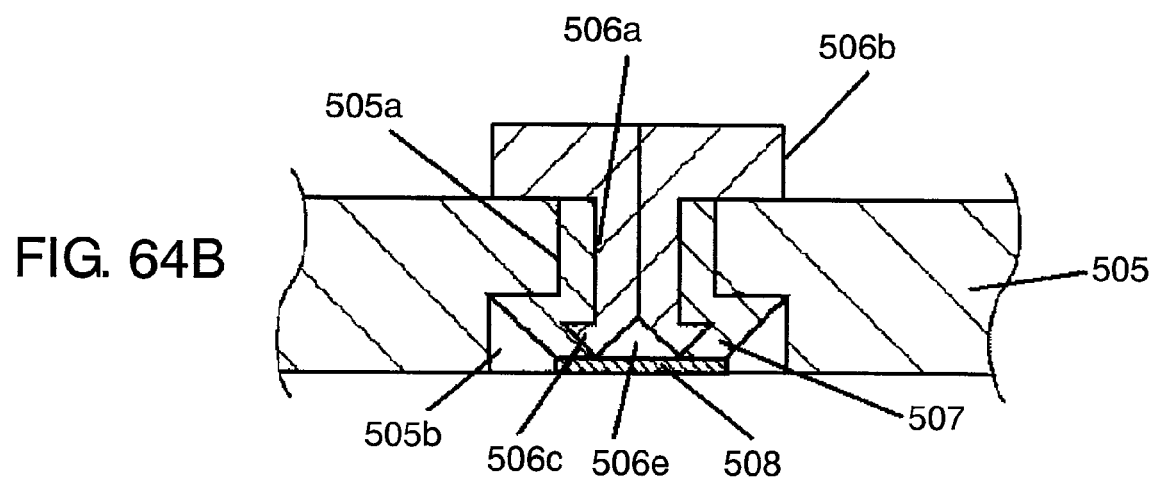

FIG. 64B is a sectional view after assembly of the pressure regulating valve used in the capacitor according to the forty-ninth embodiment of the present invention.

Figure 65A:
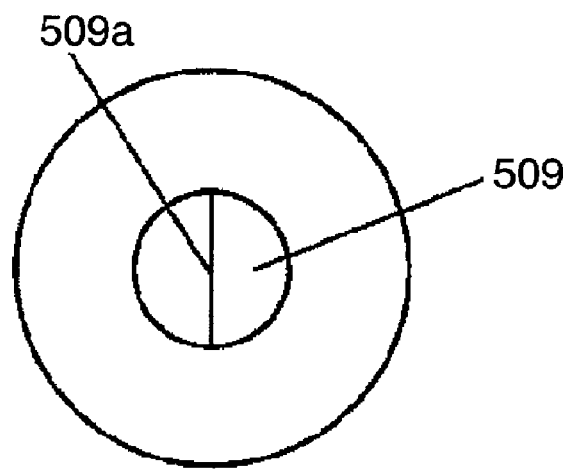

FIG. 65A is a plan view of a pressure regulating valve used in another capacitor according to the forty-ninth embodiment of the present invention.

Figure 65B:
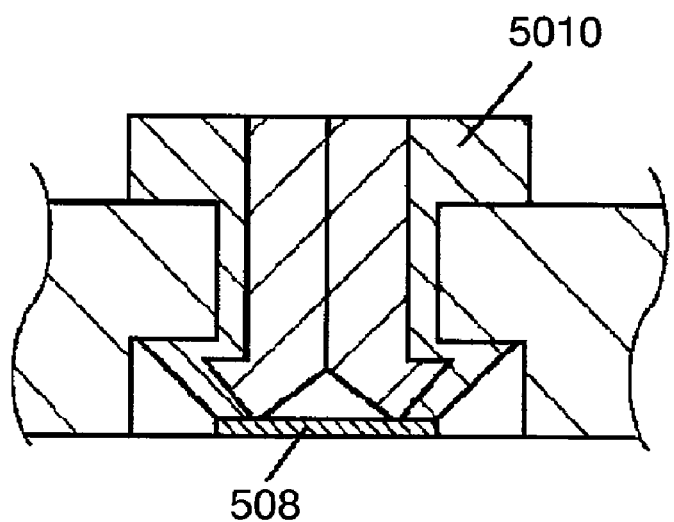

FIG. 65B is a sectional view after assembly of the pressure regulating valve used in the another capacitor according to the forty-ninth embodiment of the present invention.

Figure 66:
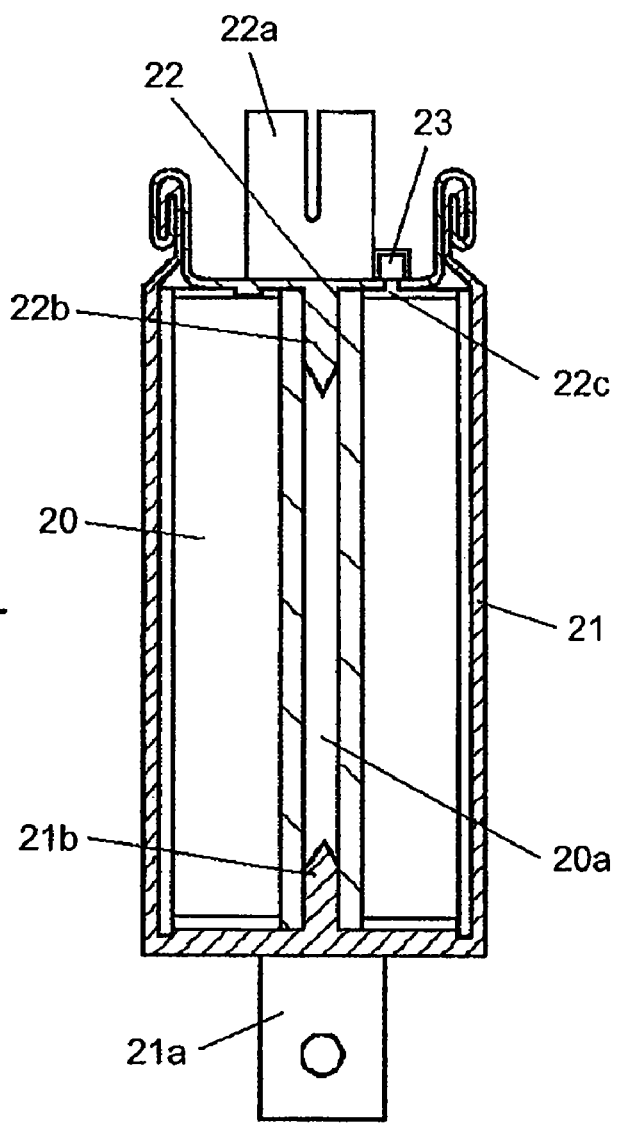

FIG. 66 is a sectional view of a conventional capacitor.

Figure 67:
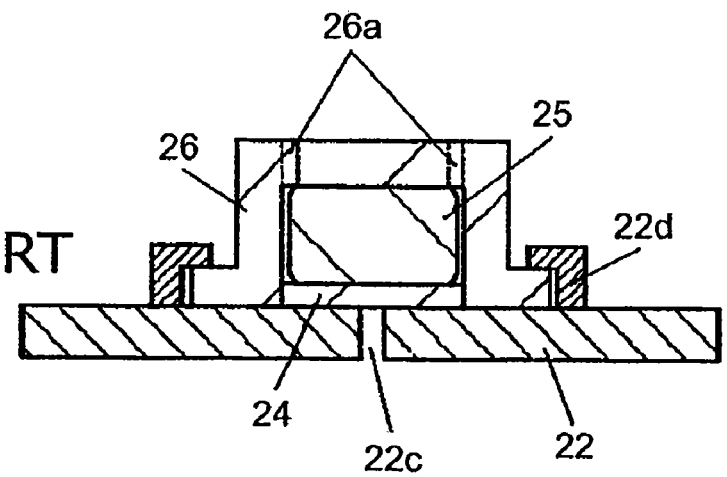

FIG. 67 is a sectional view of a pressure regulating valve used in the conventional capacitor.

REFERENCE MARKS IN THE DRAWINGS

451 capacitor element
451*a* hollow portion
452 metal case
452*a*, 453*a*, 4634, 4635, 4724, 4725 protrusion
453, 455, 4527, 4529, 4532, 4534, 4537, 4539, 4541, 463, 465, 4626, 4629, 4632, 4637, 4641, 473, 475, 4710, 4712, 4713, 4716, 4717, 4718, 4719, 4721, 4722, 483, 485, 4811, 493, 495, 503, 505 terminal plate
453*b*, 463*b*, 473*b*, 483*b*, 493*b*, 503*b* joining portion
453*c*, 463*c*, 473*c*, 483*c*, 493*c*, 503*c* anode terminal
453*d*, 455*a*, 4527*a*, 4529*a*, 4532*a*, 4534*a*, 4537*a*, 4539*a*, 4541*a*, 463*d*, 465*a*, hole, 4629*a*, 4632*a*, 4637*a*, 4641*a*, 473*d*, 475*a*, 4710*a*, 4712*a*, 4713*a*, 4716*a*, 4717*a*, 4718*a*, 4719*a*, 4721*a*, 4722*a*, 483*d*, 485*a*, 4811*a*, 493*d*, 495*a*, 503*d*, 505*a* electrolyte filling hole
454, 464, 474, 484, 494, 504 insulating material
455*b*, 4527*b*, 4529*b*, 4532*b*, 4534*b*, 4537*b*, 4541*b*, 465*b*, 4626*b*, 4632*b*, 4637*b*, 4641*b*, 475*b*, 4710*b*, 4712*b*, 4713*b*, 4718*c*, 4719*c*, 4722*c*, 485*b*, 4810*c* wall
456, 4510, 4514, 4517, 4520, 4521, 4525, 4530, 4535, 466, 4612, 4615, 4618, 4619, 4624, 4627, 496, 507, 5010 elastic member
456*a*, 459*a*, 4510*a*, 4511*a*, 4521*b*, 4525*b*, 4528*a*, 4529*c*, 4530*b*, 4532*c*, 4533*a*, 4534*c*, 4535*b*, 4536*a*, 4537*c*, 4538*a*, 4539*b*, 4540*a*, 4541*c*, 466*a*, 469*a*, 4619*b*, 4624*b*, 4625*a*, 4626*c*, 4627*b*, 4636*a*, 4637*c*, 4638*a*, 4640*a*, 4641*c*, 4710*c*, 4711a, 4712c, 4715a, 4716b, 4720a, 4721c, 4727a, 485c, 486a, 488a, 489a, 4810a, 4811b, 496a, 506a engaging section
457, 467, 477, 487, 497, 508 gas-permeable sheet
458, 4531, 468, 4630, 486, 4810, 498, 4910, 506, 509 valve body
459, 4511, 4513, 4516, 4519, 4522, 4533, 4536, 4538, 469, 4611, 4614, 4617, 4620, 4623, 4636, 4638, 476, 4714, 4711, 4715, 4720, 488, 489 cap
4511b, 4512a, 4512b, 4513a, 4515a, 4516a, 4519a, 4522a, 4524a, 4524b, 4610a, 4610b, 4611a, 4613a, 4614a, 4617a, 4620a, 4622a, 4622b, 4623a, 4628a, 4631a, 478a, 479a, 4713c, 4726a, 488b, 489b, 496b, 499a hole
4512, 4524, 4610, 4622 valve support member
4515, 4613 valve compression member
4515b, 4516b, 4613b, 4614b screw portion
4518, 4616 valve holding member
4518a, 4521a, 4525a, 4530a, 4535a, 4616a, 4619a, 4624a, 4627a, 486b, 4910a flange
4523, 4621 O-ring
4526, 4528, 4625, 4628, 4631, 478, 479, 4726 cover
4526a, 4540b, 4632d, 4640b, 4722d, 4727b notch
4532d, 4629b, 4632b, 4717b, 4718b, 4719b, 4722b, 505b depression
4539c, 468a, 476a, 4716c, 486c, 4810b, 4811c tapered portion
4539d, 4716d, 4811d fixing portion
4540, 4633, 4723 retainer plate
4629c caulking portion
4629d, 4719d deformation inducing portion
4631b, 4726b processing jig
499 metal member
4910b, 506b, 506c locking section
506d, 509a slit
506e recess

DETAILED DESCRIPTION OF PREFERRED EMBODIMENTS

First Embodiment

Figure 1:
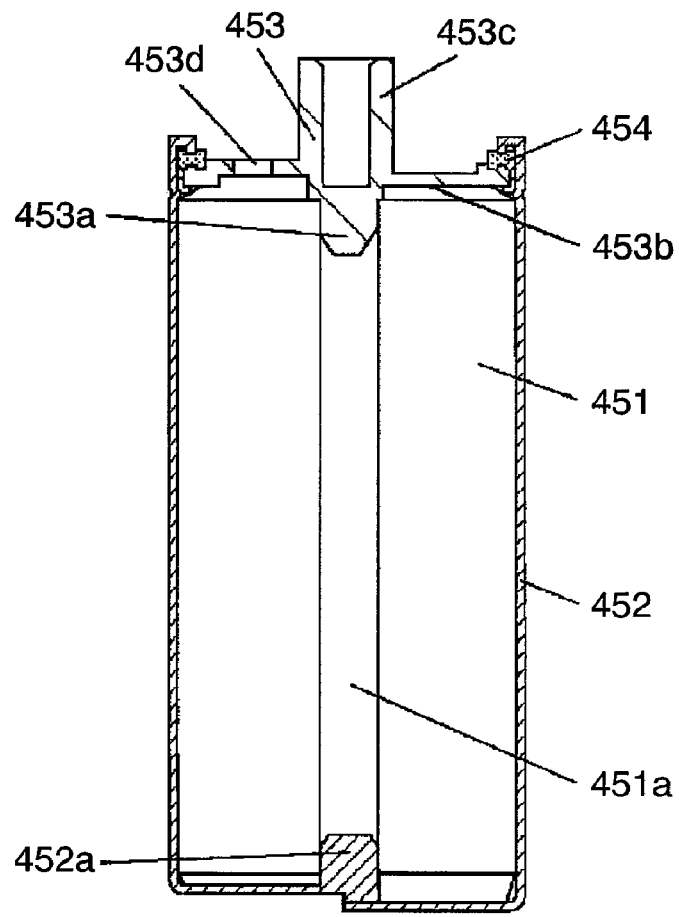
FIG. 1 is a sectional view of a capacitor according to a first embodiment of the present invention.
Figure 2:
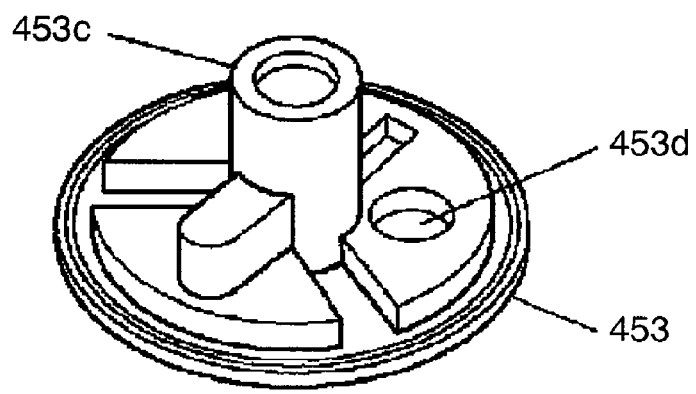
FIG. 2 is a top perspective view of a terminal plate used in the capacitor according to the first embodiment of the present invention.
Figure 3A:
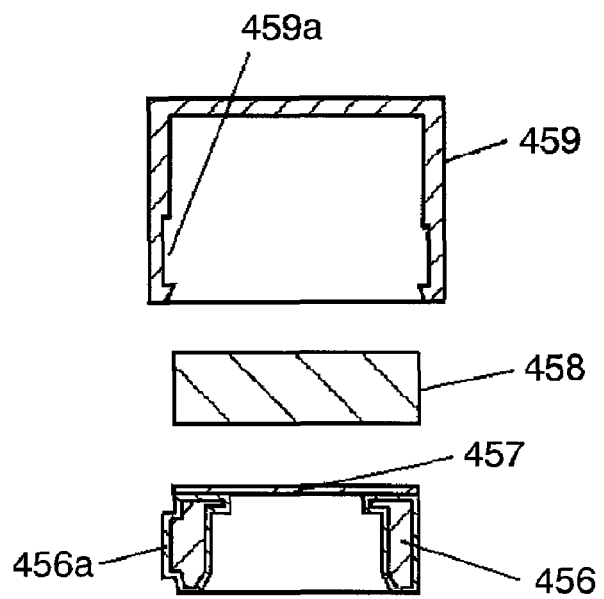
FIG. 3A is an exploded sectional view of a pressure regulating valve used in the capacitor according to the first embodiment of the present invention.
Figure 3B:
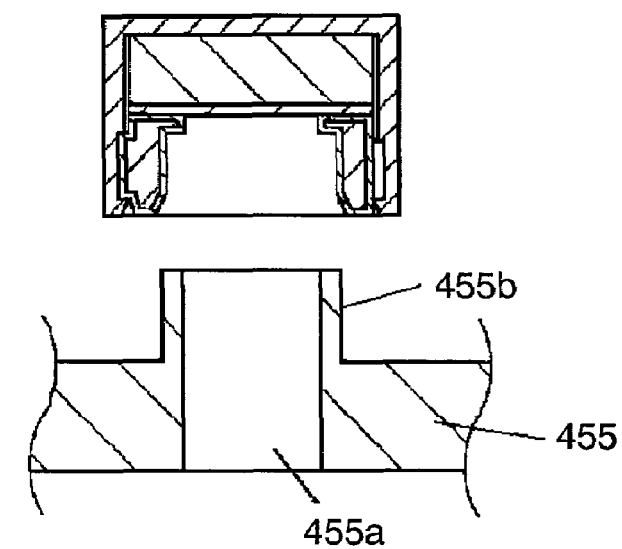
FIG. 3B is a sectional view before assembly of the pressure regulating valve used in the capacitor according to the first embodiment of the present invention.
Figure 3C:
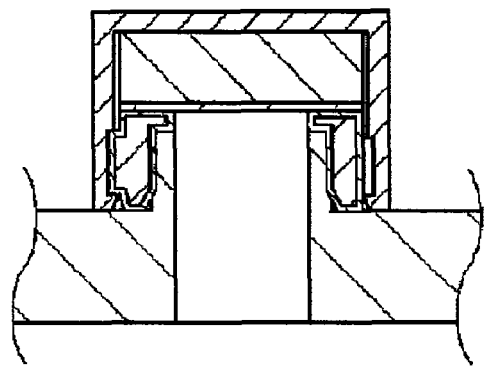
FIG. 3C is a sectional view after assembly of the pressure regulating valve used in the capacitor according to the first embodiment of the present invention.

FIG. 1 is a sectional view of a capacitor according to a first embodiment of the present invention. FIG. 2 is a top perspective view of a terminal plate used in the capacitor according to the first embodiment of the present invention. FIG. 3A is an exploded sectional view of a pressure regulating valve used in the capacitor according to the first embodiment of the present invention. FIG. 3B is a sectional view before assembly of the pressure regulating valve used in the capacitor according to the first embodiment of the present invention. FIG. 3C is a sectional view after assembly of the pressure regulating valve used in the capacitor according to the first embodiment of the present invention.

In FIGS. 1, 2, 3A, 3B, and 3C, the capacitor includes capacitor element 451 formed by winding a pair of positive and negative electrodes which are displaced from each other in opposite directions with a separator interposed therebetween (all unillustrated). The positive and negative electrodes are each composed of a current collector made of aluminum foil and a polarizable electrode layer formed thereon. Capacitor element 451 is structured so that the anode and the cathode can be removed from the end faces (the top and the bottom of FIG. 1).

The capacitor further includes metal case 452, which is a bottomed aluminum cylindrical case to accommodate capacitor element 451 together with an unillustrated driving electrolyte. Metal case 452 has protrusion 452a integral with its inner bottom surface and inserted into hollow portion 451a of capacitor element 451. The cathode-side surface of capacitor element 451 inserted into metal case 452 is mechanically and electrically bonded by, for example, laser welding to the inner bottom surface of metal case 452 so that the cathode-side electrode of capacitor element 451 can be removed from metal case 452.

The capacitor further includes terminal plate 453 made of aluminum. Terminal plate 453 has protrusion 453a integral with its inner surface; joining portion 453b formed on its inner surface; and anode terminal 453c, which is an external-connection terminal integral with its outer surface. Terminal plate 453 further has electrolyte filling hole 453d, which is sealed as follows. Protrusion 453a is inserted into hollow portion 451a of capacitor element 451. Then, the anode-side surface of capacitor element 451 is joined to joining portion 453b by, for example, laser welding and wound by applying a curling process (generally called "curling") to the opening of metal case 452 on the periphery of terminal plate 453 with insulating material 454 interposed inside the opening.

In the capacitor of the first embodiment thus structured, a predetermined amount of driving electrolyte is poured into metal case 452 through electrolyte filling hole 453d formed in terminal plate 453, and then the pressure regulating valve is attached to electrolyte filling hole 453d. The first embodiment is specifically described with reference to FIGS. 3A, 3B, and 3C.

The pressure regulating valve includes terminal plate 455 having electrolyte filling hole 455a and wall 455b annularly formed in the upper portion of the periphery of hole 455a. The pressure regulating valve further includes elastic member 456, which a ring-shaped member made of an elastic material such as rubber. Elastic member 456 has engaging section 456a protruding from part of its peripheral surface. Elastic member 456 is made of ethylene-propylene terpolymer (hereinafter, EPT) in the present first embodiment. The pressure regulating valve further includes gas-permeable sheet 457 sealedly joined to the upper surface of elastic member 456. Gas-permeable sheet 457 has physical properties that allow the gas generated in the capacitor to pass through it but does not allow the driving electrolyte to pass through it.

The pressure regulating valve further includes valve body 458 made of an elastic material such as rubber. Valve body 458 is specifically made of isoprene-isobutylene rubber (hereinafter, IIR) in the present first embodiment, but alternatively can be made of EPT. The pressure regulating valve further includes cap 459 which is a roof-shaped member made of a rigid body and has engaging section 459a on its peripheral surface. Cap 459 is made of resin in the present first embodiment, but alternatively can be made of metal.

In the pressure regulating valve of the present first embodiment thus structured, gas-permeable sheet 457 is sealedly joined to the upper surface of elastic member 456 by, for example, bonding. Then, gas-permeable sheet 457 and valve body 458 disposed thereon are inserted into cap 459 so as to engage engaging section 456a of elastic member 456 with engaging section 459a of cap 459, thereby holding valve body 458 in the compressed state (the compressibility is 2 to 30% in this case). This is pressed into annular wall 455b formed around the periphery of electrolyte filling hole 455a of terminal plate 455. As a result, the pressure regulating valve is attached as shown in FIG. 3C.

In the pressure regulating valve of the present first embodiment thus structured, elastic member 456 and gas-permeable sheet 457 are joined to each other. This allows the gas generated in the capacitor to pass through gas-permeable sheet 457 and to be released to the outside through the boundaries between gas-permeable sheet 457 and valve body 458. Furthermore, since gas-permeable sheet 457 does not allow the driving electrolyte to pass through it, the driving electrolyte is prevented from leaking by elastic member 6. This provides the capacitor with high reliability.

Second Embodiment

The capacitor of a second embodiment differs from the capacitor of the first embodiment only in part of the pressure regulating valve. Therefore, like components are labeled with like reference numerals with respect to the first embodiment and the description of these components is not repeated here. The following description is focused on the differences between these embodiments with reference to drawings.

FIG. 4A is an exploded sectional view of a pressure regulating valve used in a capacitor according to a second embodiment of the present invention. FIG. 4B is a sectional view before assembly of the pressure regulating valve used in the capacitor according to the second embodiment of the present invention. FIG. 4C is a sectional view after assembly of the pressure regulating valve used in the capacitor according to the second embodiment of the present invention.

In FIGS. 4A, 4B, and 4C, the pressure regulating valve includes elastic member 4510 having engaging section 4510a annularly formed on its peripheral surface. The pressure regulating valve further includes cap 4511 having engaging section 4511a annularly formed on its peripheral surface and holes 4511b for communication with outside.

In the pressure regulating valve of the present second embodiment thus structured, both engaging section 4510a of elastic member 4510 and engaging section 4511a of cap 4511 are annular in shape so as to be engaged with each other more securely than in the pressure regulating valve of the first embodiment. In addition, holes 4511b of cap 4511 which are communicated with outside allow the gas generated in the capacitor to pass through to the outside more easily than in the first embodiment.

Third Embodiment

The capacitor of a third embodiment differs from the capacitors of the first and second embodiments only in part of the pressure regulating valve. Therefore, like components are labeled with like reference numerals with respect to the first embodiment and the description of these components is not repeated here. The following description is focused on the differences between the first and second embodiments and the third embodiment with reference to drawings.

Figure 5A:
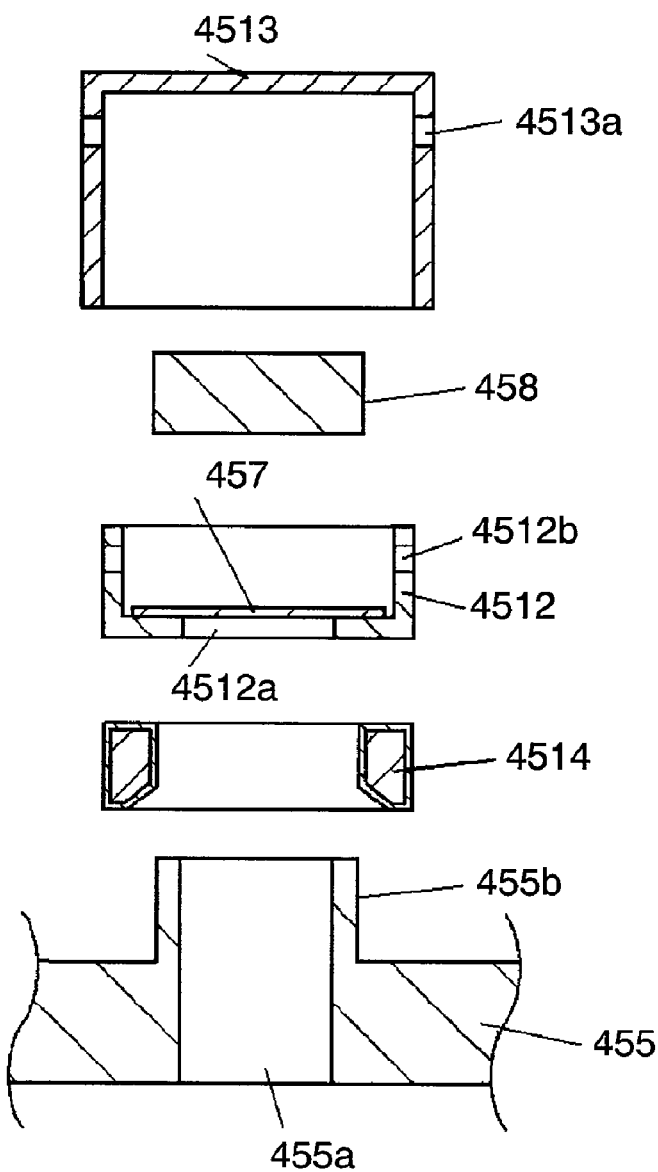
FIG. 5A is an exploded sectional view of a pressure regulating valve used in a capacitor according to a third embodiment of the present invention.
Figure 5B:
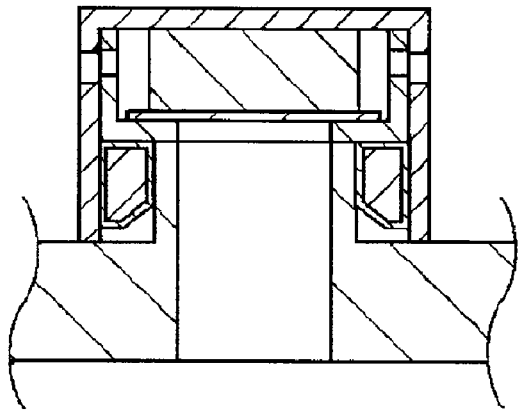
FIG. 5B is a sectional view after assembly of the pressure regulating valve used in the capacitor according to the third embodiment of the present invention.

FIG. 5A is an exploded sectional view of a pressure regulating valve used in a capacitor according to a third embodiment of the present invention. FIG. 5B is a sectional view after assembly of the pressure regulating valve used in the capacitor according to the third embodiment of the present invention.

In FIGS. 5A and 5B, the pressure regulating valve includes valve support member 4512 which is a box-shaped rigid body. Valve support member 4512 has hole 4512a at the center of its bottom surface and a plurality of holes 4512b on its peripheral surface. Hole 4512a is sealed with gas-permeable sheet 457 disposed thereon. The pressure regulating valve further includes cap 4513 which is a roof-shaped member made of a rigid body and has a plurality of holes 4513a on its peripheral surface. The pressure regulating valve further includes elastic member 4514 which is a ring-shaped member made of an elastic material such as rubber.

In the pressure regulating valve of the present third embodiment thus structured, valve support member 4512 made of the rigid body is provided between ring-shaped elastic member 4514 and valve body 458 (more precisely, between ring-shaped elastic member 4514 and gas-permeable sheet 457). This can maintain the compressed state and hence the operating pressure of valve body 458.

Fourth Embodiment

The capacitor of a fourth embodiment differs from the capacitor of the first embodiment only in part of the pressure regulating valve. Therefore, like components are labeled with like reference numerals with respect to the first embodiment and the description of these components is not repeated here. The following description is focused on the differences between these embodiments with reference to drawings.

FIG. 6A is an exploded sectional view of a pressure regulating valve used in a capacitor according to a fourth embodiment of the present invention. FIG. 6B is a sectional view before assembly of the pressure regulating valve used in the capacitor according to the fourth embodiment of the present invention. FIG. 6C is a sectional view after assembly of the pressure regulating valve used in the capacitor according to the fourth embodiment of the present invention.

In 6A, 6B, and 6C, the pressure regulating valve includes valve compression member 4515 which is a roof-shaped member made of a rigid body. Valve compression member 4515 has hole 4515a at the center of its upper surface and screw portion 4515b on its peripheral surface. Valve compression member 4515 is provided on its upper surface with gas-permeable sheet 457 so as to seal hole 4515a.

The pressure regulating valve further includes cap 4516 which is a roof-shaped member made of a rigid body. Cap 4516 is provided on its peripheral surface with holes 4516a for communication with outside and also with screw portion 4516b. Valve compression member 4515 and cap 4516 are made of resin in the present fourth embodiment, but alternatively can be made of metal. The pressure regulating valve further includes elastic member 4517 which is ring-shaped member made of an elastic material such as rubber.

In the pressure regulating valve of the present fourth embodiment thus structured, gas-permeable sheet 457 is joined to the upper surface of valve compression member 4515 so as to seal hole 4515a. Then, gas-permeable sheet 457 and valve body 458 disposed thereon are covered with cap 4516. Then, screw portion 4516b of cap 4516 is screwed with screw portion 4515b of valve compression member 4515 so as to hold valve body 458 in the compressed state. This is pressed into annular wall 455b formed around the periphery of electrolyte filling hole 455a with elastic member 4517 interposed therebetween. As a result, the pressure regulating valve is attached as shown in FIG. 6C.

In the pressure regulating valve of the present fourth embodiment thus structured, valve compression member 4515 and cap 4516 screwed with each other maintain the holding power of valve body 458. In addition, the periphery of valve body 458 is joined to the upper surface of valve compression member 4515 in a large area so as to maintain the operating pressure of valve body 458.

Fifth Embodiment

The capacitor of a fifth embodiment differs from the capacitor of the first embodiment only in part of the pressure regulating valve. Therefore, like components are labeled with like reference numerals with respect to the first embodiment and the description of these components is not repeated here. The following description is focused on the differences between these embodiments with reference to drawings.

Figure 7A:
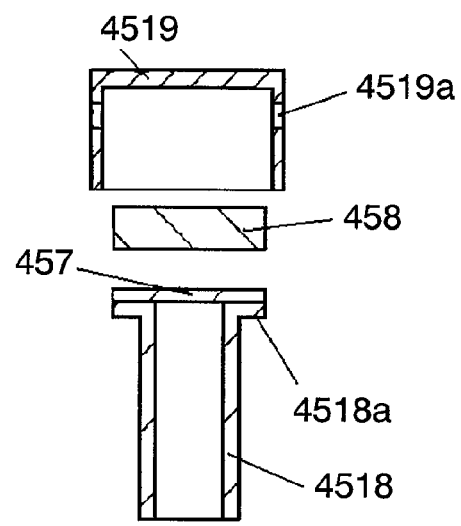
FIG. 7A is an exploded sectional view of a pressure regulating valve used in a capacitor according to a fifth embodiment of the present invention.
Figure 7B:
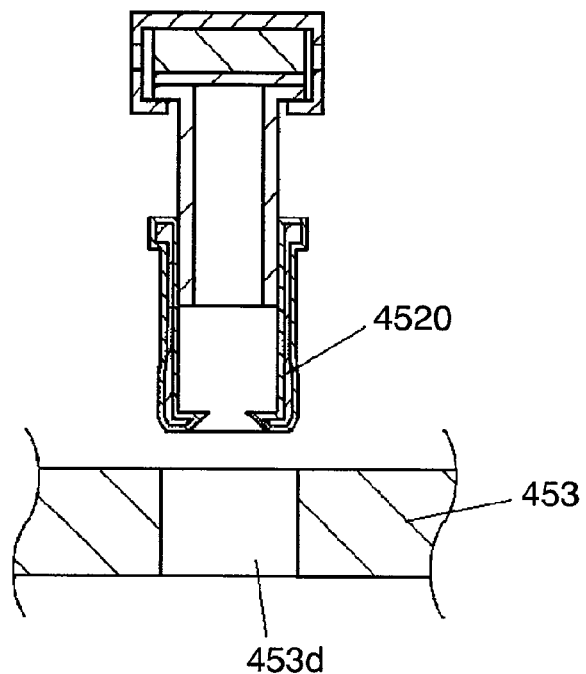
FIG. 7B is a sectional view before assembly of the pressure regulating valve used in the capacitor according to the fifth embodiment of the present invention.
Figure 7C:
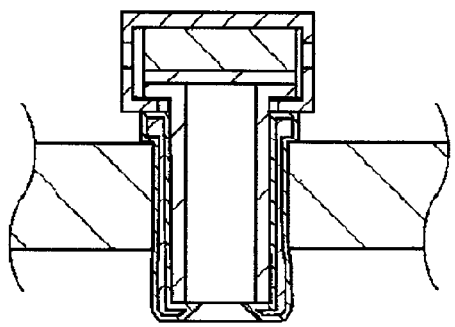
FIG. 7C is a sectional view after assembly of the pressure regulating valve used in the capacitor according to the fifth embodiment of the present invention.

FIG. 7A is an exploded sectional view of a pressure regulating valve used in a capacitor according to a fifth embodiment of the present invention. FIG. 7B is a sectional view before assembly of the pressure regulating valve used in the capacitor according to the fifth embodiment of the present invention. FIG. 7C is a sectional view after assembly of the pressure regulating valve used in the capacitor according to the fifth embodiment of the present invention.

In FIGS. 7A, 7B, and 7C, the pressure regulating valve includes valve holding member 4518 which is a cylindrical rigid body. Valve holding member 4518 is provided at one end thereof with flange 4518a. Flange 4518a, which is the upper surface of valve holding member 4518, is provided thereon with gas-permeable sheet 457 so as to seal the opening of the cylindrical body. The pressure regulating valve further includes cap 4519 which is a roof-shaped member made of a rigid body. Cap 4519 is provided on its peripheral surface with holes 4519a for communication with outside. Valve holding member 4518 and cap 4519 are made of metal in the present fifth embodiment, but alternatively can be made of resin. The pressure regulating valve further includes elastic member 4520 which is a cylindrical member made of an elastic material such as rubber.

In the pressure regulating valve of the present fifth embodiment thus structured, gas-permeable sheet 457 is joined to the upper surface of valve holding member 4518 so as to seal the hole. Then, gas-permeable sheet 457 and valve body 458 disposed thereon are covered with cap 4519. The open end of cap 4519 is caulked so as to couple them and to hold valve body 458 in the compressed state. This is inserted into elastic member 4520, and the cylindrical portion of elastic member 4520 is pressed into electrolyte filling hole 453d of terminal plate 453. As a result, the pressure regulating valve is attached as shown in FIG. 7C.

In the pressure regulating valve of the present fifth embodiment thus structured, electrolyte filling hole 453d of terminal plate 453 does not require a complicated process. This provides the pressure regulating valve at a low cost.

Sixth Embodiment

The capacitor of a sixth embodiment differs from the capacitor of the first embodiment only in part of the pressure regulating valve. Therefore, like components are labeled with like reference numerals with respect to the first embodiment and the description of these components is not repeated here. The following description is focused on the differences between these embodiments with reference to drawings.

Figure 8A:
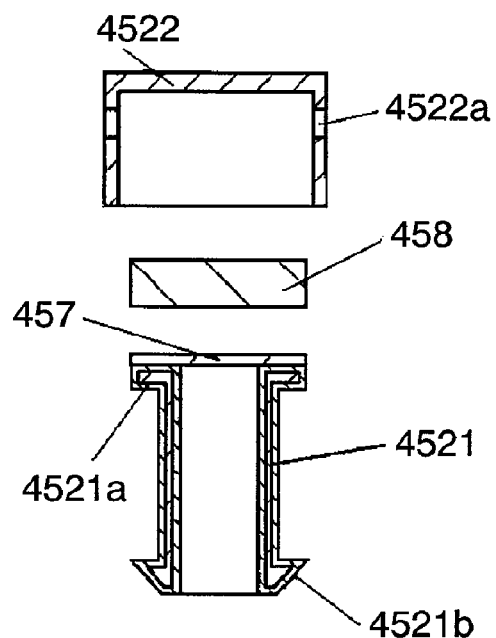
FIG. 8A is an exploded sectional view of a pressure regulating valve used in a capacitor according to a sixth embodiment of the present invention.
Figure 8B:
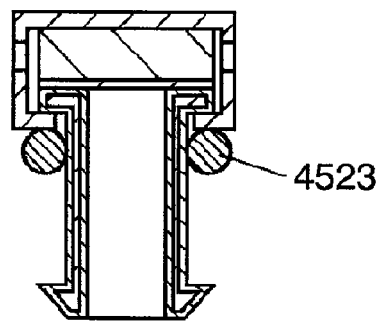
FIG. 8B is a sectional view before assembly of the pressure regulating valve used in the capacitor according to the sixth embodiment of the present invention.
Figure 8C:
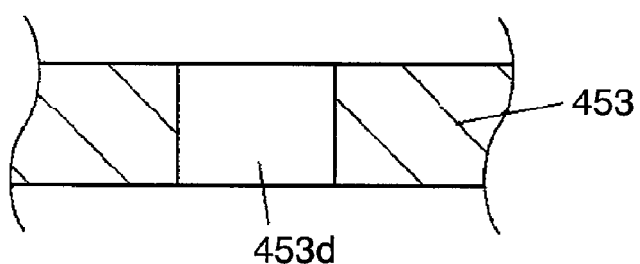
FIG. 8C is a sectional view after assembly of the pressure regulating valve used in the capacitor according to the sixth embodiment of the present invention.
Figure 8C:
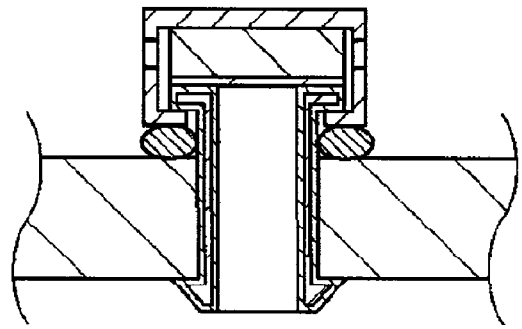

FIG. 8A is an exploded sectional view of a pressure regulating valve used in a capacitor according to a sixth embodiment of the present invention. FIG. 8B is a sectional view before assembly of the pressure regulating valve used in the capacitor according to the sixth embodiment of the present invention. FIG. 8C is a sectional view after assembly of the pressure regulating valve used in the capacitor according to the sixth embodiment of the present invention.

In FIGS. 8A, 8B, and 8C, the pressure regulating valve includes elastic member 4521, which is a cylindrical member made of an elastic material such as rubber. Elastic member 4521 is provided at one end thereof with flange 4521a and at the other end thereof with engaging section 4521b protruding outwardly. Flange 4521a, which is the upper surface of elastic member 4521, is provided thereon with gas-permeable sheet 457 so as to seal the opening of the cylindrical body. The pressure regulating valve further includes cap 4522 provided on its peripheral surface with holes 4522a for communication with outside. Cap 4522 is made of metal in the present sixth embodiment, but alternatively can be made of resin. The pressure regulating valve further includes O-ring 4523 made of rubber.

In the pressure regulating valve of the present sixth embodiment thus structured, gas-permeable sheet 457 is joined to the upper surface of elastic member 4521 so as to seal the hole. Then, gas-permeable sheet 457 and valve body 458 disposed thereon are covered with cap 4522. Then, the open end of cap 4522 is caulked so as to couple them and to hold valve body 458 in the compressed state. Then, the cylindrical portion (main body) including engaging section 4521b of elastic member 4521 is pressed into electrolyte filling hole 453d of terminal plate 453 with O-ring 4523 interposed therebetween. As a result, the pressure regulating valve is attached as shown in FIG. 8C.

In the pressure regulating valve of the present sixth embodiment thus structured, elastic member 4521 having the function of holding valve body 458 contributes to a decrease in the number of components, thereby providing the pressure regulating valve at a low cost.

Seventh Embodiment

The capacitor of a seventh embodiment differs from the capacitor of the sixth embodiment only in part of the pressure regulating valve. Therefore, like components are labeled with like reference numerals with respect to the first embodiment and the description of these components is not repeated here. The following description is focused on the differences between these embodiments with reference to drawings.

Figure 9A:
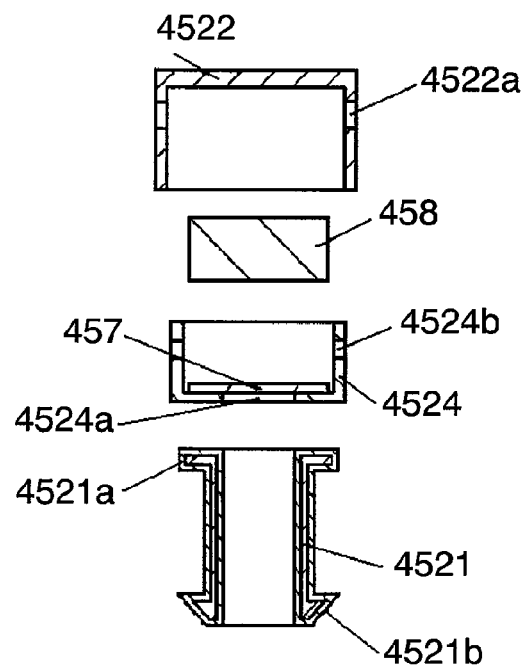
FIG. 9A is an exploded sectional view of a pressure regulating valve used in a capacitor according to a seventh embodiment of the present invention.
Figure 9B:
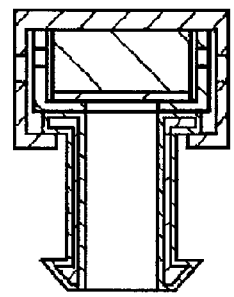
FIG. 9B is a sectional view before assembly of the pressure regulating valve used in the capacitor according to the seventh embodiment of the present invention.
Figure 9B:
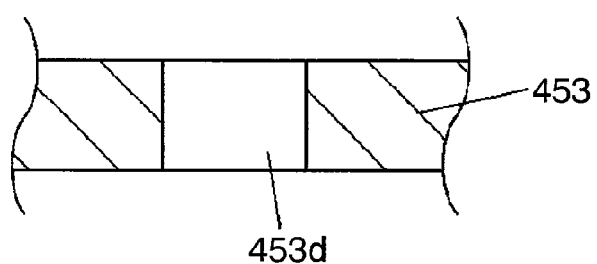
Figure 9C:
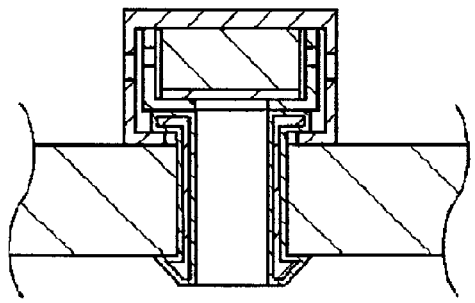
FIG. 9C is a sectional view after assembly of the pressure regulating valve used in the capacitor according to the seventh embodiment of the present invention.

FIG. 9A is an exploded sectional view of a pressure regulating valve used in a capacitor according to a seventh embodiment of the present invention. FIG. 9B is a sectional view before assembly of the pressure regulating valve used in the capacitor according to the seventh embodiment of the present invention. FIG. 9C is a sectional view after assembly of the pressure regulating valve used in the capacitor according to the seventh embodiment of the present invention.

In FIGS. 9A, 9B, and 9C, the pressure regulating valve includes valve support member 4524, which is a box-shaped member made of a rigid body. Valve support member 4524 has hole 4524a at the center of its bottom surface and a plurality of holes 4524b on its peripheral surface. Hole 4524a is sealed with gas-permeable sheet 457 disposed thereon. Cap 4522 is the roof-shaped member made of a rigid body, and has the plurality of holes 4522a on its peripheral surface. The open end of cap 4522 is caulked so as to couple them and to hold valve body 458 in the compressed state.

In the pressure regulating valve of the present seventh embodiment thus structured, valve support member 4524 made of the rigid body is provided between flange 4521a of cylindrical elastic member 4521 and valve body 458 (more precisely, between flange 4521a of cylindrical elastic member 4521 and gas-permeable sheet 7). This can maintain the compressed state and hence the operating pressure of valve body 458. Note that O-ring 4523 used in the sixth embodiment is dispensable in this structure.

Eighth Embodiment

The capacitor of an eighth embodiment differs from the capacitor of the first embodiment only in part of the pressure regulating valve. Therefore, like components are labeled with like reference numerals with respect to the first embodiment and the description of these components is not repeated here. The following description is focused on the differences between these embodiments with reference to drawings.

Figure 10A:
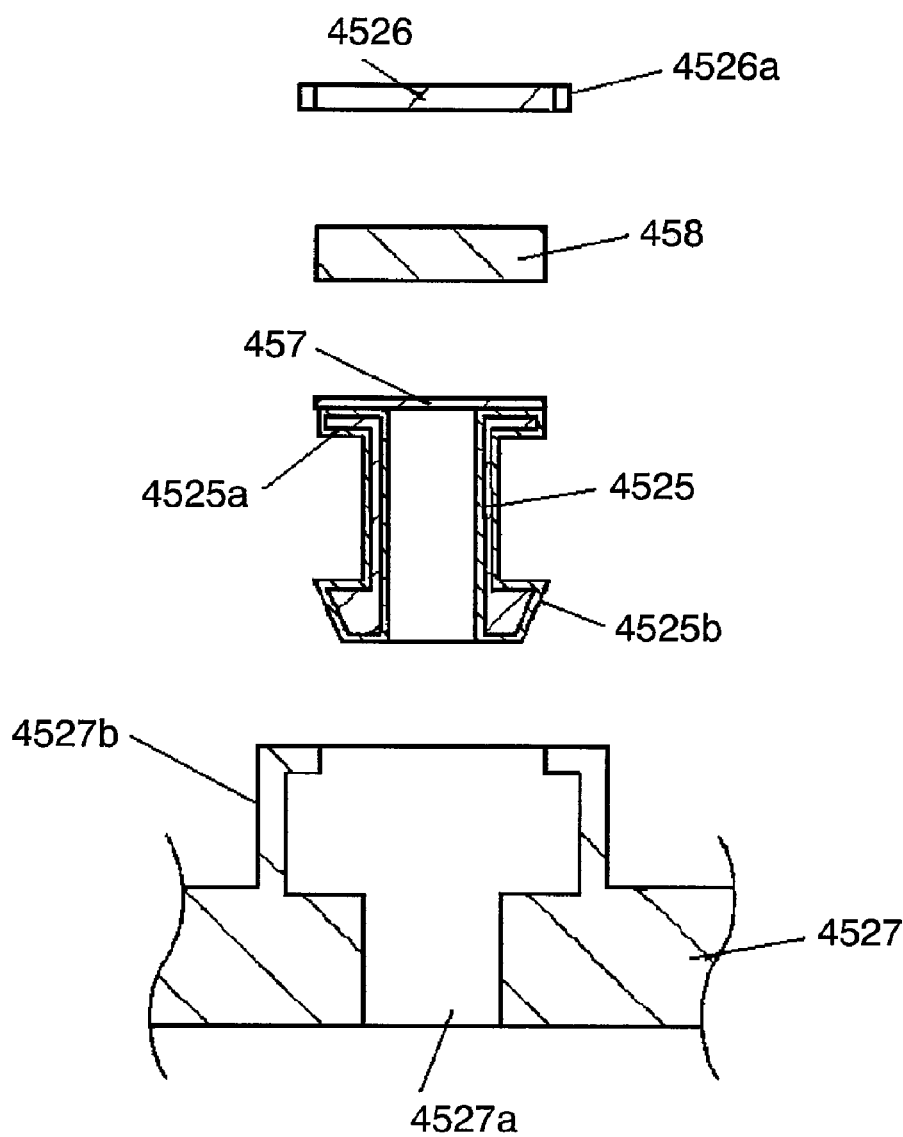
FIG. 10A is an exploded sectional view of a pressure regulating valve used in a capacitor according to an eighth embodiment of the present invention.
Figure 10B:
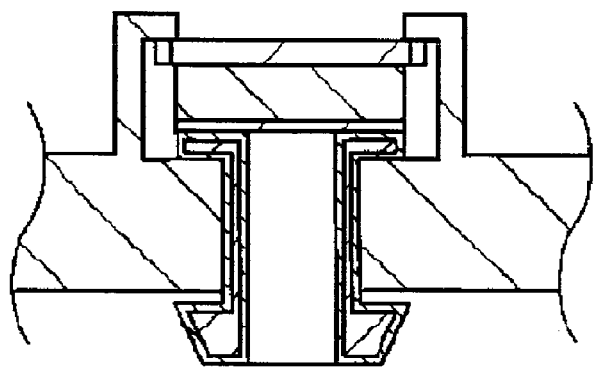
FIG. 10B is a sectional view after assembly of the pressure regulating valve used in the capacitor according to the eighth embodiment of the present invention.

FIG. 10A is an exploded sectional view of a pressure regulating valve used in a capacitor according to an eighth embodiment of the present invention. FIG. 10B is a sectional view after assembly of the pressure regulating valve used in the capacitor according to the eighth embodiment of the present invention.

In FIGS. 10A and 10B, the pressure regulating valve includes elastic member 4525, which is a cylindrical member made of an elastic material such as rubber. Elastic member 4525 is provided at one end thereof with flange 4525a and at the other end thereof with engaging section 4525b protruding outwardly. Flange 4525a, which is the upper surface of elastic member 4525, is provided thereon with gas-permeable sheet 457 so as to seal the opening of the cylindrical body. The pressure regulating valve further includes cover 4526, which is made of a rigid body and has notches 4526a on its peripheral surface. Notches 4526a can be replaced by holes. Cover 4526 is made of metal in the present eighth embodiment, but alternatively can be made of resin.

In the pressure regulating valve of the present eighth embodiment thus structured, gas-permeable sheet 457 is joined to the upper surface of elastic member 4525 so as to seal the hole. Then, gas-permeable sheet 457, valve body 458, and cover 4526 stacked in this order are pressed into electrolyte filling hole 4527a of terminal plate 4527. Then, the end of annular wall 4527b formed around the periphery of hole 4527a is caulked so as to couple them and to hold valve body 458 in the compressed state. As a result, the pressure regulating valve is attached as shown in FIG. 10B.

The pressure regulating valve of the present eighth embodiment thus structured can be produced at a lower cost than the pressure regulating valve of the sixth embodiment because O-ring 4523 is unnecessary.

Figure 11A:
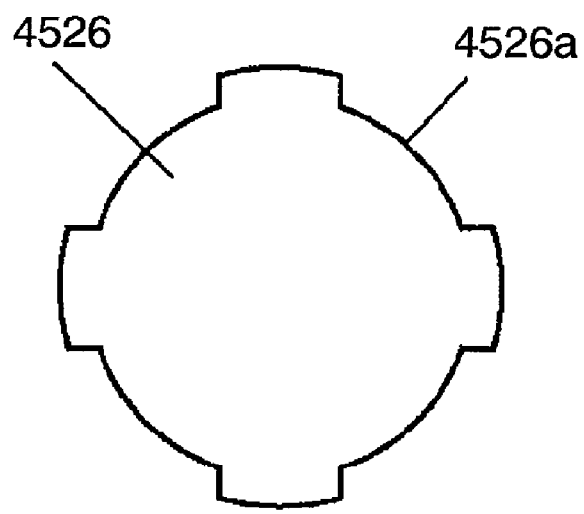
FIG. 11A is a plan view showing a cover of the capacitor according to the eighth embodiment of the present invention.
Figure 11B:
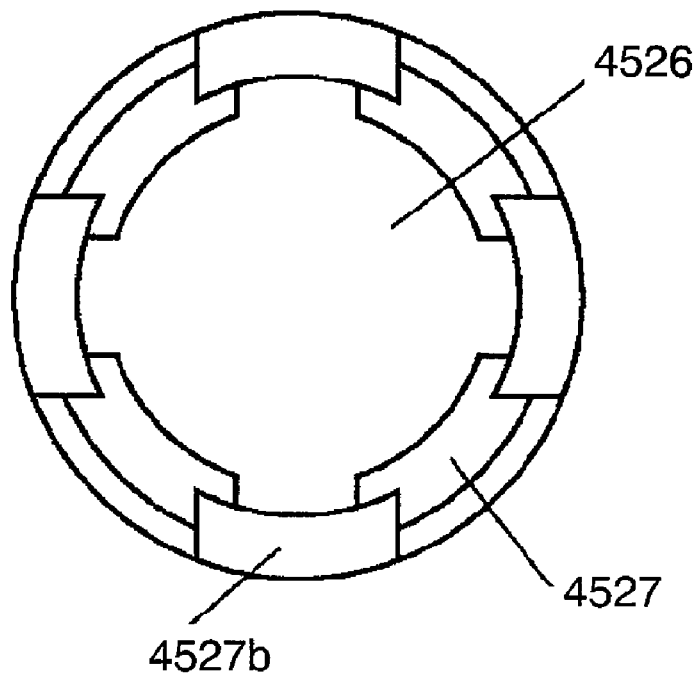
FIG. 11B is a plan view of the pressure regulating valve to which the cover is caulked in the capacitor according to the eighth embodiment of the present invention.

FIG. 11A is a plan view showing a cover of the capacitor according to the eighth embodiment of the present invention. FIG. 11B is a plan view of the pressure regulating valve to which the cover is caulked in the capacitor according to the eighth embodiment of the present invention. In FIGS. 11A and 11B, cover 4526 is caulked in the area excluding notches 4526a.

Figure 12A:
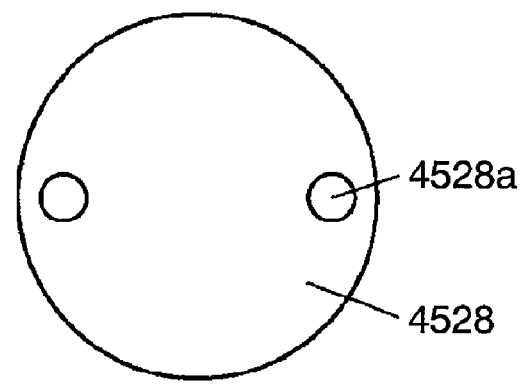
FIG. 12A is a plan view of a cover having holes instead of notches in the capacitor according to the eighth embodiment of the present invention.
Figure 12B:
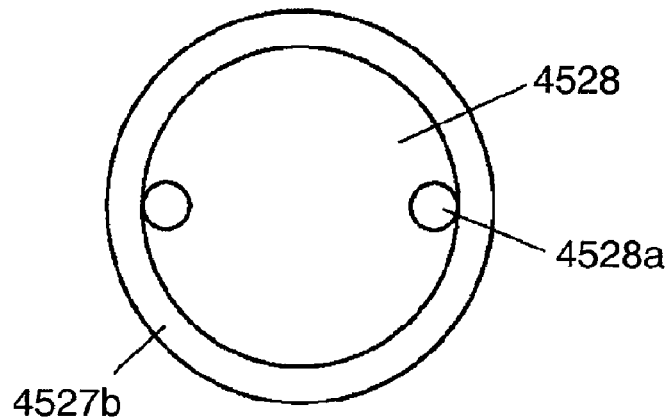
FIG. 12B is a plan view of the pressure regulating valve to which the cover is caulked throughout its circumference in the capacitor according to the eighth embodiment of the present invention.
Figure 12C:
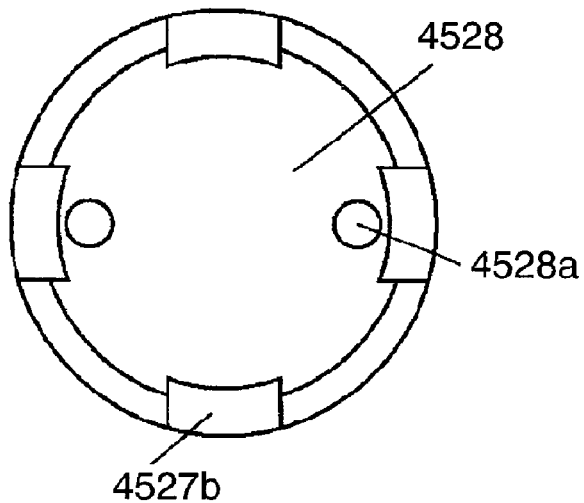
FIG. 12C is a plan view of the pressure regulating valve to which the cover is partially caulked around its circumference in the capacitor according to the eighth embodiment of the present invention.

FIG. 12A is a plan view of a cover having holes instead of notches in the capacitor according to the eighth embodiment of the present invention. FIG. 12B is a plan view of the pressure regulating valve to which the cover is caulked throughout its circumference in the capacitor according to the eighth embodiment of the present invention. FIG. 12C is a plan view of the pressure regulating valve to which the cover is partially caulked around its circumference in the capacitor according to the eighth embodiment of the present invention. As shown in FIGS. 12A, 12B, and 12C, the cover can be provided with either notches or holes and can be caulked either throughout its circumference or partially around its circumference.

Ninth Embodiment

The capacitor of a ninth embodiment differs from the capacitor of the eighth embodiment only in part of the pressure regulating valve. Therefore, like components are labeled with like reference numerals with respect to the eighth embodiment and the description of these components is not repeated here. The following description is focused on the differences between these embodiments with reference to drawings.

FIG. 13A is an exploded sectional view of a pressure regulating valve used in a capacitor according to a ninth embodiment of the present invention. FIG. 13B is a sectional view after assembly of the pressure regulating valve used in the capacitor according to the ninth embodiment of the present invention.

In FIGS. 13A and 13B, the pressure regulating valve includes cover 4528 made of a rigid body. Cover 4528 has engaging sections 4528a, which are holes formed therein. Cover 4528 is made of metal in the present ninth embodiment, but alternatively can be made of resin.

In the pressure regulating valve of the present ninth embodiment thus structured, gas-permeable sheet 457 is joined to the upper surface of elastic member 4525 so as to seal the hole. Then, gas-permeable sheet 457, valve body 458, and cover 4528 stacked in this order are pressed into electrolyte filling hole 4529a of terminal plate 4529. At the same time, engaging sections 4528a of cover 4528 are fitted into the engaging section 4529c protruding outwardly (or inwardly) at the end of annular wall 4529b formed around the periphery of hole 4529a so as to couple them and to hold valve body 458 in the compressed state. As a result, the pressure regulating valve is attached as shown in FIG. 13B.

In the pressure regulating valve of the present ninth embodiment thus structured, it is unnecessary to caulk the end of the wall of the terminal plate, thereby performing the assembly operation more easily than in the eighth embodiment and maintaining the operating pressure of the valve body stably by high dimensional accuracy.

Tenth Embodiment

The capacitor of a tenth embodiment differs from the capacitor of the ninth embodiment only in part of the pressure regulating valve. Therefore, like components are labeled with like reference numerals with respect to the first embodiment and the description of these components is not repeated here. The following description is focused on the differences between these embodiments with reference to drawings.

Figure 14A:
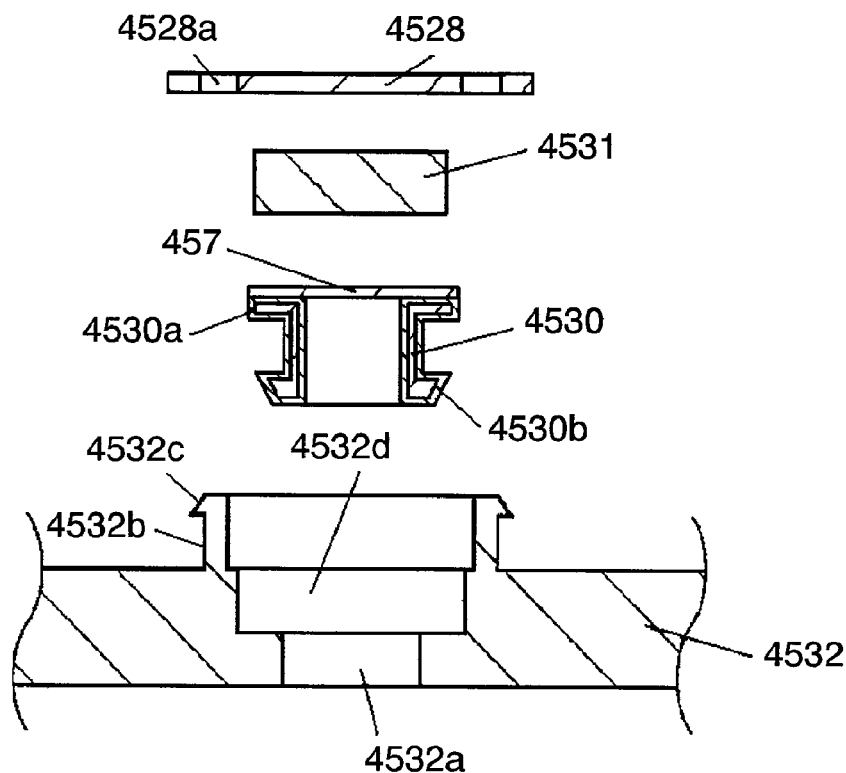
FIG. 14A is an exploded sectional view of a pressure regulating valve used in a capacitor according to a tenth embodiment of the present invention.
Figure 14B:
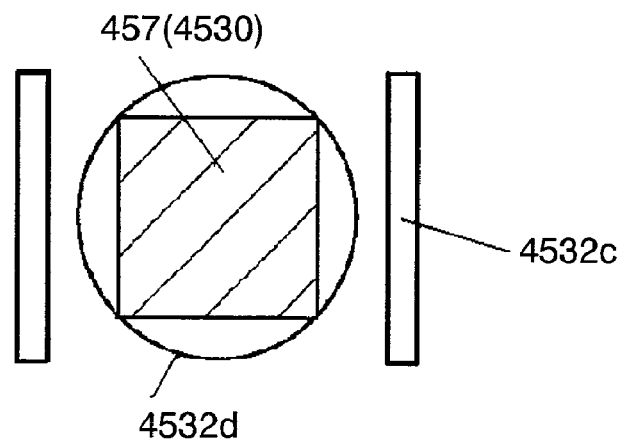
FIG. 14B is a plan view of an essential part excluding a cover of the capacitor according to the tenth embodiment of the present invention.
Figure 14C:
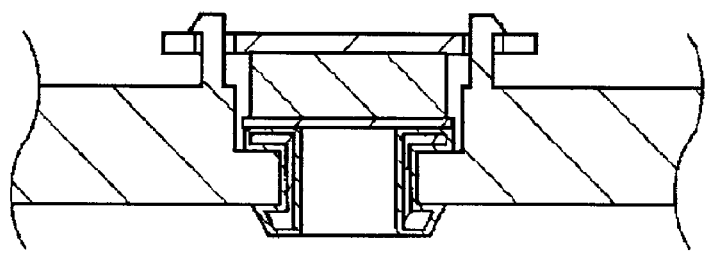
FIG. 14C is a sectional view after assembly of the pressure regulating valve used in the capacitor according to the tenth embodiment of the present invention.
Figure 15:
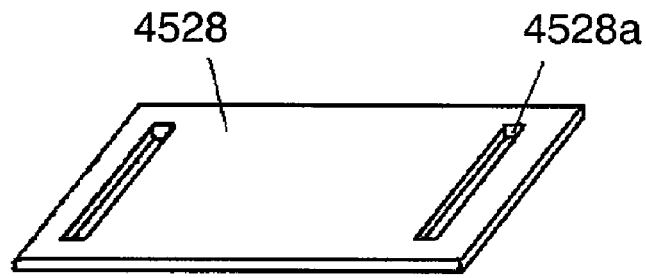
FIG. 15 is a perspective view of FIG. 14A.
Figure 15:
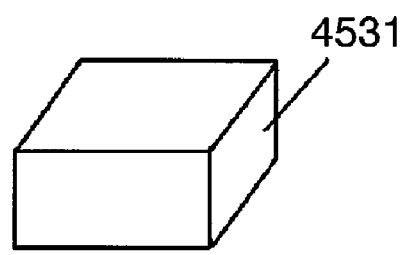
Figure 15:
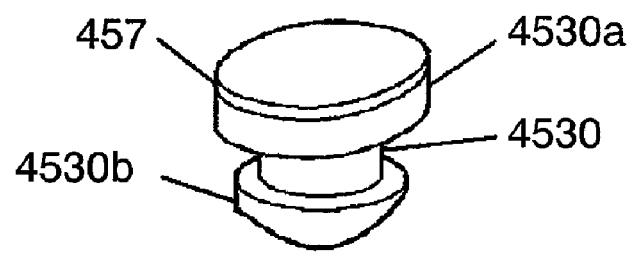
Figure 15:
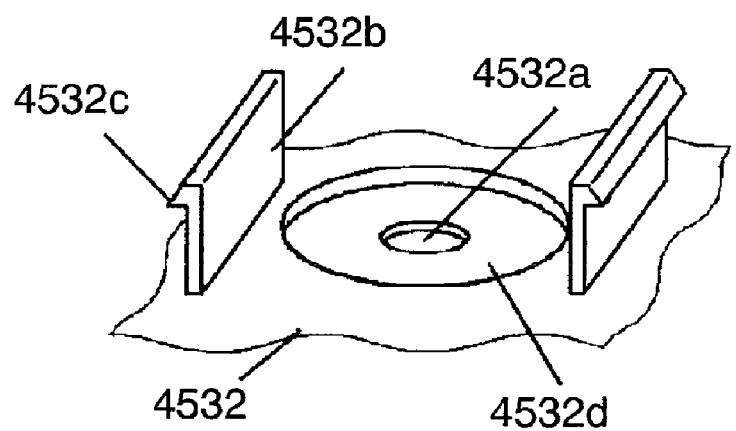

FIG. 14A is an exploded sectional view of a pressure regulating valve used in a capacitor according to a tenth embodiment of the present invention. FIG. 14B is a plan view of an essential part excluding a cover of the capacitor according to the tenth embodiment of the present invention. FIG. 14C is a sectional view after assembly of the pressure regulating valve used in the capacitor according to the tenth embodiment of the present invention. FIG. 15 is a perspective view of FIG. 14A.

In FIGS. 14A, 14B, 14C, and 15, the pressure regulating valve includes elastic member 4530 which is a cylindrical member made of an elastic material such as rubber. Elastic member 4530 is provided at one end thereof with flange 4530a and at the other end thereof with engaging section 4530b protruding outwardly. Flange 4530a, which is the upper surface of elastic member 4530, is provided thereon with gas-permeable sheet 457 so as to seal the opening of the cylindrical body. The pressure regulating valve further includes valve body 4531 which is a square member made of an elastic material such as rubber.

The pressure regulating valve further includes terminal plate 4532 having has electrolyte filling hole 4532a and walls 4532b formed in the upper portion of the periphery of hole 4532a. Walls 4532b are provided at their ends with engaging sections 4532c protruding outwardly (or inwardly). Terminal plate 4532 further has depression 4532d into which each corner of valve body 4531 is closely fitted.

In the pressure regulating valve of the present tenth embodiment thus structured, gas-permeable sheet 457 is joined to the upper surface of elastic member 4530 so as to seal the hole. Then, gas-permeable sheet 457, square-shaped valve body 4531, and square-shaped cover 4528 stacked in this order are pressed into electrolyte filling hole 4532a of terminal plate 4532. At the same time, engaging sections 4528a of cover 4528 are fitted into engaging sections 4532c formed at each end of the pair of walls 4532b formed near the periphery of hole 4532a so as to couple them and to hold valve body 4531 in the compressed state. As a result, the pressure regulating valve is attached as shown in FIG. 14C.

In the pressure regulating valve of the present tenth embodiment thus structured, each corner of square-shaped valve body 4531 is in contact with the inner wall surfaces of depression 4532d of terminal plate 4532. This makes it easier to position valve body 4531 than in the pressure regulating valve of the ninth embodiment and can maintain the operating pressure of the valve body stably by high dimensional accuracy.

Eleventh Embodiment

The capacitor of an eleventh embodiment differs from the capacitor of the first embodiment only in part of the pressure regulating valve. Therefore, like components are labeled with like reference numerals with respect to the first embodiment and the description of these components is not repeated here. The following description is focused on the differences between these embodiments with reference to drawings.

Figure 16A:
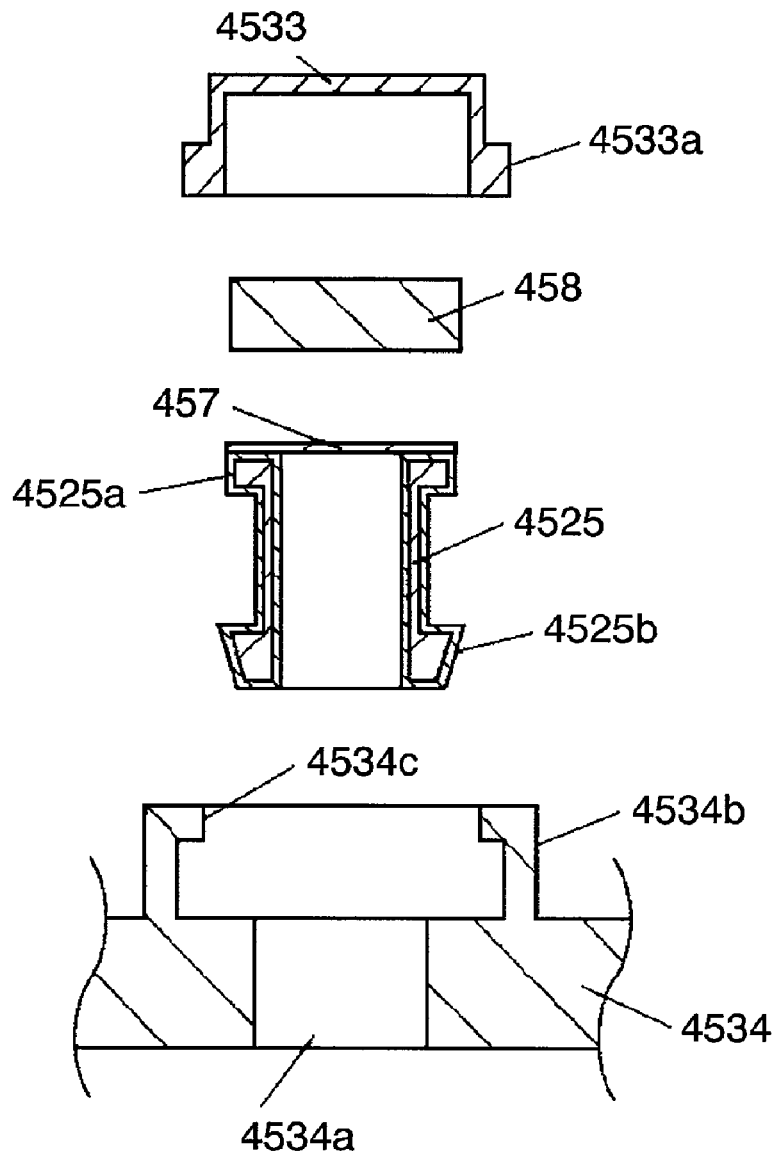
FIG. 16A is an exploded sectional view of a pressure regulating valve used in a capacitor according to an eleventh embodiment of the present invention.
Figure 16B:
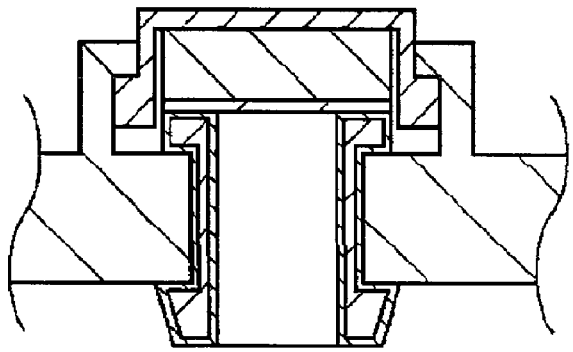
FIG. 16B is a sectional view after assembly of the pressure regulating valve used in the capacitor according to the eleventh embodiment of the present invention.

FIG. 16A is an exploded sectional view of a pressure regulating valve used in a capacitor according to an eleventh embodiment of the present invention. FIG. 16B is a sectional view after assembly of the pressure regulating valve used in the capacitor according to the eleventh embodiment of the present invention.

In FIGS. 16A and 16B, elastic member 4525 is the cylindrical member made of the elastic material such as rubber and provided at one end thereof with flange 4525a and at the other end thereof with engaging section 4525b protruding outwardly. Flange 4525a, which is the upper surface of elastic member 4525, is provided thereon with gas-permeable sheet 457 so as to seal the opening of the cylindrical body. The pressure regulating valve further includes cap 4533, which is made of a rigid body and provided around its bottom periphery with engaging section 4533a protruding outwardly. Cap 4533 is made of metal in the present eleventh embodiment, but alternatively can be made of resin.

The pressure regulating valve further includes terminal plate 4534. Terminal plate 4534 has electrolyte filling hole 4534a and wall 4534b, which is annularly formed in the upper portion of the periphery of hole 4534a. Wall 4534b is provided at its end with engaging section 4534c protruding inwardly.

In the pressure regulating valve of the present eleventh embodiment thus structured, gas-permeable sheet 457 is joined to the upper surface of elastic member 4525 so as to seal the hole. Then, gas-permeable sheet 457, valve body 458, and cap 4533 stacked in this order are pressed into electrolyte filling hole 4534a of terminal plate 4534 so as to engage engaging section 4525b of elastic member 4525 with the inner surface of terminal plate 4534. At the same time, engaging section 4533a of cap 4533 is engaged with engaging section 4534c of terminal plate 4534 so as to couple them and to hold valve body 458 in the compressed state. As a result, the pressure regulating valve is attached as shown in FIG. 16B.

In the pressure regulating valve of the present eleventh embodiment thus structured, it is unnecessary to caulk the end of the wall of the terminal plate, thereby performing the assembly operation easily and maintaining the operating pressure of the valve body stably by high dimensional accuracy.

Twelfth Embodiment

The capacitor of a twelfth embodiment differs from the capacitor of the eleventh embodiment only in part of the pressure regulating valve. Therefore, like components are labeled with like reference numerals with respect to the eleventh embodiment and the description of these components is not repeated here. The following description is focused on the differences between these embodiments with reference to drawings.

Figure 17A:
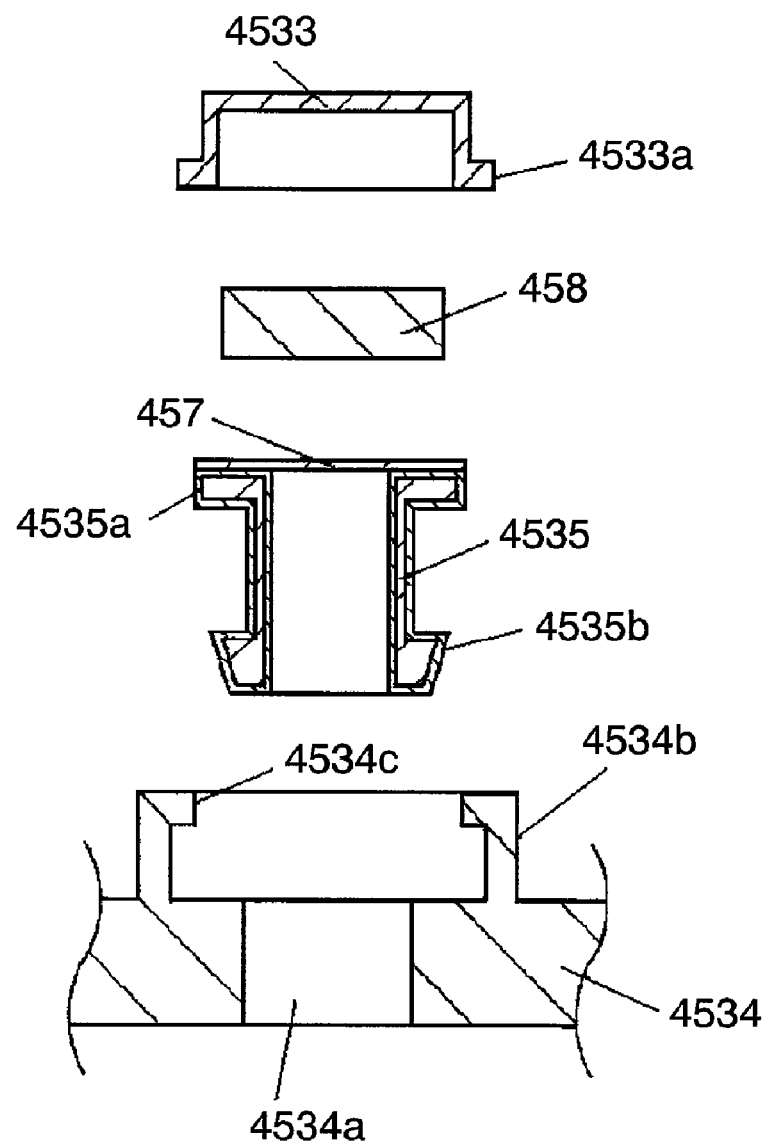
FIG. 17A is an exploded sectional view of a pressure regulating valve used in a capacitor according to a twelfth embodiment of the present invention.
Figure 17B:
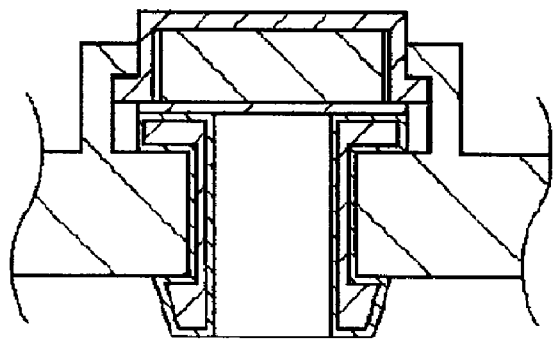
FIG. 17B is a sectional view after assembly of the pressure regulating valve used in the capacitor according to the twelfth embodiment of the present invention.

FIG. 17A is an exploded sectional view of a pressure regulating valve used in a capacitor according to a twelfth embodiment of the present invention. FIG. 17B is a sectional view after assembly of the pressure regulating valve used in the capacitor according to the twelfth embodiment of the present invention.

In FIGS. 17A and 17B, the pressure regulating valve includes elastic member 4535, which is a cylindrical member made of an elastic material such as rubber. Elastic member 4535 is provided at one end thereof with flange 4535a and at the other end thereof with engaging section 4535b protruding outwardly. Flange 4535a of elastic member 4535 has a much larger outer diameter than valve body 458 as compared with flange 4525a of elastic member 4525 of the eleventh embodiment. In the case where valve body 458 is square, this means that the outer diameter of flange 4535a is larger than the length of the diagonal.

In the pressure regulating valve of the present twelfth embodiment thus structured, flange 4535a of elastic member 4535 pushes up cap 4533, so that the operating pressure of valve body 458 can be maintained.

Thirteenth Embodiment

The capacitor of a thirteenth embodiment differs from the capacitor of the eleventh embodiment only in part of the pressure regulating valve. Therefore, like components are labeled with like reference numerals with respect to the eleventh embodiment and the description of these components is not repeated here. The following description is focused on the differences between these embodiments with reference to drawings.

Figure 18A:
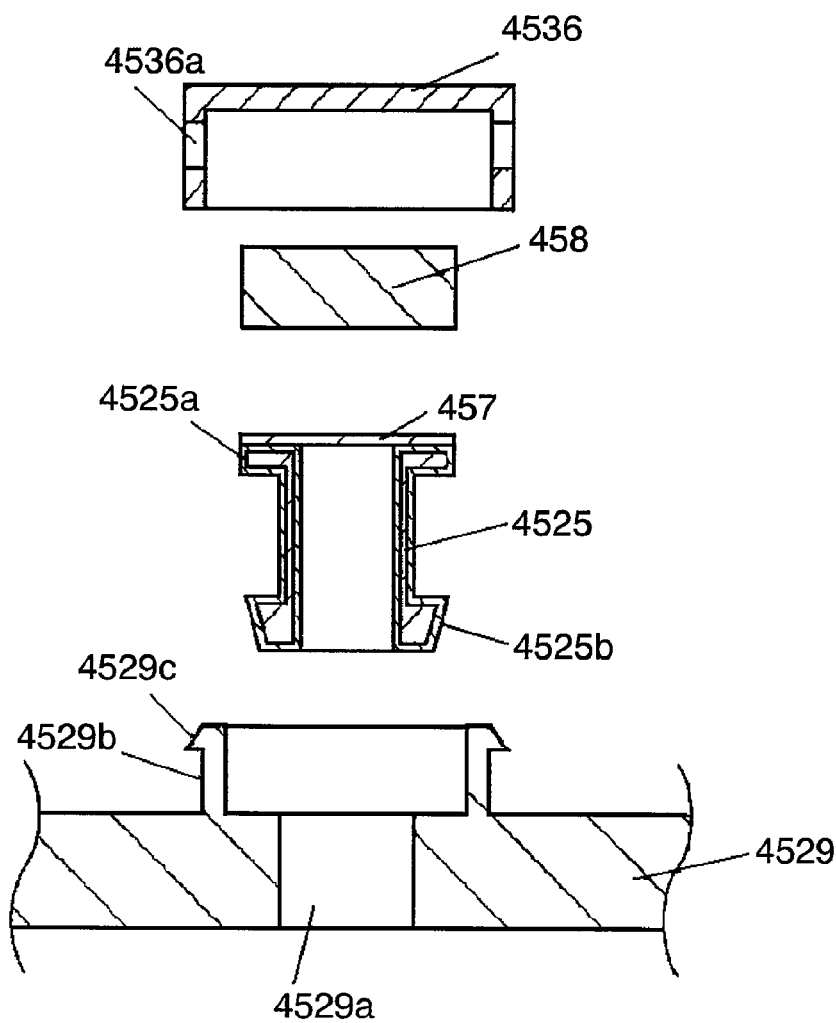
FIG. 18A is an exploded sectional view of a pressure regulating valve used in a capacitor according to a thirteenth embodiment of the present invention.
Figure 18B:
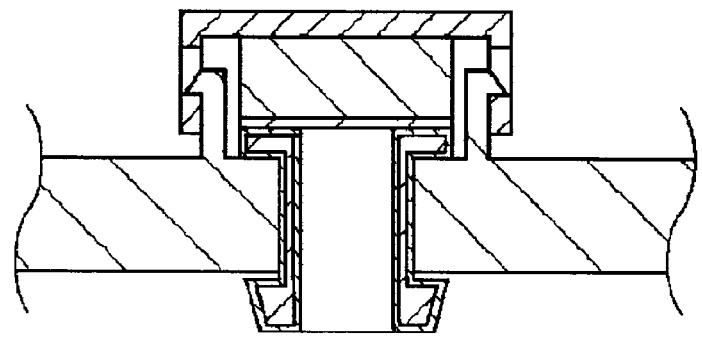
FIG. 18B is a sectional view after assembly of the pressure regulating valve used in the capacitor according to the thirteenth embodiment of the present invention.

FIG. 18A is an exploded sectional view of a pressure regulating valve used in a capacitor according to a thirteenth embodiment of the present invention. FIG. 18B is a sectional view after assembly of the pressure regulating valve used in the capacitor according to the thirteenth embodiment of the present invention.

In FIGS. 18A and 18B, elastic member 4525 is the cylindrical member made of the elastic material such as rubber and provided at one end thereof with flange 4525a and at the other end thereof with engaging section 4525b protruding outwardly. Flange 4525a, which is the upper surface of elastic member 4525, is provided thereon with gas-permeable sheet 457 so as to seal the opening of the cylindrical body. The pressure regulating valve further includes cap 4536, which is made of a rigid body and provided on its peripheral surface with engaging sections 4536a. Cap 4536 is made of metal in the present thirteenth embodiment, but alternatively can be made of resin.

In the pressure regulating valve of the present thirteenth embodiment thus structured, gas-permeable sheet 457 is joined to the upper surface of elastic member 4525 so as to seal the hole. Then, gas-permeable sheet 457, valve body 458, and cap 4536 stacked in this order are pressed into electrolyte filling hole 4529*a* of terminal plate 4529 so as to engage engaging section 4525*b* of elastic member 4525 with the inner surface of terminal plate 4529. At the same time, engaging section 4529*c* of terminal plate 4529 is engaged with engaging sections 4536*a* of cap 4536 so as to couple them and to hold valve body 458 in the compressed state. As a result, the pressure regulating valve is attached as shown in FIG. 18B.

In the pressure regulating valve of the present thirteenth embodiment thus structured, it is unnecessary to caulk the end of the wall of the terminal plate, thereby performing the assembly operation easily and maintaining the operating pressure of the valve body stably by high dimensional accuracy.

Fourteenth Embodiment

The capacitor of a fourteenth embodiment differs from the capacitor of the eleventh embodiment only in part of the pressure regulating valve. Therefore, like components are labeled with like reference numerals with respect to the first embodiment and the description of these components is not repeated here. The following description is focused on the differences between these embodiments with reference to drawings.

Figure 19A:
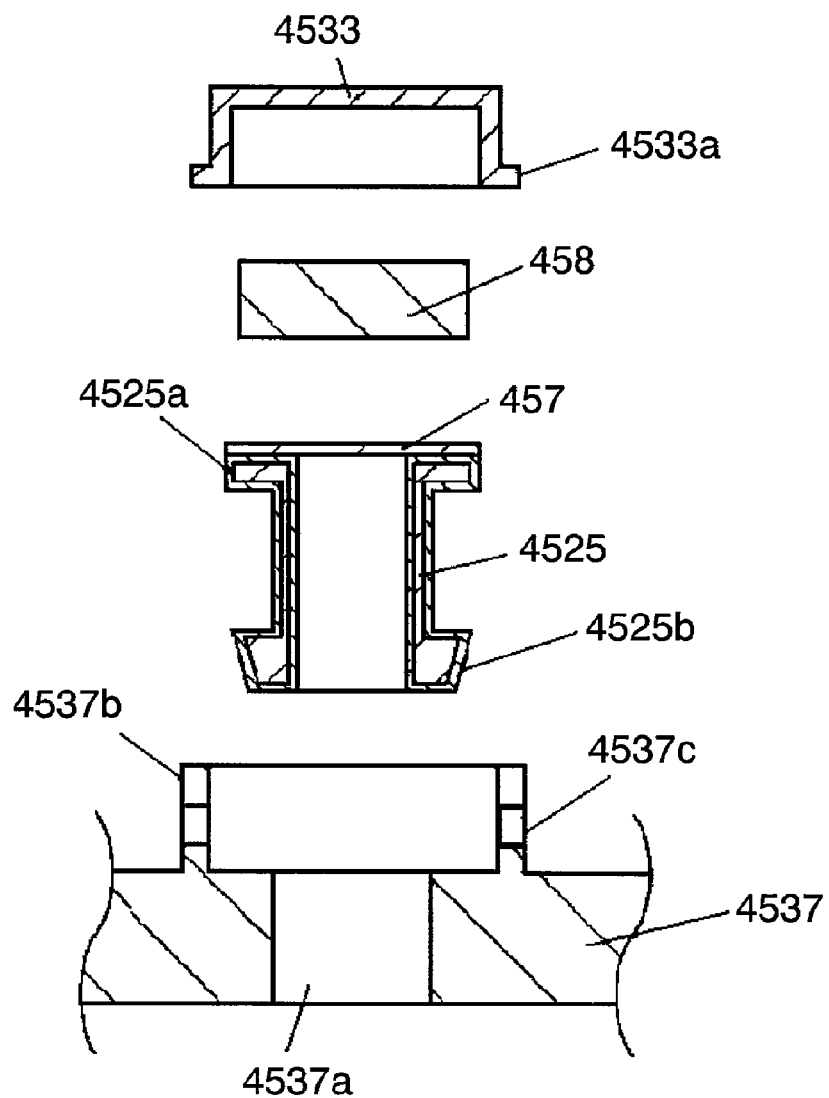
FIG. 19A is an exploded sectional view of a pressure regulating valve used in a capacitor according to a fourteenth embodiment of the present invention.
Figure 19B:
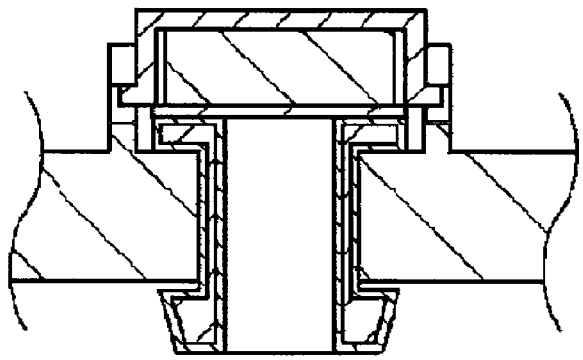
FIG. 19B is a sectional view after assembly of the pressure regulating valve used in the capacitor according to the fourteenth embodiment of the present invention.

FIG. 19A is an exploded sectional view of a pressure regulating valve used in a capacitor according to a fourteenth embodiment of the present invention. FIG. 19B is a sectional view after assembly of the pressure regulating valve used in the capacitor according to the fourteenth embodiment of the present invention.

In FIGS. 19A and 19B, the pressure regulating valve includes terminal plate 4537 having electrolyte filling hole 4537*a* and wall 4537*b*. Wall 4537*b* is formed in the upper portion of the periphery of hole 4537*a* and provided with engaging sections 4537*c*, which are holes formed therein.

In the pressure regulating valve of the present fourteenth embodiment thus structured, gas-permeable sheet 457 is joined to the upper surface of elastic member 4525 so as to seal the hole. Then, gas-permeable sheet 457, valve body 458, and cap 4533 stacked in this order are pressed into electrolyte filling hole 4537*a* of terminal plate 4537 so as to engage engaging section 4525*b* of elastic member 4525 with the inner surface of terminal plate 4537. At the same time, engaging section 4533*a* on the bottom periphery of cap 4533 is engaged with engaging sections 4537*c* of terminal plate 4537 so as to couple them and to hold valve body 458 in the compressed state. As a result, the pressure regulating valve is attached as shown in FIG. 19B.

In the pressure regulating valve of the present fourteenth embodiment thus structured, it is unnecessary to caulk the end of the wall of the terminal plate, thereby performing the assembly operation easily and maintaining the operating pressure of the valve body stably by high dimensional accuracy.

Fifteenth Embodiment

The capacitor of a fifteenth embodiment differs from the capacitor of the eleventh embodiment only in part of the pressure regulating valve. Therefore, like components are labeled with like reference numerals with respect to the eleventh embodiment and the description of these components is not repeated here. The following description is focused on the differences between these embodiments with reference to drawings.

Figure 20A:
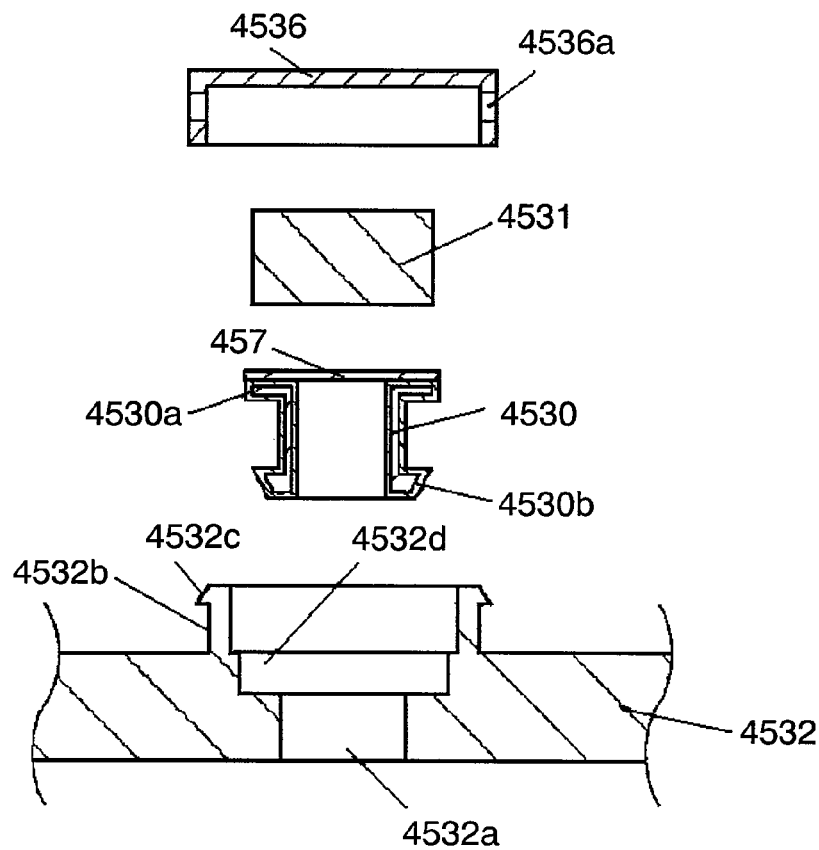
FIG. 20A is an exploded sectional view of a pressure regulating valve used in a capacitor according to a fifteenth embodiment of the present invention.
Figure 20B:
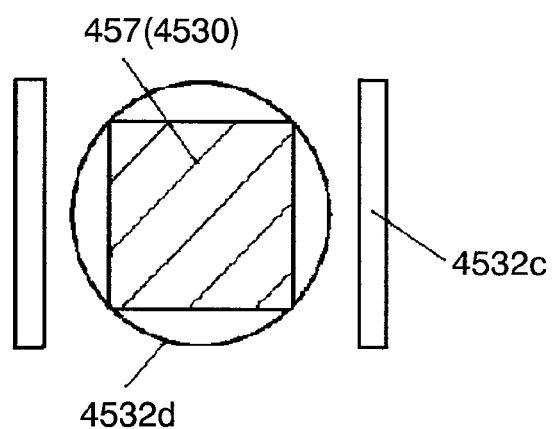
FIG. 20B is a plan view of an essential part excluding a cover of the capacitor according to the fifteenth embodiment of the present invention.
Figure 20C:
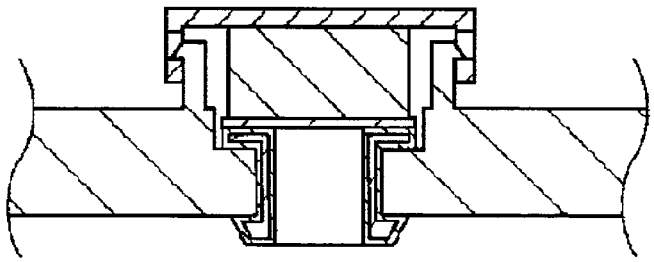
FIG. 20C is a sectional view after assembly of the pressure regulating valve used in the capacitor according to the fifteenth embodiment of the present invention.
Figure 21:
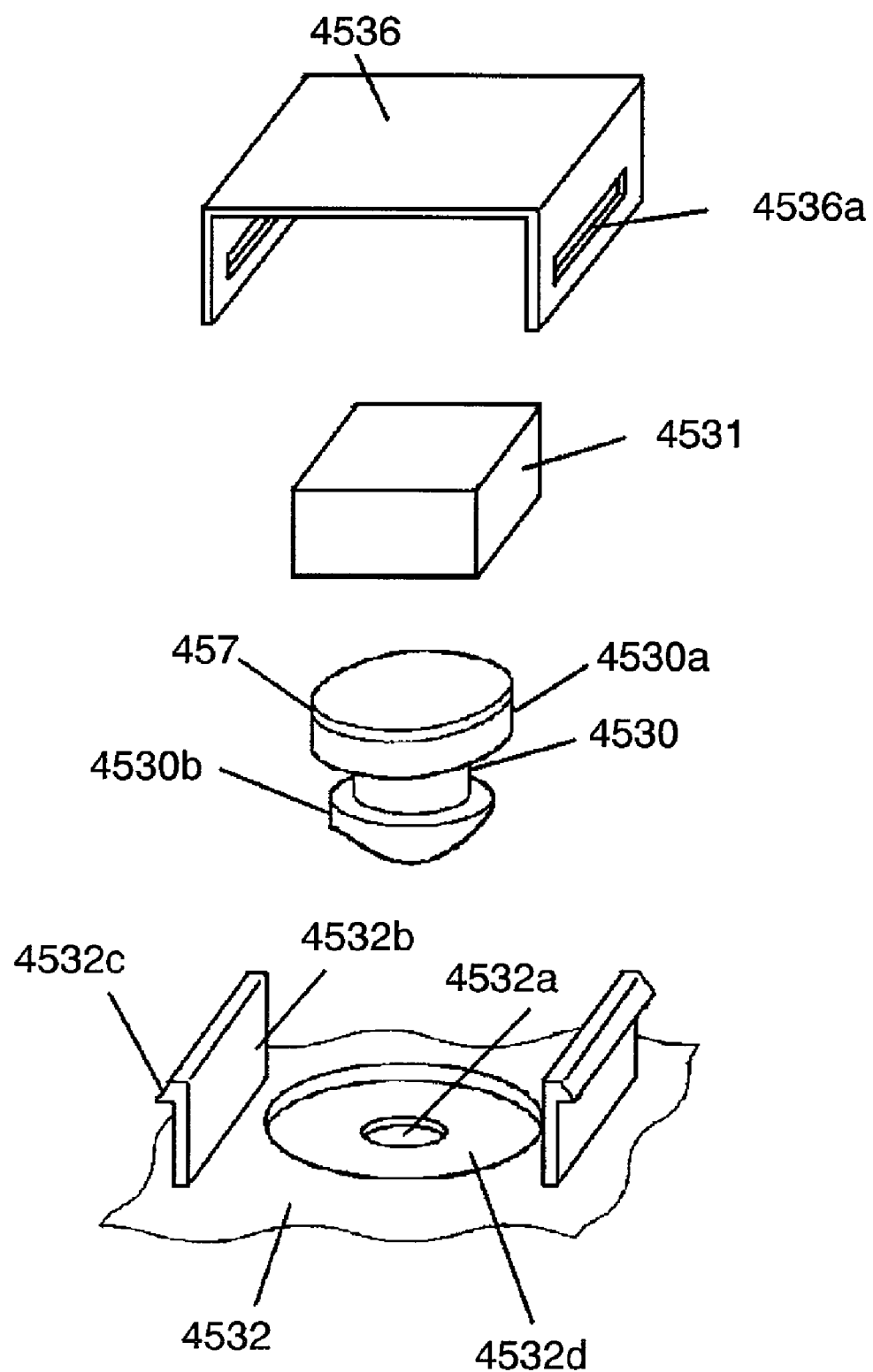
FIG. 21 is a perspective view of FIG. 20A.

FIG. 20A is an exploded sectional view of a pressure regulating valve used in a capacitor according to a fifteenth embodiment of the present invention. FIG. 20B is a plan view of an essential part excluding a cover of the capacitor according to the fifteenth embodiment of the present invention. FIG. 20C is a sectional view after assembly of the pressure regulating valve used in the capacitor according to the fifteenth embodiment of the present invention. FIG. 21 is a perspective view of FIG. 20A.

In FIGS. 20A, 20B, 20C, and 21, valve body 4531 is the square member of an elastic material such as rubber.

Terminal plate 4532 has electrolyte filling hole 4532*a* and walls 4532*b* formed in the upper portion of the periphery of hole 4532*a*. Walls 4532*b* are provided at their ends with engaging sections 4532*c* protruding outwardly (or inwardly). Terminal plate 4532 further has depression 4532*d* into which each corner of valve body 4531 is closely fitted.

In the pressure regulating valve of the present fifteenth embodiment thus structured, gas-permeable sheet 457 is joined to the upper surface of elastic member 4530 so as to seal the hole. Then, gas-permeable sheet 457, square-shaped valve body 4531, and square-shaped cap 4536 stacked in this order are pressed into electrolyte filling hole 4532*a* of terminal plate 4532. At the same time, engaging sections 4536*a* of cap 4536 are fitted into engaging sections 4532*c* formed at each end of the pair of walls 4532*b* formed near the periphery of hole 4532*a* so as to couple them and to hold valve body 4531 in the compressed state. As a result, the pressure regulating valve is attached as shown in FIG. 20C.

In the pressure regulating valve of the present fifteenth embodiment thus structured, each corner of square-shaped valve body 4531 is in contact with the inner wall surfaces of depression 4532*d* of terminal plate 4532. This makes it easier to position valve body 4531 than in the pressure regulating valve of the eleventh embodiment and can maintain the operating pressure of the valve body stably by high dimensional accuracy.

Sixteenth Embodiment

The capacitor of a sixteenth embodiment differs from the capacitor of the eleventh embodiment only in part of the pressure regulating valve. Therefore, like components are labeled with like reference numerals with respect to the eleventh embodiment and the description of these components is not repeated here. The following description is focused on the differences between these embodiments with reference to drawings.

Figure 22A:
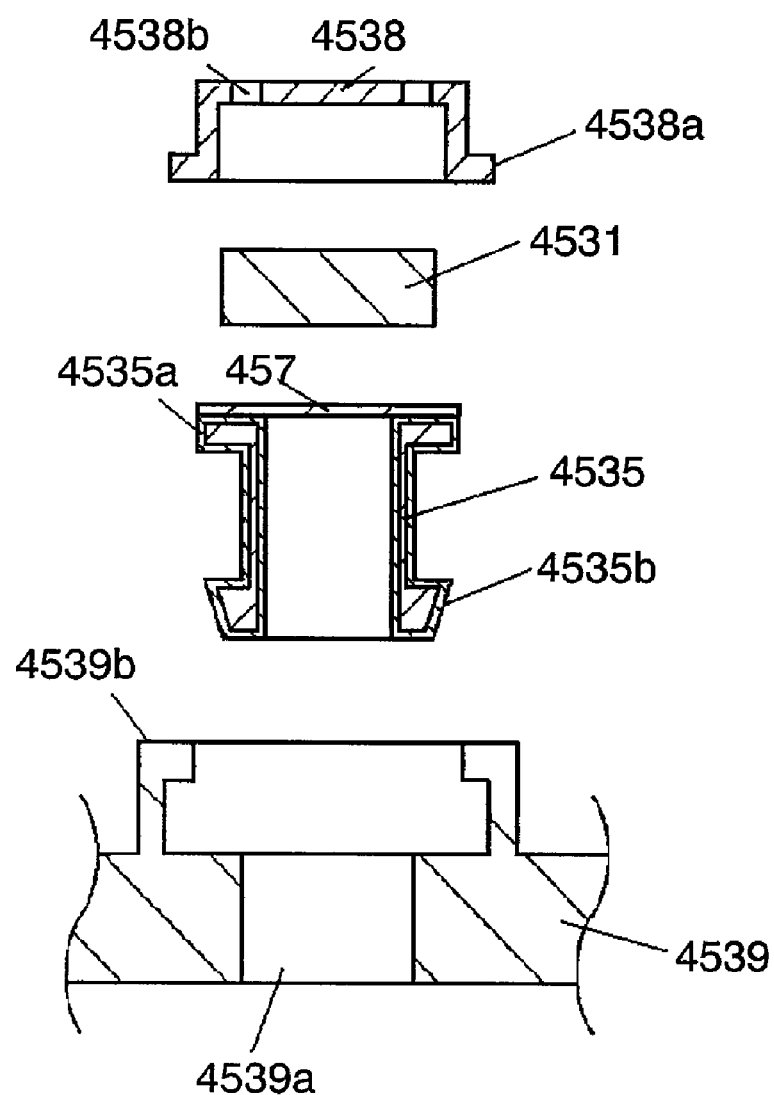
FIG. 22A is an exploded sectional view of a pressure regulating valve used in a capacitor according to a sixteenth embodiment of the present invention.
Figure 22B:
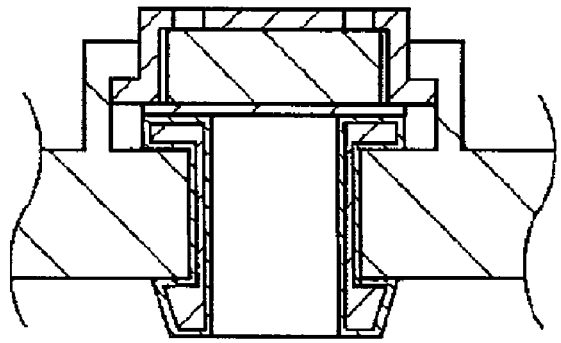
FIG. 22B is a sectional view after assembly of the pressure regulating valve used in the capacitor according to the sixteenth embodiment of the present invention.
Figure 23A:
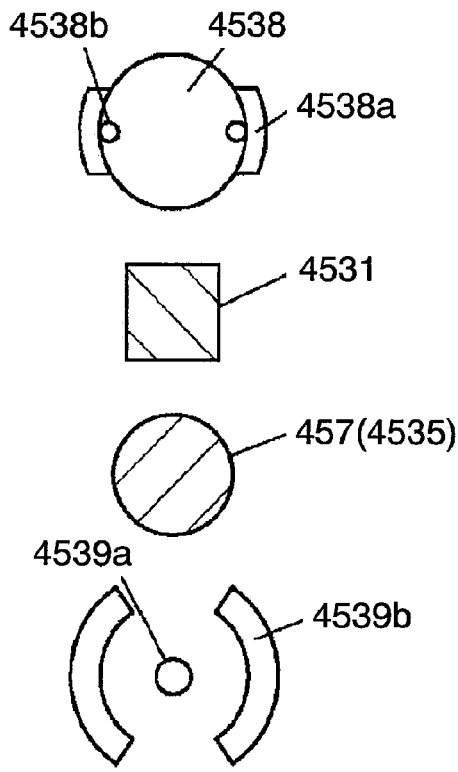
FIG. 23A is a plan view showing assembling of the pressure regulating valve used in the capacitor according to the sixteenth embodiment of the present invention.
Figure 23B:
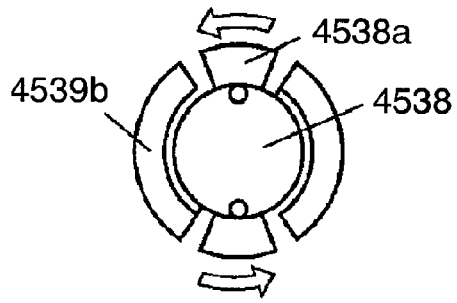
FIG. 23B is another plan view showing assembling of the pressure regulating valve used in the capacitor according to the sixteenth embodiment of the present invention.
Figure 23D:
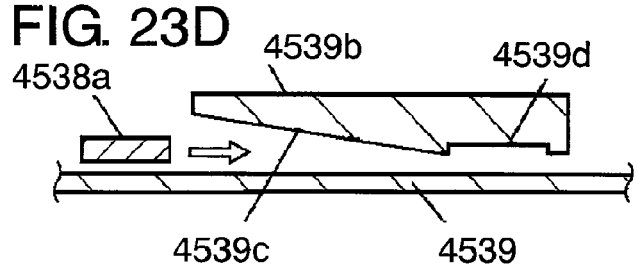
FIG. 23D is a sectional view of an essential part showing assembling of the pressure regulating valve used in the capacitor according to the sixteenth embodiment of the present invention.
Figure 23C:
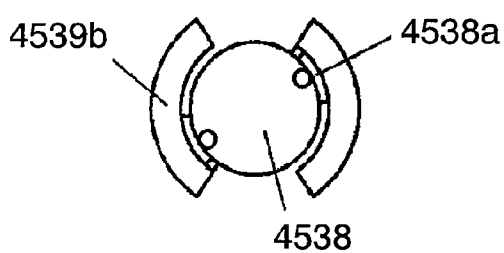
FIG. 23C is another plan view showing assembling of the pressure regulating valve used in the capacitor according to the sixteenth embodiment of the present invention.
Figure 23E:
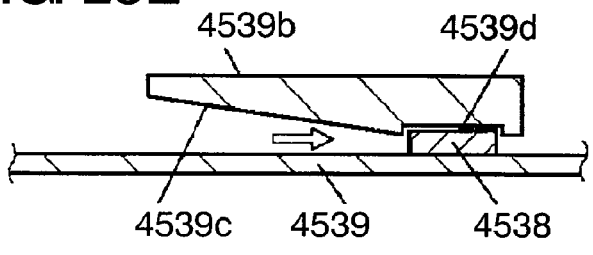
FIG. 23E is another sectional view of the essential part showing assembling of the pressure regulating valve used in the capacitor according to the sixteenth embodiment of the present invention.

FIG. 22A is an exploded sectional view of a pressure regulating valve used in a capacitor according to a sixteenth embodiment of the present invention. FIG. 22B is a sectional view after assembly of the pressure regulating valve used in the capacitor according to the sixteenth embodiment of the present invention. FIG. 23A is a plan view showing assembling of the pressure regulating valve used in the capacitor according to the sixteenth embodiment of the present invention. FIG. 23B is another plan view showing assembling of the pressure regulating valve used in the capacitor according to the sixteenth embodiment of the present invention. FIG. 23C is another plan view showing assembling of the pressure regulating valve used in the capacitor according to the sixteenth embodiment of the present invention. FIG. 23D is a sectional view of an essential part showing assembling of the pressure regulating valve used in the capacitor according to the sixteenth embodiment of the present invention. FIG. 23E is another sectional view of the essential part showing assembling of the pressure regulating valve used in the capacitor according to the sixteenth embodiment of the present invention.

In FIGS. 22A, 22B, and 23A to 23E, the pressure regulating valve includes cap 4538, which is a roof-shaped member made of a rigid body. Cap 4538 is provided on its bottom periphery with a pair of engaging sections 4538a protruding outwardly from two points. Valve body 4531 is the square member of an elastic material such as rubber.

The pressure regulating valve further includes terminal plate 4539 having electrolyte filling hole 4539a and engaging sections 4539b, which are circular arcs formed in the upper portion of the periphery of hole 4539a. As shown in FIG. 23D, engaging sections 4539b are structured in such a manner that when cap 4538 is rotated while being in close contact with terminal plate 4539, engaging sections 4538a of cap 4538 are slid and fitted thereinto. Terminal plate 4539 further has tapered portions 4539c, which are designed to be thinner in the height direction (the thickness direction of engaging sections 4538a) as engaging sections 4538a are slid deeper thereinto. Tapered portions 4539c are provided at their ends with fixing portions 4539d into which engaging sections 4538a are fitted.

In the pressure regulating valve of the present sixteenth embodiment thus structured, gas-permeable sheet 457 is joined to the upper surface of elastic member 4535 so as to seal the hole. Then, gas-permeable sheet 457, square-shaped valve body 4531, and cap 4538 stacked in this order are pressed into electrolyte filling hole 4539a of terminal plate 4539. Then, the cap is rotated in such a manner that engaging sections 4538a of cap 4538 are fitted into the pair of engaging sections 4539b formed in the upper portion of the periphery of hole 4539a so as to couple them and to hold valve body 4531 in the compressed state. As a result, the pressure regulating valve is attached as shown in FIG. 22B.

In the pressure regulating valve of the present sixteenth embodiment thus structured, the coupling between the cap and the terminal plate can be performed very easily.

Seventeenth Embodiment

The capacitor of a seventeenth embodiment differs from the capacitor of the first embodiment only in part of the pressure regulating valve. Therefore, like components are labeled with like reference numerals with respect to the first embodiment and the description of these components is not repeated here. The following description is focused on the differences between these embodiments with reference to drawings.

Figure 24A:
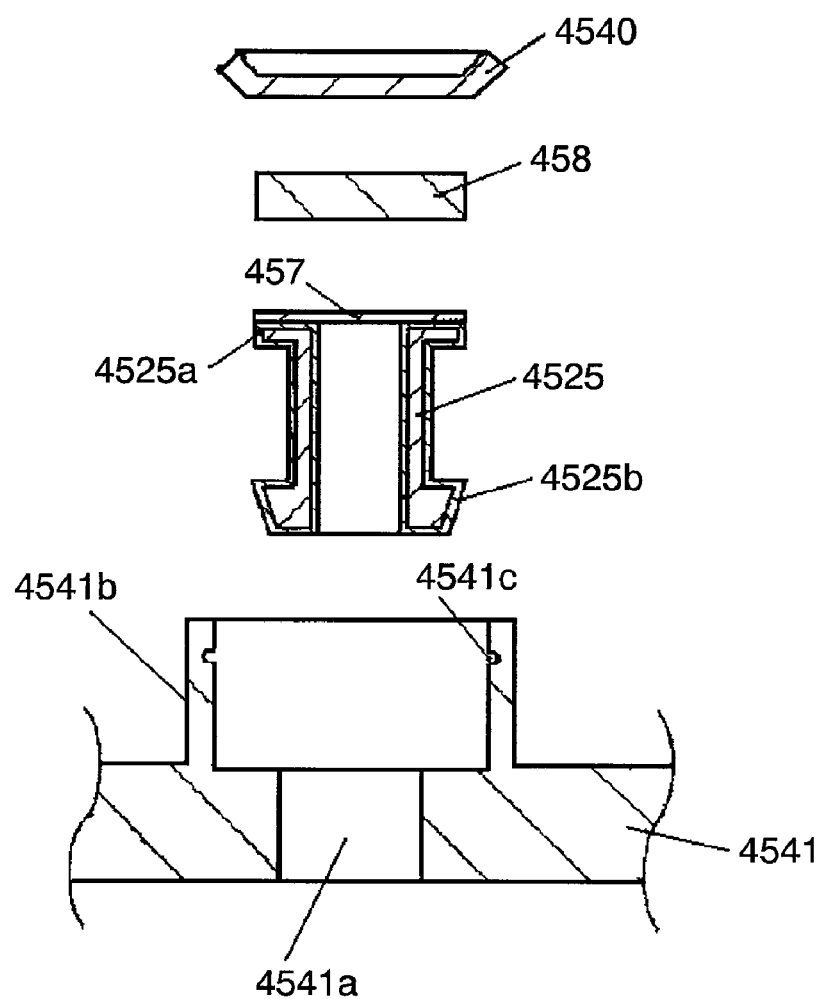
FIG. 24A is an exploded sectional view of a pressure regulating valve used in a capacitor according to a seventeenth embodiment of the present invention.
Figure 24B:
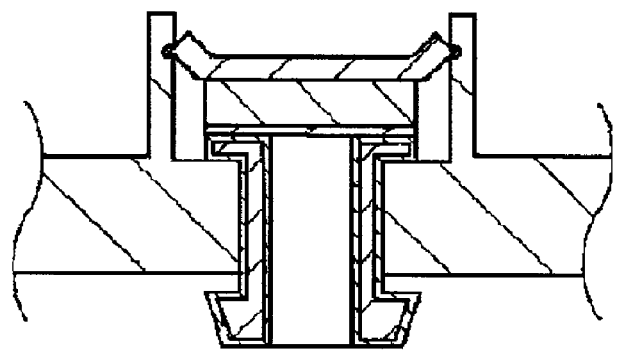
FIG. 24B is a sectional view after assembly of the pressure regulating valve used in the capacitor according to the seventeenth embodiment of the present invention.
Figure 25A:
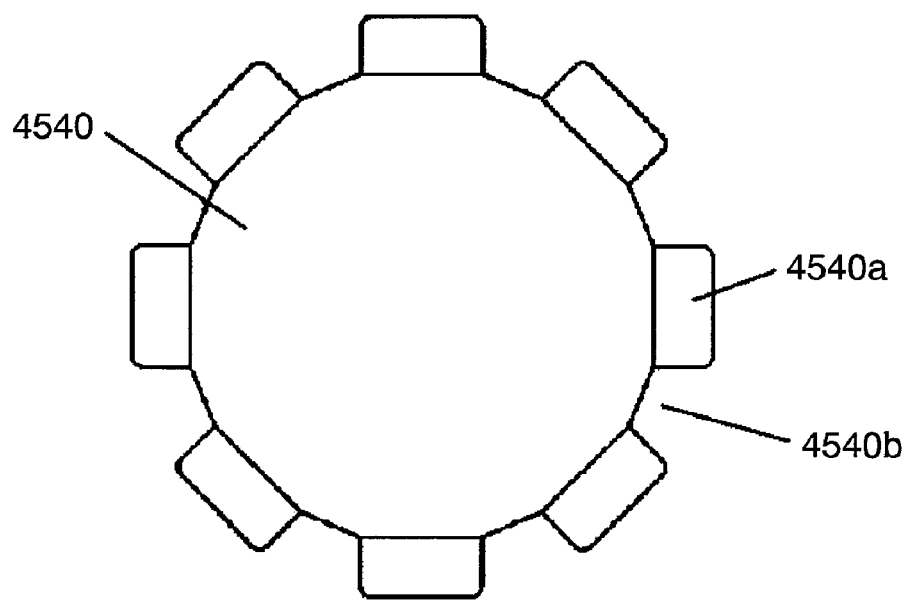
FIG. 25A is a plan view of a retainer plate used in the capacitor according to each of the seventeenth, thirty-second, and forty-fourth embodiments of the present invention.
Figure 25B:
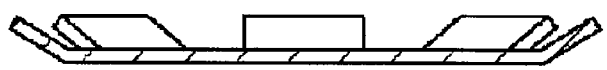
FIG. 25B is a sectional view of the retainer plate used in the capacitor according to each of the seventeenth, thirty-second, and forty-fourth embodiments of the present invention.

FIG. 24A is an exploded sectional view of a pressure regulating valve used in a capacitor according to a seventeenth embodiment of the present invention. FIG. 24B is a sectional view after assembly of the pressure regulating valve used in the capacitor according to the seventeenth embodiment of the present invention. FIG. 25A is a plan view of a retainer plate used in the capacitor according to the seventeenth embodiment of the present invention. FIG. 25B is a sectional view of the retainer plate used in the capacitor according to the seventeenth embodiment of the present invention.

In FIGS. 24A, 24B, 25A, and 25B, elastic member 4525 is the cylindrical member made of the elastic material such as rubber and provided at one end thereof with flange 4525a and at the other end thereof with engaging section 4525b protruding outwardly. Flange 4525a, which is the upper surface of elastic member 4525, is provided thereon with gas-permeable sheet 457 so as to seal the opening of the cylindrical body. Valve body 458 is made of the elastic material such as rubber.

The pressure regulating valve includes retainer plate 4540 made of a rigid body. Retainer plate 4540 has a flat portion in contact with the upper surface of valve body 458, and a plurality of annular and strip-shaped engaging sections 4540a extending upwardly from the periphery of the flat portion. Engaging sections 4540a have notches 4540b therebetween. Retainer plate 4540 is made of metal in the present seventeenth embodiment, but alternatively can be made of resin.

In the pressure regulating valve of the present seventeenth embodiment thus structured, gas-permeable sheet 457 is joined to the upper surface of elastic member 4525 so as to seal the hole. Then, gas-permeable sheet, 457, valve body 458, and retainer plate 4540 stacked in this order are pressed into electrolyte filling hole 4541a of terminal plate 4541. At the same time, engaging sections 4540a of retainer plate 4540 are fitted into engaging section 4541c formed on the inner peripheral surface of annular wall 4541b formed in the upper portion of the periphery of hole 4541a so as to couple them and to hold valve body 458 in the compressed state. As a result, the pressure regulating valve is attached as shown in FIG. 24B.

In the pressure regulating valve of the present seventeenth embodiment thus structured, the assembly operation is performed easily and the operating pressure of the valve body is maintained stably by high dimensional accuracy.

Eighteenth Embodiment

Figure 26A:
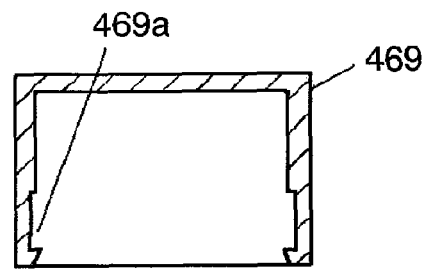
FIG. 26A is an exploded sectional view of a pressure regulating valve used in a capacitor according to an eighteenth embodiment of the present invention.
Figure 26A:
Figure 26A:
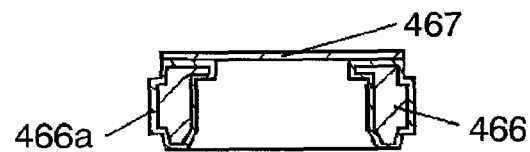
Figure 26B:
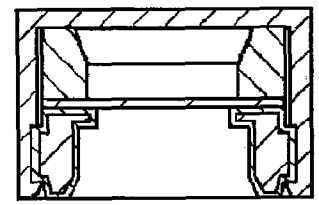
FIG. 26B is a sectional view before assembly of the pressure regulating valve used in the capacitor according to the eighteenth embodiment of the present invention.
Figure 26C:
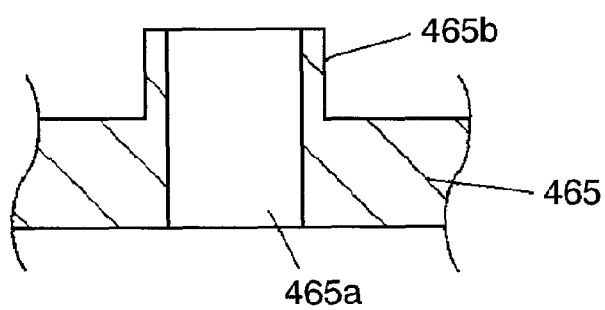
FIG. 26C is a sectional view after assembly of the pressure regulating valve used in the capacitor according to the eighteenth embodiment of the present invention.
Figure 26C:
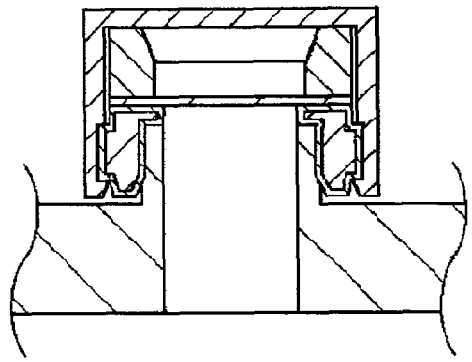

FIG. 26A is an exploded sectional view of a pressure regulating valve used in a capacitor according to an eighteenth embodiment of the present invention. FIG. 26B is a sectional view before assembly of the pressure regulating valve used in the capacitor according to the eighteenth embodiment of the present invention. FIG. 26C is a sectional view after assembly of the pressure regulating valve used in the capacitor according to the eighteenth embodiment of the present invention.

In FIGS. 26A to 26C, the pressure regulating valve includes terminal plate 465 having electrolyte filling hole 465a and wall 465b, which is annularly formed in the upper portion of the periphery of hole 465a. The pressure regulating valve further includes elastic member 466, which is a ring-shaped member made of an elastic material such as rubber. Elastic member 466 has engaging section 466a protruding from part of its peripheral surface. Elastic member 466 is made of ethylene-propylene terpolymer (hereinafter, EPT) in the present eighteenth embodiment. The pressure regulating valve further includes gas-permeable sheet 467 sealedly joined to the upper surface of elastic member 466. Gas-permeable sheet 467 has physical properties that allow the gas generated in the capacitor to pass through it but does not allow the driving electrolyte to pass through it.

The pressure regulating valve further includes valve body 468 made of an elastic material such as rubber. Valve body 468 is ring-shaped and has tapered portion 468a extending from the upper end of the inner peripheral surface toward the outer peripheral surface of valve body 468. Valve body 468 is made of isoprene-isobutylene rubber (hereinafter, IIR) in the present eighteenth embodiment, but alternatively can be made of EPT. The pressure regulating valve further includes cap 469, which is a roof-shaped member made of a rigid body and has engaging section 469a on its inner peripheral surface. Cap 9 is made of resin in the present eighteenth embodiment, but alternatively can be made of metal.

In the pressure regulating valve of the present eighteenth embodiment thus structured, gas-permeable sheet 467 is sealedly joined by, for example, bonding to the upper surface of elastic member 466. Then, gas-permeable sheet 467 and valve body 468 disposed thereon are inserted into cap 469, and engaging section 466a of elastic member 466 is fitted into engaging section 469a of cap 469 so as to hold valve body 468 in the compressed state. This is pressed into annular wall 465b around the periphery of electrolyte filling hole 465a of terminal plate 465. As a result, the pressure regulating valve is attached as shown in FIG. 26C.

In the pressure regulating valve of the present eighteenth embodiment thus structured, elastic member 466 and gas-permeable sheet 467 are joined to each other. This allows the gas generated in the capacitor to pass through gas-permeable sheet 467; then to pass through the hollow portion in the center of ring-shaped valve body 468; and then to pass through the contact surface between valve body 468 and cap 469 so as to be released to the outside. Since gas-permeable sheet 467 does not allow the driving electrolyte to pass through it, the driving electrolyte is prevented from leaking by elastic member 466. As a result, the capacitor can be highly reliable.

Furthermore, as described above, ring-shaped valve body 468 has tapered portion 468a extending from the upper end of the inner peripheral surface toward the outer peripheral surface of valve body 468. This maintains the operating pressure of valve body 468 more stably during the gas release.

Nineteenth Embodiment

The capacitor of a nineteenth embodiment differs from the capacitor of the eighteenth embodiment only in part of the pressure regulating valve. Therefore, like components are labeled with like reference numerals with respect to the eighteenth embodiment and the description of these components is not repeated here. The following description is focused on the differences between these embodiments with reference to drawings.

Figure 27A:
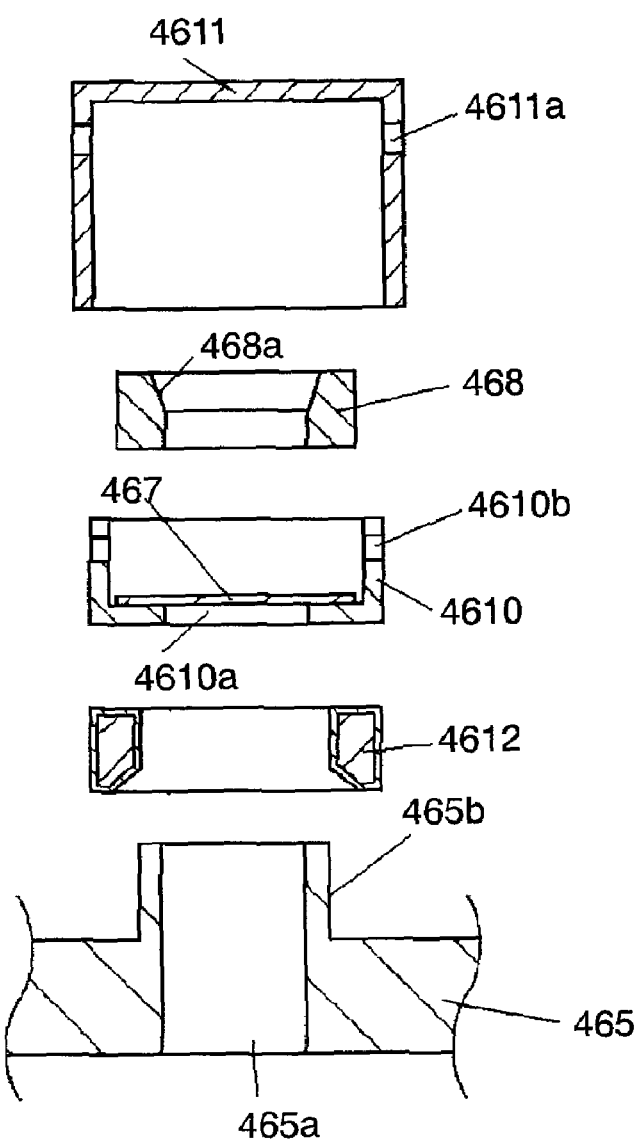
FIG. 27A is an exploded sectional view of a pressure regulating valve used in a capacitor according to a nineteenth embodiment of the present invention.
Figure 27B:
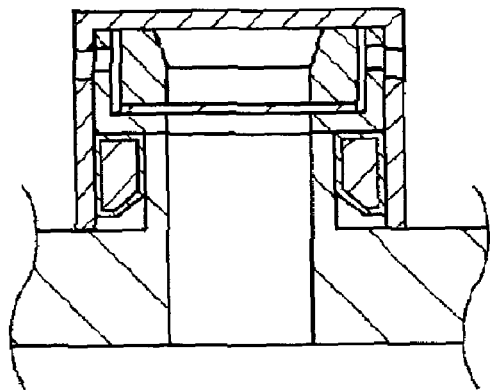
FIG. 27B is a sectional view after assembly of the pressure regulating valve used in the capacitor according to the nineteenth embodiment of the present invention.

FIG. 27A is an exploded sectional view of a pressure regulating valve used in a capacitor according to a nineteenth embodiment of the present invention. FIG. 27B is a sectional view after assembly of the pressure regulating valve used in the capacitor according to the nineteenth embodiment of the present invention.

In FIGS. 27A and 27B, the pressure regulating valve includes valve support member 4610, which is a box-shaped member made of a rigid body. Valve support member 4610 has hole 4610a at the center of its bottom surface and a plurality of holes 4610b on its peripheral surface. Hole 4610a of valve support member 4610 is sealed with gas-permeable sheet 467 disposed thereon. The pressure regulating valve further includes cap 4611, which is roof-shaped member made of a rigid body and has holes 4611a on its peripheral surface. The pressure regulating valve further includes elastic member 4612, which is a ring-shaped member made of an elastic material such as rubber.

In the pressure regulating valve of the present nineteenth embodiment thus structured, valve support member 4610 made of the rigid body is provided between ring-shaped elastic member 4612 and valve body 468 (more precisely, between ring-shaped elastic member 4612 and gas-permeable sheet 467). This can maintain the compressed state and hence the operating pressure of valve body 468.

Furthermore, holes 4610b and 4611a formed in the peripheral surface of each of valve support member 4610 and cap 4611 allow the gas generated in the capacitor to be released to the outside more smoothly.

Twentieth Embodiment

The capacitor of a twentieth embodiment differs from the capacitor of the eighteenth embodiment only in part of the pressure regulating valve. Therefore, like components are labeled with like reference numerals with respect to the first embodiment and the description of these components is not repeated here. The following description is focused on the differences between these embodiments with reference to drawings.

FIG. 28A is an exploded sectional view of a pressure regulating valve used in a capacitor according to a twentieth embodiment of the present invention. FIG. 28B is a sectional view before assembly of the pressure regulating valve used in the capacitor according to the twentieth embodiment of the present invention. FIG. 28C is a sectional view after assembly of the pressure regulating valve used in the capacitor according to the twentieth embodiment of the present invention.

In FIGS. 28A to 28C, the pressure regulating valve includes valve compression member 4613, which is a roof-shaped member made of a rigid body. Valve compression member 4613 has hole 4613a at the center of its upper surface, and screw portion 4613b on its peripheral surface. Gas-permeable sheet 467 is joined to the upper surface of valve compression member 4613 so as to seal hole 4613a.

The pressure regulating valve further includes cap 4614, which is a roof-shaped member made of a rigid body. Cap 4614 has hole 4614a for communication with outside on its peripheral surface and screw portion 4614b on its inner peripheral surface. Valve compression member 4613 and cap 4614 are made of resin in the present twelfth embodiment, but alternatively can be made of metal. The pressure regulating valve further includes elastic member 4615, which is a ring-shaped member made of an elastic material such as rubber.

In the pressure regulating valve of the present twelfth embodiment thus structured, gas-permeable sheet 467 is joined to the upper surface of valve compression member 4613 so as to seal hole 4613a. Then, gas-permeable sheet 467 and valve body 468 disposed thereon are covered with cap 4614, and screw portion 4614b of cap 4614 is screwed with screw portion 4613b of valve compression member 4613 so as to hold valve body 468 in the compressed state. This is pressed into annular wall 465b formed around the periphery of electrolyte filling hole 465a with elastic member 4615 interposed therebetween. As a result, the pressure regulating valve is attached as shown in FIG. 28C.

In the pressure regulating valve of the present twentieth embodiment thus structured, valve compression member 4613 and cap 4614 are screwed with each other. This can maintain the holding power and hence the operating pressure of valve body 468.

Twenty-First Embodiment

The capacitor of a twenty-first embodiment differs from the capacitor of the eighteenth embodiment only in part of the pressure regulating valve. Therefore, like components are labeled with like reference numerals with respect to the eighteenth embodiment and the description of these components is not repeated here. The following description is focused on the differences between these embodiments with reference to drawings.

Figure 29A:
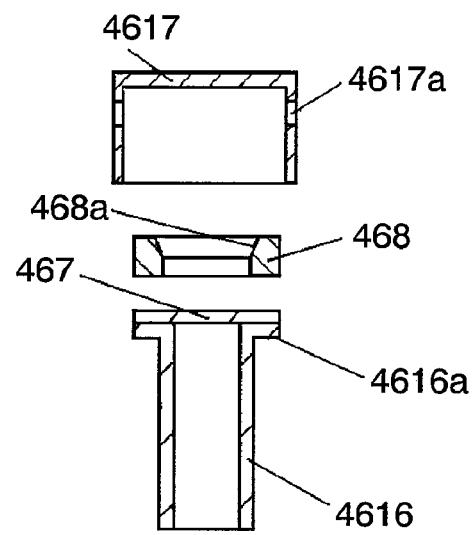
FIG. 29A is an exploded sectional view of a pressure regulating valve used in a capacitor according to a twenty-first embodiment of the present invention.
Figure 29B:
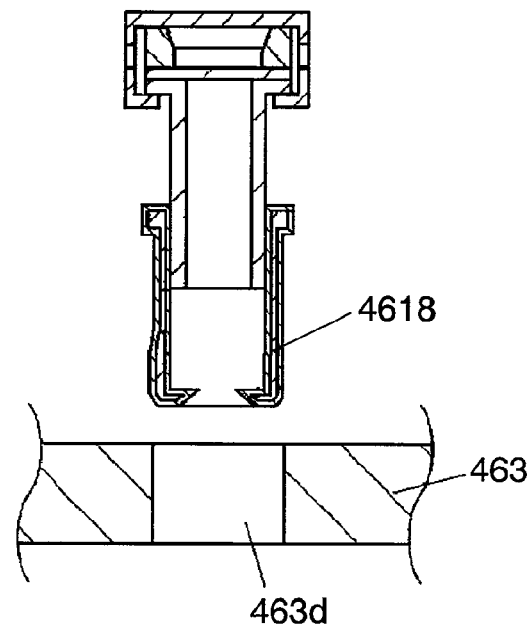
FIG. 29B is a sectional view before assembly of the pressure regulating valve used in the capacitor according to the twenty-first embodiment of the present invention.
Figure 29C:
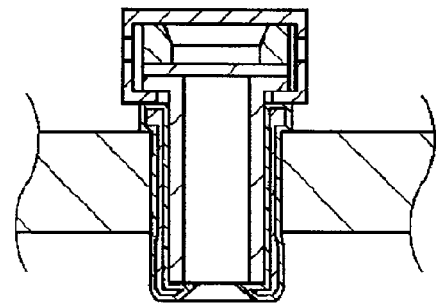
FIG. 29C is a sectional view after assembly of the pressure regulating valve used in the capacitor according to the twenty-first embodiment of the present invention.

FIG. 29A is an exploded sectional view of a pressure regulating valve used in a capacitor according to a twenty-first embodiment of the present invention. FIG. 29B is a sectional view before assembly of the pressure regulating valve used in the capacitor according to the twenty-first embodiment of the present invention. FIG. 29C is a sectional view after assembly of the pressure regulating valve used in the capacitor according to the twenty-first embodiment of the present invention.

In FIGS. 29A to 29C, the pressure regulating valve includes valve holding member 4616, which is a cylindrical member made of a rigid body. Valve holding member 4616 is provided at one end thereof with flange 4616a. Flange 4616a, which is the upper surface of valve holding member 4616, is provided thereon with gas-permeable sheet 467 so as to seal the opening of the cylindrical body. The pressure regulating valve further includes cap 4617, which is a roof-shaped member made of a rigid body. Cap 4617 is provided on its peripheral surface with holes 4617a for communication with outside. Valve holding member 4616 and cap 4617 are made of metal in the present twenty-first embodiment, but alternatively can be made of resin. The pressure regulating valve further includes elastic member 4618, which is a cylindrical member made of an elastic material such as rubber.

In the pressure regulating valve of the present twenty-first embodiment thus structured, gas-permeable sheet 467 is joined to the upper surface of valve holding member 4616 so as to seal the hole. Then, gas-permeable sheet 467 and valve body 468 disposed thereon are covered with cap 4617, and the open end of cap 4617 is caulked so as to couple them and to hold valve body 468 in the compressed state. This is inserted into elastic member 4618, and then the cylindrical portion of elastic member 4618 is pressed into electrolyte filling hole 463d of terminal plate 463. As a result, the pressure regulating valve is attached as shown in FIG. 29C.

In the pressure regulating valve of the present twenty-first embodiment thus structured, electrolyte filling hole 463d of terminal plate 463 does not require a complicated process. This provides the pressure regulating valve at a low cost.

Twenty-Second Embodiment

The capacitor of a twenty-second embodiment differs from the capacitor of the eighteenth embodiment only in part of the pressure regulating valve. Therefore, like components are labeled with like reference numerals with respect to the eighteenth embodiment and the description of these components is not repeated here. The following description is focused on the differences between these embodiments with reference to drawings.

Figure 30A:
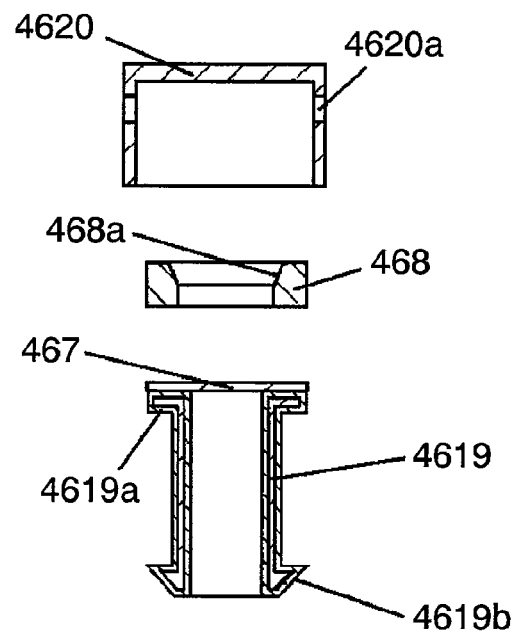
FIG. 30A is an exploded sectional view of a pressure regulating valve used in a capacitor according to a twenty-second embodiment of the present invention.
Figure 30B:
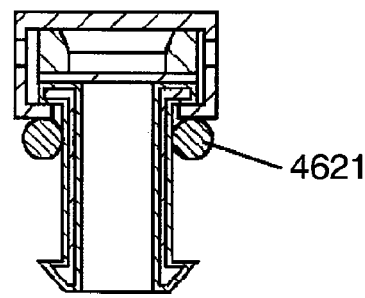
FIG. 30B is a sectional view before assembly of the pressure regulating valve used in the capacitor according to the twenty-second embodiment of the present invention.
Figure 30C:
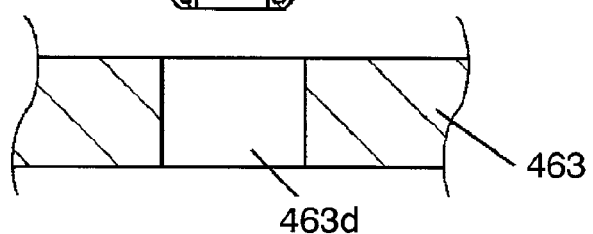
FIG. 30C is a sectional view after assembly of the pressure regulating valve used in the capacitor according to the twenty-second embodiment of the present invention.
Figure 30C:
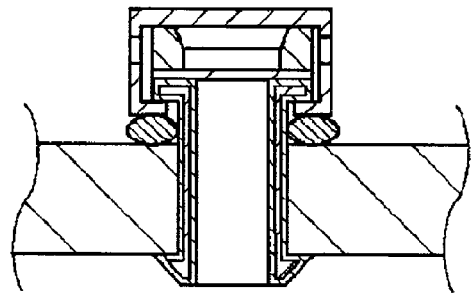

FIG. 30A is an exploded sectional view of a pressure regulating valve used in a capacitor according to a twenty-second embodiment of the present invention. FIG. 30B is a sectional view before assembly of the pressure regulating valve used in the capacitor according to the twenty-second embodiment of the present invention. FIG. 30C is a sectional view after assembly of the pressure regulating valve used in the capacitor according to the twenty-second embodiment of the present invention.

In FIGS. 30A to 30C, the pressure regulating valve includes elastic member 4619, which is a cylindrical member made of an elastic material such as rubber. Elastic member 4619 is provided at one end thereof with flange 4619a and at the other end thereof with engaging section 4619b protruding outwardly. Flange 4619a, which is the upper surface of elastic member 4619, is provided thereon with gas-permeable sheet 467 so as to seal the opening of the cylindrical body. The pressure regulating valve further includes cap 4620, which is provided on its peripheral surface with hole 4620a for communication with outside. Cap 4620 is made of metal in the present embodiment 4622, but alternatively can be made of resin. The pressure regulating valve further includes O-ring 4621 made of rubber.

In the pressure regulating valve of the present twenty-second embodiment thus structured, gas-permeable sheet 467 is joined to the upper surface of elastic member 4619 so as to seal the hole. Then, gas-permeable sheet 467 and valve body 468 disposed thereon are covered with cap 4620, and the open end of cap 4620 is caulked so as to couple them and to hold valve body 468 in the compressed state. The cylindrical portion (main body) including engaging section 4619b of elastic member 4619 is pressed into electrolyte filling hole 463d of terminal plate 463 with O-ring 4621 interposed therebetween. As a result, the pressure regulating valve is attached as shown in FIG. 30C.

In the pressure regulating valve of the present twenty-second embodiment thus structured, elastic member 4619 having the function of holding valve body 468 contributes to a decrease in the number of components, thereby providing the pressure regulating valve at a low cost.

Twenty-Third Embodiment

The capacitor of a twenty-third embodiment differs from the capacitor of the twenty-second embodiment only in part of the pressure regulating valve. Therefore, like components are labeled with like reference numerals with respect to the eighteenth embodiment and the description of these components is not repeated here. The following description is focused on the differences between these embodiments with reference to drawings.

Figure 31A:
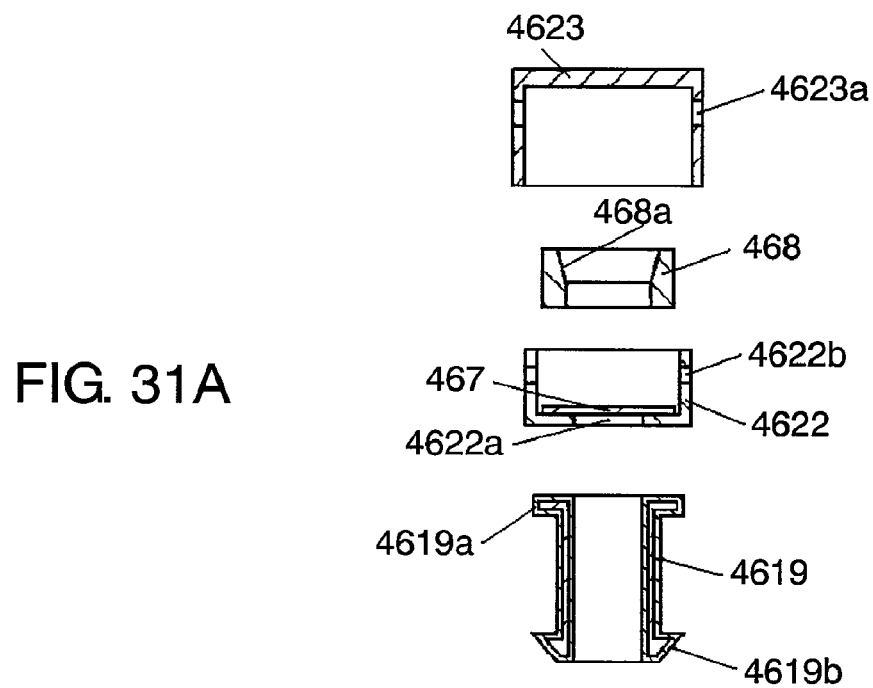
FIG. 31A is an exploded sectional view of a pressure regulating valve used in a capacitor according to a twenty-third embodiment of the present invention.
Figure 31B:
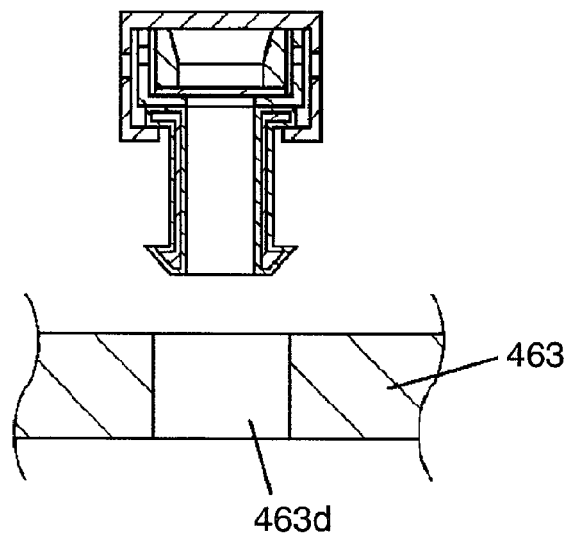
FIG. 31B is a sectional view before assembly of the pressure regulating valve used in the capacitor according to the twenty-third embodiment of the present invention.
Figure 31C:
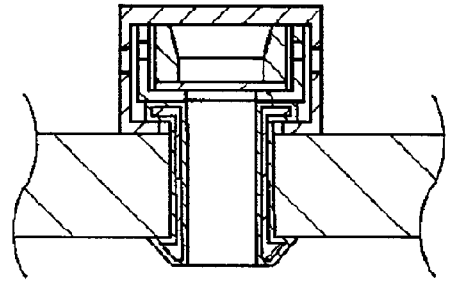
FIG. 31C is a sectional view after assembly of the pressure regulating valve used in the capacitor according to the twenty-third embodiment of the present invention.

FIG. 31A is an exploded sectional view of a pressure regulating valve used in a capacitor according to a twenty-third embodiment of the present invention. FIG. 31B is a sectional view before assembly of the pressure regulating valve used in the capacitor according to the twenty-third embodiment of the present invention. FIG. 31C is a sectional view after assembly of the pressure regulating valve used in the capacitor according to the twenty-third embodiment of the present invention.

In FIGS. 31A to 31C, the pressure regulating valve includes valve support member 4622, which is a box-shaped member made of a rigid body. Valve support member 4622 has hole 4622a at the center of its bottom surface and a plurality of holes 4622b in its peripheral surface. Hole 4622a is sealed with gas-permeable sheet 467 disposed thereon. The pressure regulating valve further includes cap 4623, which is a roof-shaped member made of a rigid body and has a plurality of holes 4623a formed in its peripheral surface. The open end of cap 4623 is caulked so as to couple them and to hold valve body 468 in the compressed state.

In the pressure regulating valve of the present twenty-third embodiment thus structured, valve support member 4622 made of the rigid body is provided between flange 4619a of cylindrical elastic member 4619 and valve body 468 (more precisely, between flange 4619a of cylindrical elastic member 4619 and gas-permeable sheet 7). This can maintain the compressed state and hence the operating pressure of valve body 468.

In this structure, O-ring 4621 used in the twenty-second embodiment is dispensable.

Figure 32A:
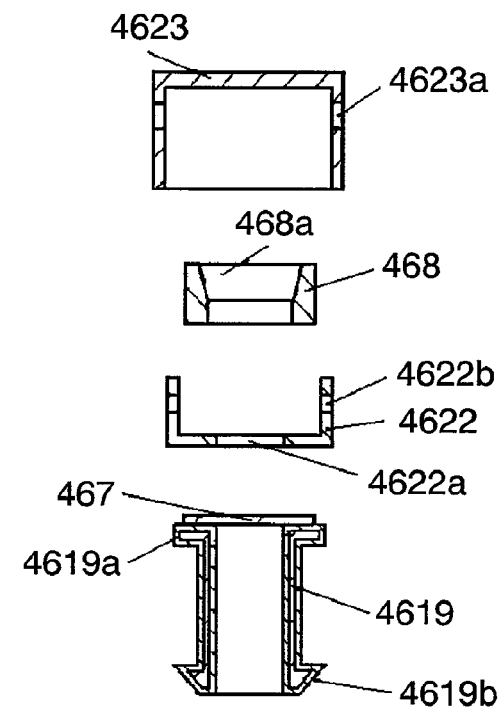
FIG. 32A is an exploded sectional view of a pressure regulating valve used in another capacitor according to the twenty-third embodiment of the present invention.
Figure 32B:
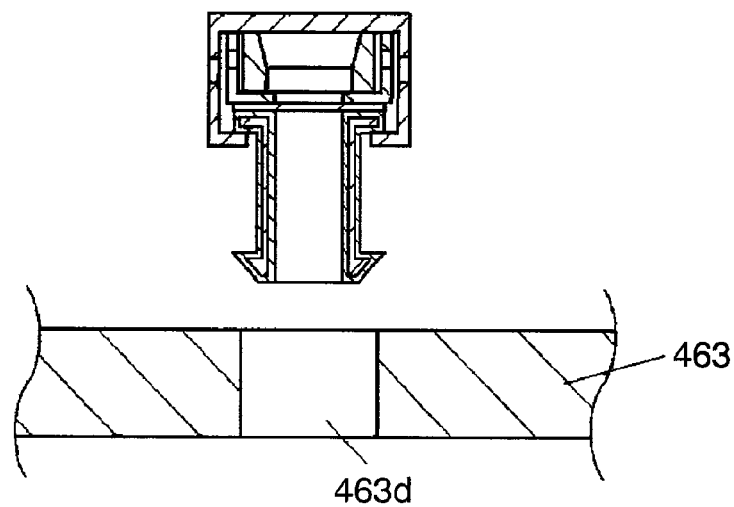
FIG. 32B is a sectional view before assembly of the pressure regulating valve used in the another capacitor according to the twenty-third embodiment of the present invention.
Figure 32C:
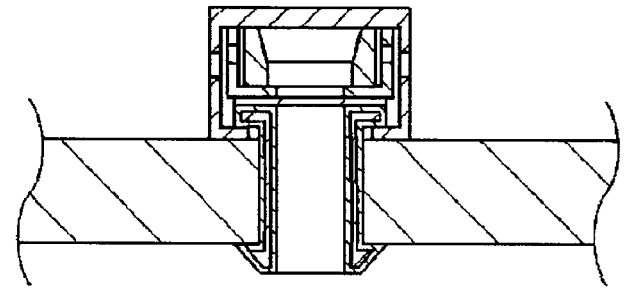
FIG. 32C is a sectional view before assembly of the pressure regulating valve used in the another capacitor according to the twenty-third embodiment of the present invention.

FIG. 32A is an exploded sectional view of a pressure regulating valve used in another capacitor according to the twenty-third embodiment of the present invention. FIG. 32B is a sectional view before assembly of the pressure regulating valve used in the another capacitor according to the twenty-third embodiment of the present invention. FIG. 32C is a sectional view before assembly of the pressure regulating valve used in the another capacitor according to the twenty-third embodiment of the present invention.

In the pressure regulating valve shown in FIGS. 32A to 34C, valve support member 4622 made of the rigid body is provided between flange 4619a of cylindrical elastic member 4619 and valve body 468 (more precisely, between gas-permeable sheet 467 joined to flange 4619a of cylindrical elastic member 4619 and valve body 468). The pressure regulating valve thus structured provides the same advantages as the pressure regulating valve shown in FIGS. 31A to 31C. Note that valve support member 22 can be disposed anywhere between flange 4619a of cylindrical elastic member 4619 and valve body 468.

Twenty-Fourth Embodiment

The capacitor of a twenty-fourth embodiment differs from the capacitor of the eighteenth embodiment only in part of the pressure regulating valve. Therefore, like components are labeled with like reference numerals with respect to the eighteenth embodiment and the description of these components is not repeated here. The following description is focused on the differences between these embodiments with reference to drawings.

Figure 33A:
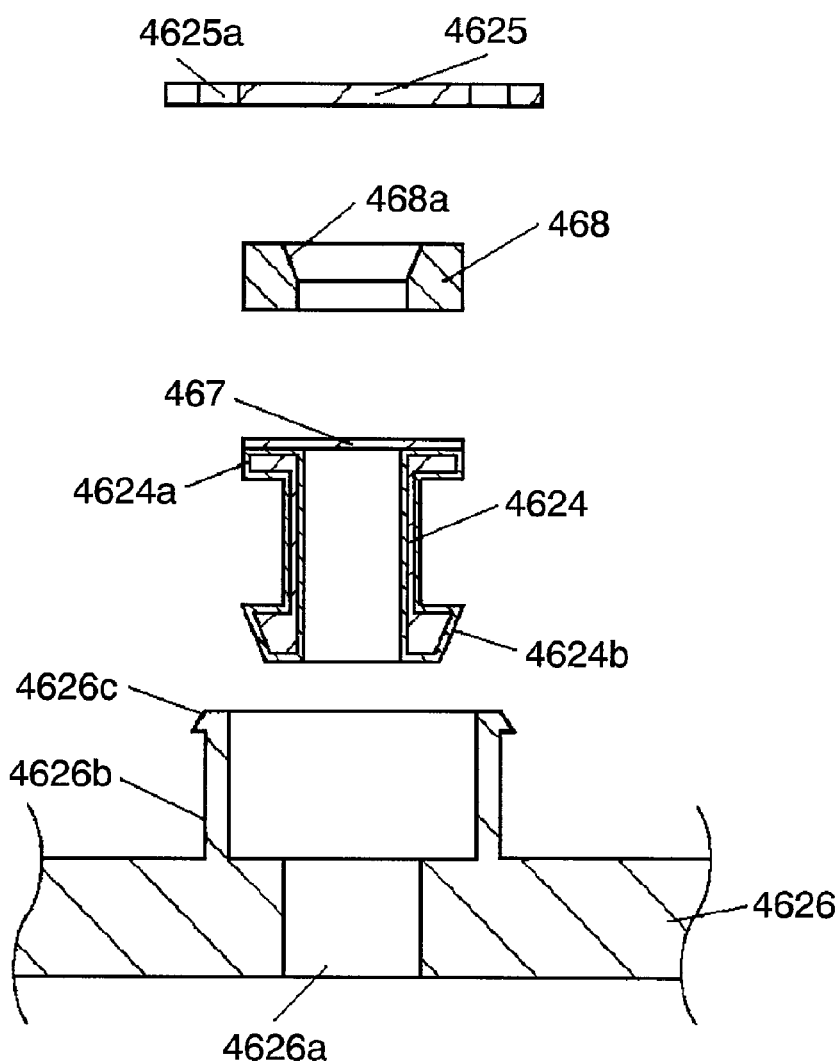
FIG. 33A is an exploded sectional view of a pressure regulating valve used in a capacitor according to a twenty-fourth embodiment of the present invention.
Figure 33B:
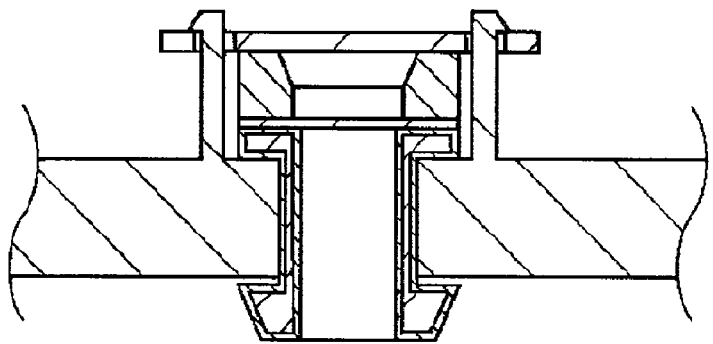
FIG. 33B is a sectional view after assembly of the pressure regulating valve used in the capacitor according to the twenty-fourth embodiment of the present invention.

FIG. 33A is an exploded sectional view of a pressure regulating valve used in a capacitor according to a twenty-fourth embodiment of the present invention. FIG. 33B is a sectional view after assembly of the pressure regulating valve used in the capacitor according to the twenty-fourth embodiment of the present invention.

In FIGS. 33A and 33B, the pressure regulating valve includes elastic member 4624, which is a cylindrical member made of an elastic material such as rubber. Elastic member 4624 is provided at one end thereof with flange 4624a and at the other end thereof with engaging section 4624b protruding outwardly. Flange 4624a, which is the upper surface of elastic member 4624, is provided thereon with gas-permeable sheet 467 so as to seal the opening of the cylindrical body. The pressure regulating valve further includes cover 4625 made of a rigid body. Cover 4625 has engaging sections 4625a, which are holes formed therein. Cover 4625 is made of metal in the present twenty-fourth embodiment, but alternatively can be made of resin.

In the pressure regulating valve of the present twenty-fourth embodiment thus structured, gas-permeable sheet 467 is joined to the upper surface of elastic member 4624 so as to seal the hole. Then, gas-permeable sheet 467, valve body 468, and cover 4625 stacked in this order are pressed into electrolyte filling hole 4626a of terminal plate 4626. At the same time, engaging sections 4625a of cover 4625 are fitted into engaging section 4626c protruding outwardly (or inwardly) from the end of annular wall 4626b around the periphery of hole 4626a so as to couple them and to hold valve body 468 in the compressed state. As a result, the pressure regulating valve is attached as shown in FIG. 33B.

In the pressure regulating valve of the present twenty-fourth embodiment thus structured, the assembly operation is performed easily and the operating pressure of the valve body is maintained stably by high dimensional accuracy.

Twenty-Fifth Embodiment

The capacitor of a twenty-fifth embodiment differs from the capacitor of the twenty-fourth embodiment only in part of the pressure regulating valve. Therefore, like components are labeled with like reference numerals with respect to the twenty-fourth embodiment and the description of these components is not repeated here. The following description is focused on the differences between these embodiments with reference to drawings.

Figure 34A:
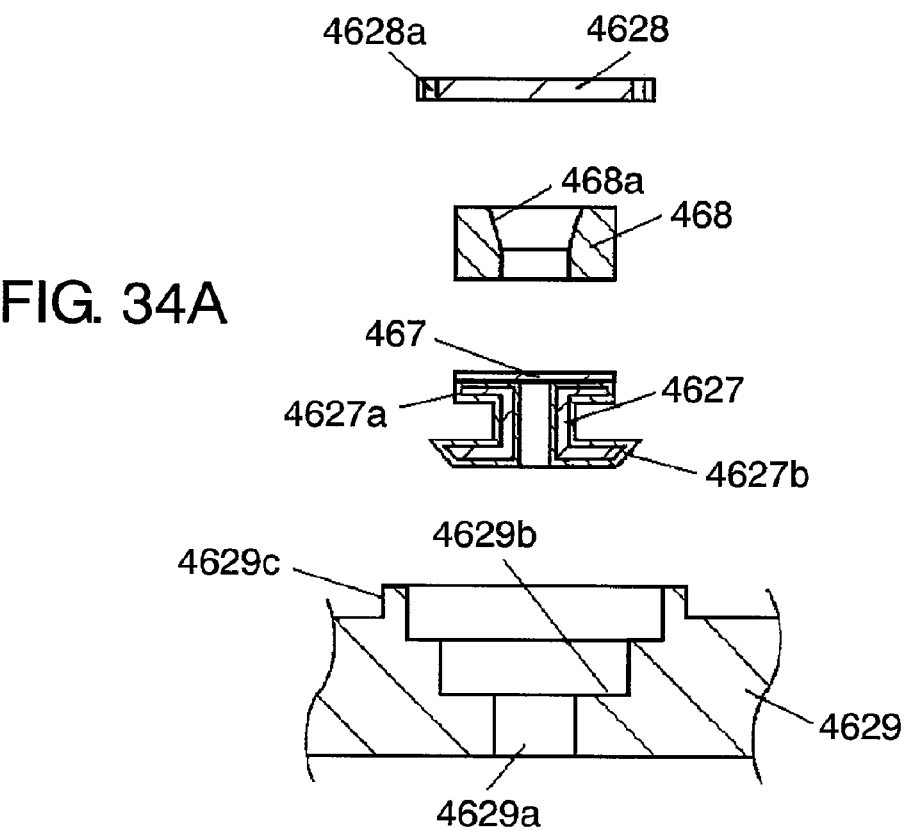
FIG. 34A is an exploded sectional view of a pressure regulating valve used in a capacitor according to a twenty-fifth embodiment of the present invention.
Figure 34B:
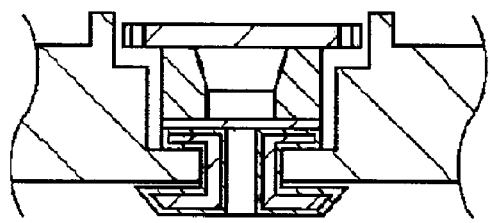
FIG. 34B is a sectional view before assembly of the pressure regulating valve used in the capacitor according to the twenty-fifth embodiment of the present invention.
Figure 34C:
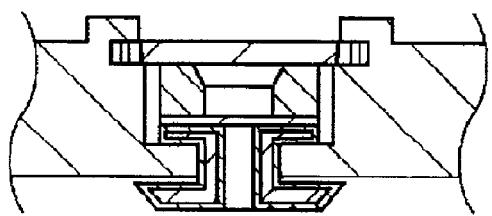
FIG. 34C is a sectional view after assembly of the pressure regulating valve used in the capacitor according to the twenty-fifth embodiment of the present invention.

FIG. 34A is an exploded sectional view of a pressure regulating valve used in a capacitor according to a twenty-fifth embodiment of the present invention. FIG. 34B is a sectional view before assembly of the pressure regulating valve used in the capacitor according to the twenty-fifth embodiment of the present invention. FIG. 34C is a sectional view after assembly of the pressure regulating valve used in the capacitor according to the twenty-fifth embodiment of the present invention.

In FIGS. 34A to 34C, the pressure regulating valve includes elastic member 4627, which is a cylindrical member made of an elastic material such as rubber. Elastic member 4627 is provided at one end thereof with flange 4627a and at the other end thereof with engaging section 4627b protruding outwardly. Flange 4627a, which is the upper surface of elastic member 4627, is provided thereon with gas-permeable sheet 467 so as to seal the opening of the cylindrical body. The pressure regulating valve further includes cover 4628, which is made of a rigid body and has holes 4628a in its periphery. Cover 4628 is made of metal in the present twenty-fifth embodiment, but alternatively, can be made of resin. The pressure regulating valve further includes terminal plate 4629 having electrolyte filling hole 4629a and depression 4629b. Depression 4629b is formed on hole 4629a and has the valve body fitted therein.

In the pressure regulating valve of the present twenty-fifth embodiment thus structured, gas-permeable sheet 467 is joined to the upper surface of elastic member 4627 so as to seal the hole. Then, gas-permeable sheet 467, valve body 468, and cover 4628 stacked in this order are pressed into electrolyte filling hole 4629a of terminal plate 4629 so as to engage engaging section 4627b of elastic member 4627 with the inner surface of terminal plate 4629. Then, caulking portion 4629c of terminal plate 4629 is caulked onto the periphery of cover 4628 so as to hold valve body 468 in the compressed state. As a result, the pressure regulating valve is attached as shown in FIG. 34C.

The pressure regulating valve of the present twenty-fifth embodiment thus structured can be reduced in overall height.

Twenty-Sixth Embodiment

The capacitor of a twenty-sixth embodiment differs from the capacitor of the twenty-fourth embodiment only in part of the pressure regulating valve. Therefore, like components are labeled with like reference numerals with respect to the twenty-fourth embodiment and the description of these components is not repeated here. The following description is focused on the differences between these embodiments with reference to drawings.

Figure 35A:
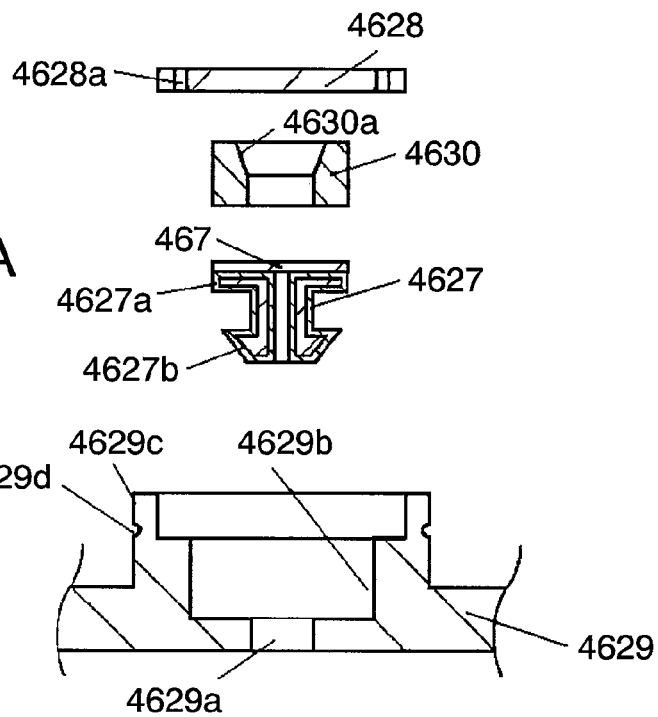
FIG. 35A is an exploded sectional view of a pressure regulating valve used in a capacitor according to a twenty-sixth embodiment of the present invention.
Figure 35B:
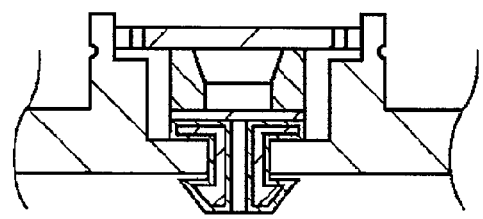
FIG. 35B is a sectional view before assembly of the pressure regulating valve used in the capacitor according to the twenty-sixth embodiment of the present invention.
Figure 35C:
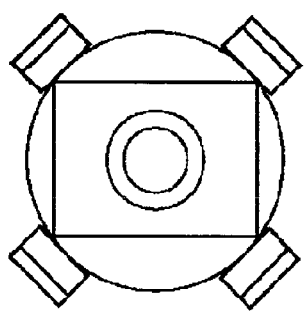
FIG. 35C is a plan view of an essential part excluding a cover of the capacitor according to the twenty-sixth embodiment of the present invention.
Figure 35D:
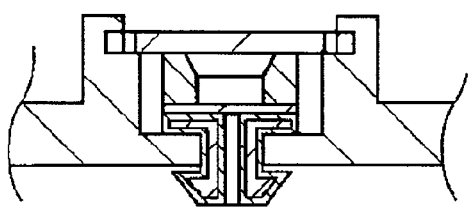
FIG. 35D is a sectional view after assembly of the pressure regulating valve used in the capacitor according to the twenty-sixth embodiment of the present invention.

FIG. 35A is an exploded sectional view of a pressure regulating valve used in a capacitor according to a twenty-sixth embodiment of the present invention. FIG. 35B is a sectional view before assembly of the pressure regulating valve used in the capacitor according to the twenty-sixth embodiment of the present invention. FIG. 35C is a plan view of an essential part excluding a cover of the capacitor according to the twenty-sixth embodiment of the present invention. FIG. 35D is a sectional view after assembly of the pressure regulating valve used in the capacitor according to the twenty-sixth embodiment of the present invention.

In FIGS. 35A to 35D, elastic member 4627 is the cylindrical member made of the elastic material such as rubber and provided at one end thereof with flange 4627a and at the other end thereof with engaging section 4627b protruding outwardly. Flange 4627a, which is the upper surface of elastic member 4627, is provided thereon with gas-permeable sheet 467 so as to seal the opening of the cylindrical body. The pressure regulating valve further includes valve body 4630, which is a square member made of an elastic material such as rubber.

Terminal plate 4629 has electrolyte filling hole 4629a and depression 4629b which is formed on hole 4629a and has the valve body fitted therein. Terminal plate 4629 further has deformation inducing portion 4629d, which is used when caulking portion 4629C is processed.

In the pressure regulating valve of the present twenty-sixth embodiment thus structured, each corner of square-shaped valve body 4630 is in contact with the inner wall surfaces of depression 4629b of terminal plate 4629. This makes it easier to position valve body 4630 than in the pressure regulating valve of the twenty-fourth embodiment and can maintain the operating pressure of valve body 30 stably by high dimensional accuracy.

Twenty-Seventh Embodiment

The capacitor of a twenty-seventh embodiment differs from the capacitor of the twenty-fourth embodiment only in part of the pressure regulating valve. Therefore, like components are labeled with like reference numerals with respect to the twenty-fourth embodiment and the description of these components is not repeated here. The following description is focused on the differences between these embodiments with reference to drawings.

Figure 36A:
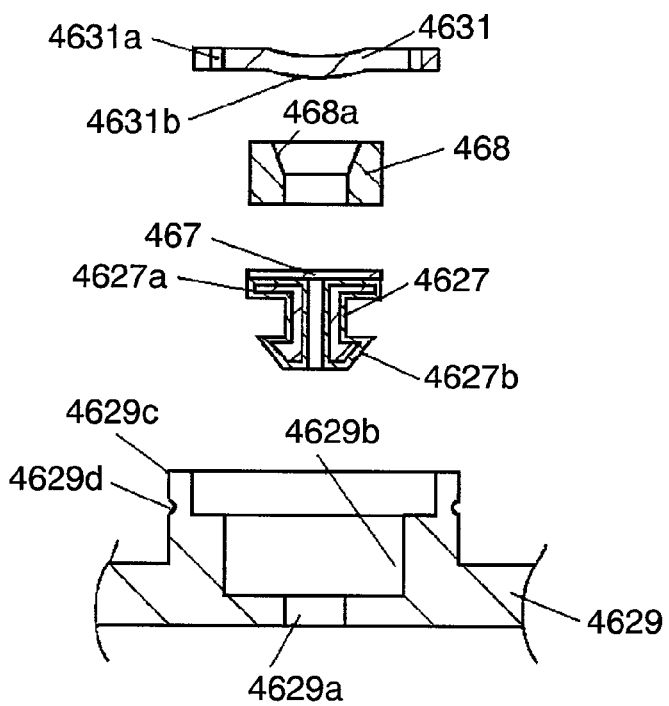
FIG. 36A is an exploded sectional view of a pressure regulating valve used in a capacitor according to a twenty-seventh embodiment of the present invention.
Figure 36B:
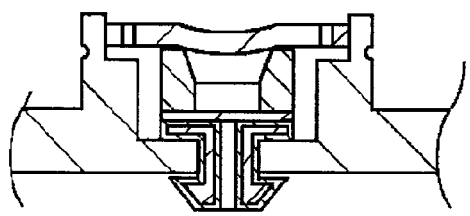
FIG. 36B is a sectional view before assembly of the pressure regulating valve used in the capacitor according to the twenty-seventh embodiment of the present invention.
Figure 36C:
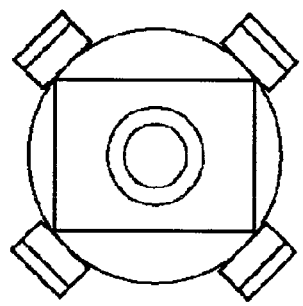
FIG. 36C is a plan view of an essential part excluding a cover of the capacitor according to the twenty-seventh embodiment of the present invention.
Figure 36D:
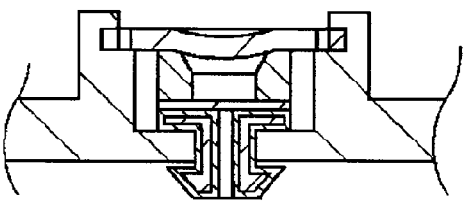
FIG. 36D is a sectional view after assembly of the pressure regulating valve used in the capacitor according to the twenty-seventh embodiment of the present invention.

FIG. 36A is an exploded sectional view of a pressure regulating valve used in a capacitor according to a twenty-seventh embodiment of the present invention. FIG. 36B is a sectional view before assembly of the pressure regulating valve used in the capacitor according to the twenty-seventh embodiment of the present invention. FIG. 36C is a plan view of an essential part excluding a cover of the capacitor according to the twenty-seventh embodiment of the present invention. FIG. 36D is a sectional view after assembly of the pressure regulating valve used in the capacitor according to the twenty-seventh embodiment of the present invention.

In FIGS. 36A to 36D, elastic member 4627 is the cylindrical member made of the elastic material such as rubber and provided at one end thereof with flange 4627a and at the other end thereof with engaging section 4627b protruding outwardly. Flange 4627a, which is the upper surface of elastic member 4627, is provided thereon with gas-permeable sheet 467 so as to seal the opening of the cylindrical body. Valve body 458 is made of the elastic material such as rubber. The pressure regulating valve further includes cover 4631, which has holes 4631a in its periphery. Cover 4631 is provided at the center of its bottom surface with protrusion 4631b to bias part of tapered portion 468a of valve body 468.

Terminal plate 4629 has electrolyte filling hole 4629a and depression 4629b. Depression 4629b is formed on hole 4629a and has the valve body fitted therein. Deformation inducing portion 4629d is used when caulking portion 4629c is processed.

In the pressure regulating valve of the present twenty-seventh embodiment thus structured, protrusion 4631b of cover 4631 is in contact with tapered portion 468a of valve body 468 and biases it. This makes it easier to position valve body 468, even when it is circular, than in the pressure regulating valve of the twenty-fourth embodiment and can maintain the operating pressure of valve body 468 stably by high dimensional accuracy.

Twenty-Eighth Embodiment

The capacitor of a twenty-eighth embodiment differs from the capacitor of the twenty-fourth embodiment only in part of the pressure regulating valve. Therefore, like components are labeled with like reference numerals with respect to the twenty-fourth embodiment and the description of these components is not repeated here. The following description is focused on the differences between these embodiments with reference to drawings.

Figure 37A:
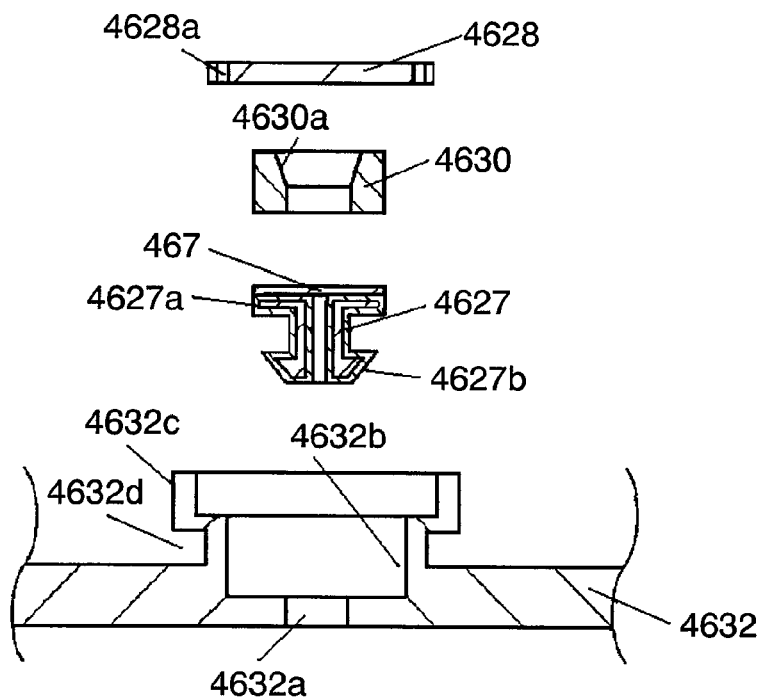
FIG. 37A is an exploded sectional view of a pressure regulating valve used in a capacitor according to a twenty-eighth embodiment of the present invention.
Figure 37B:
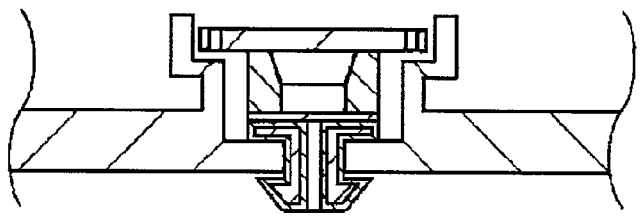
FIG. 37B is a sectional view before assembly of the pressure regulating valve used in the capacitor according to the twenty-eighth embodiment of the present invention.
Figure 37C:
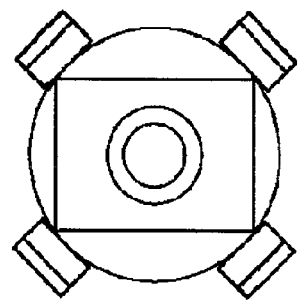
FIG. 37C is a plan view of an essential part excluding a cover of the capacitor according to the twenty-eighth embodiment of the present invention.
Figure 37D:
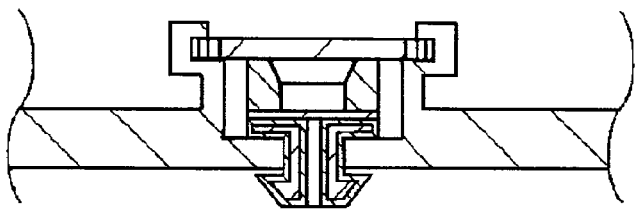
FIG. 37D is a sectional view after assembly of the pressure regulating valve used in the capacitor according to the twenty-eighth embodiment of the present invention.
Figure 38A:
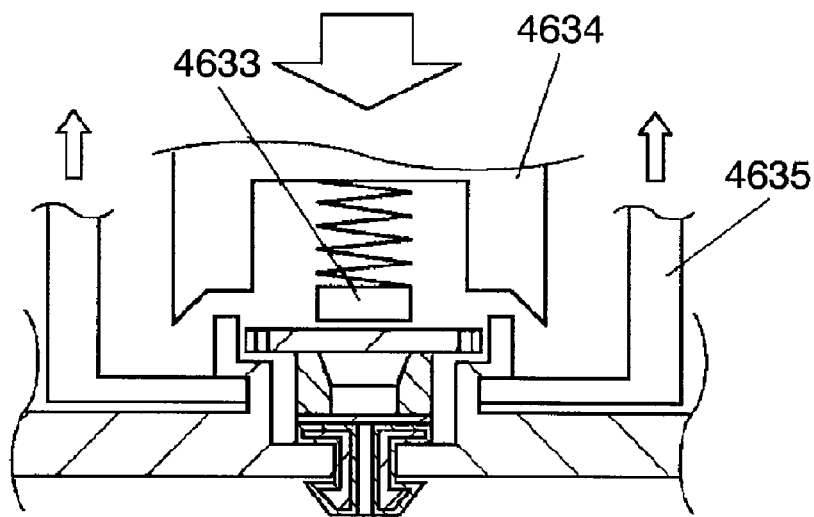
FIG. 38A is a sectional view showing assembling of the capacitor according to the twenty-eighth embodiment of the present invention.
Figure 38B:
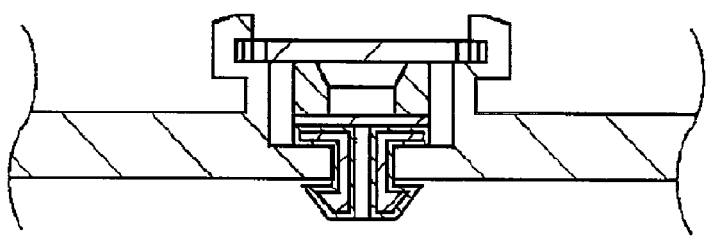
FIG. 38B is another sectional view showing assembling of the capacitor according to the twenty-eighth embodiment of the present invention.

FIG. 37A is an exploded sectional view of a pressure regulating valve used in a capacitor according to a twenty-eighth embodiment of the present invention. FIG. 37B is a sectional view before assembly of the pressure regulating valve used in the capacitor according to the twenty-eighth embodiment of the present invention. FIG. 37C is a plan view of an essential part excluding a cover of the capacitor according to the twenty-eighth embodiment of the present invention. FIG. 37D is a sectional view after assembly of the pressure regulating valve used in the capacitor according to the twenty-eighth embodiment of the present invention. FIG. 38A is a sectional view showing assembling of the capacitor according to the twenty-eighth embodiment of the present invention. FIG. 38B is another sectional view showing assembling of the capacitor according to the twenty-eighth embodiment of the present invention.

In FIGS. 37A to 37D, elastic member 4627 is the cylindrical member made of the elastic material such as rubber and provided at one end thereof with flange 4627a and at the other end thereof with engaging section 4627b protruding outwardly. Flange 4627a, which is the upper surface of elastic member 4627, is provided thereon with gas-permeable sheet 467 so as to seal the opening of the cylindrical body. Valve body 4630 is made of the elastic material such as rubber.

The pressure regulating valve further includes terminal plate 4632 having electrolyte filling hole 4632a and depression 4632b. Depression 4632b is formed on hole 4632a and has the valve body fitted therein. Terminal plate 4632 further has notch 4632d at the bottom of wall 4632c.

In the capacitor of the present twenty-eighth embodiment thus structured, wall 4632c of terminal plate 4632 is caulked onto cover 4628 so as to hold valve body 4630 in the compressed state. During the caulking, as shown in FIG. 38A, cover 4628 is pressed by using retainer plate 4633, which is biased by a spring. At the same time, the upper end of wall 4632c of terminal plate 4632 is caulked using processing jig 4634 while terminal plate 4632 is held upward using processing jig 4635 so as to be coupled with cover 4628. This prevents terminal plate 4632 from being forcibly deformed.

Twenty-Ninth Embodiment

The capacitor of a twenty-ninth embodiment differs from the capacitor of the eighteenth embodiment only in part of the pressure regulating valve. Therefore, like components are labeled with like reference numerals with respect to the eighteenth embodiment and the description of these components is not repeated here. The following description is focused on the differences between these embodiments with reference to drawings.

Figure 39A:
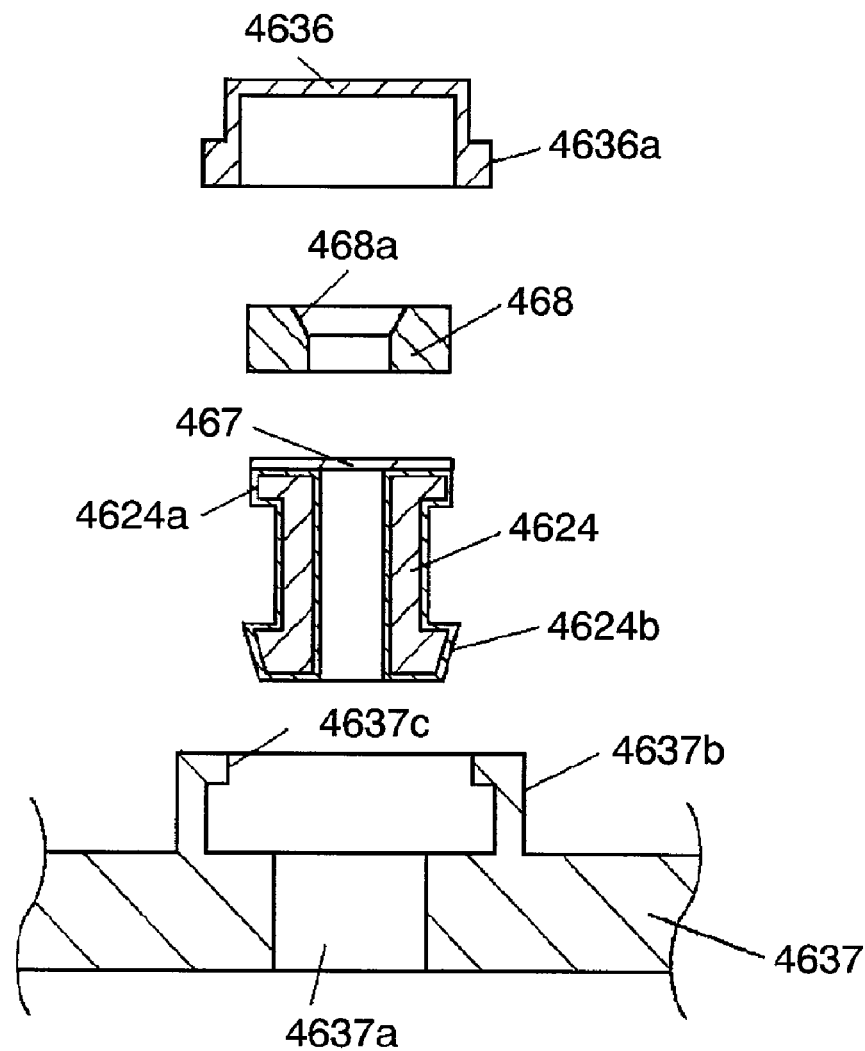
FIG. 39A is an exploded sectional view of a pressure regulating valve used in a capacitor according to a twenty-ninth embodiment of the present invention.
Figure 39B:
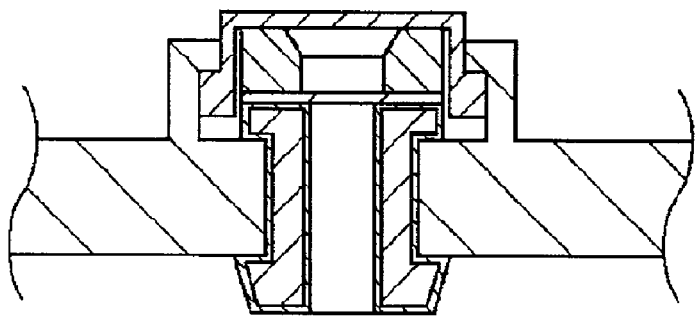
FIG. 39B is a sectional view after assembly of the pressure regulating valve used in the capacitor according to the twenty-ninth embodiment of the present invention.

FIG. 39A is an exploded sectional view of a pressure regulating valve used in a capacitor according to a twenty-ninth embodiment of the present invention. FIG. 39B is a sectional view after assembly of the pressure regulating valve used in the capacitor according to the twenty-ninth embodiment of the present invention.

In FIGS. 39A and 39B, elastic member 4624 is the cylindrical member made of the elastic material such as rubber and provided at one end thereof with flange 4624a and at the other end thereof with engaging section 4624b protruding outwardly. Flange 4624a, which is the upper surface of elastic member 4624, is provided thereon with gas-permeable sheet 467 so as to seal the opening of the cylindrical body. The pressure regulating valve further includes cap 4636, which is made of a rigid body and provided around its bottom periphery with engaging section 4636a protruding outwardly. Cap 4636 is made of metal in the present twenty-ninth embodiment, but alternatively can be made of resin.

The pressure regulating valve further includes terminal plate 4637 having electrolyte filling hole 4637a and wall 4637b annularly formed in the upper portion of the periphery of hole 4637a. Wall 4637b is provided at its end with engaging section 4637c protruding inwardly.

In the pressure regulating valve of the present twenty-ninth embodiment thus structured, gas-permeable sheet 467 is joined to the upper surface of elastic member 4624 so as to seal the hole. Then, gas-permeable sheet 467, valve body 468, and cap 4636 stacked in this order are pressed into electrolyte filling hole 4637a of terminal plate 4637 so as to engage engaging section 4624b of elastic member 4624 with the inner surface of terminal plate 4637. At the same time, engaging section 4636a of cap 4636 is fitted and engaged with engaging section 4637c of terminal plate 4637 so as to couple them and to hold valve body 468 in the compressed state. As a result, the pressure regulating valve is attached as shown in FIG. 29B.

In the pressure regulating valve of the present twenty-ninth embodiment thus structured, it is unnecessary to caulk the end of the wall of the terminal plate, thereby performing the assembly operation easily and maintaining the operating pressure of the valve body stably by high dimensional accuracy.

Thirtieth Embodiment

The capacitor of a thirtieth embodiment differs from the capacitor of the twenty-ninth embodiment only in part of the pressure regulating valve. Therefore, like components are labeled with like reference numerals with respect to the twenty-ninth embodiment and the description of these components is not repeated here. The following description is focused on the differences between these embodiments with reference to drawings.

FIG. 40A is an exploded sectional view of a pressure regulating valve used in a capacitor according to a thirtieth embodiment of the present invention. FIG. 40B is a sectional view after assembly of the pressure regulating valve used in the capacitor according to the thirtieth embodiment of the present invention.

In FIGS. 40A and 40B, elastic member 4624 is the cylindrical member made of the elastic material such as rubber and provided at one end thereof with flange 4624a and at the other end thereof with engaging section 4624b protruding outwardly. Flange 4524a, which is the upper surface of elastic member 4524, is provided thereon with gas-permeable sheet 467 so as to seal the opening of the cylindrical body. The pressure regulating valve further includes cap 4638, which is made of a rigid body and has engaging sections 4638a, which are holes formed in its peripheral surface. Cap 4638 is made of metal in the present thirtieth embodiment, but alternatively can be made of resin.

In the pressure regulating valve of the present thirtieth embodiment thus structured, gas-permeable sheet 467 is joined to the upper surface of elastic member 4624 so as to seal the hole. Then, gas-permeable sheet 467, valve body 468, and cap 4638 stacked in this order are pressed into electrolyte filling hole 4626a of terminal plate 4626 so as to engage engaging section 4624b of elastic member 4624 with the inner surface of terminal plate 4626. At the same time, engaging section 4626c of terminal plate 4626 is fitted and engaged with engaging sections 4638a of cap 4638 so as to couple them and to hold valve body 468 in the compressed state. As a result, the pressure regulating valve is attached as shown in FIG. 40B.

In the pressure regulating valve of the present thirtieth embodiment thus structured, it is unnecessary to caulk the end of the wall of the terminal plate, thereby performing the assembly operation easily and maintaining the operating pressure of the valve body stably by high dimensional accuracy.

Thirty-First Embodiment

The capacitor of a thirty-first embodiment differs from the capacitor of the twenty-ninth embodiment only in part of the pressure regulating valve. Therefore, like components are labeled with like reference numerals with respect to the twenty-ninth embodiment and the description of these components is not repeated here. The following description is focused on the differences between these embodiments with reference to drawings.

Figure 41A:
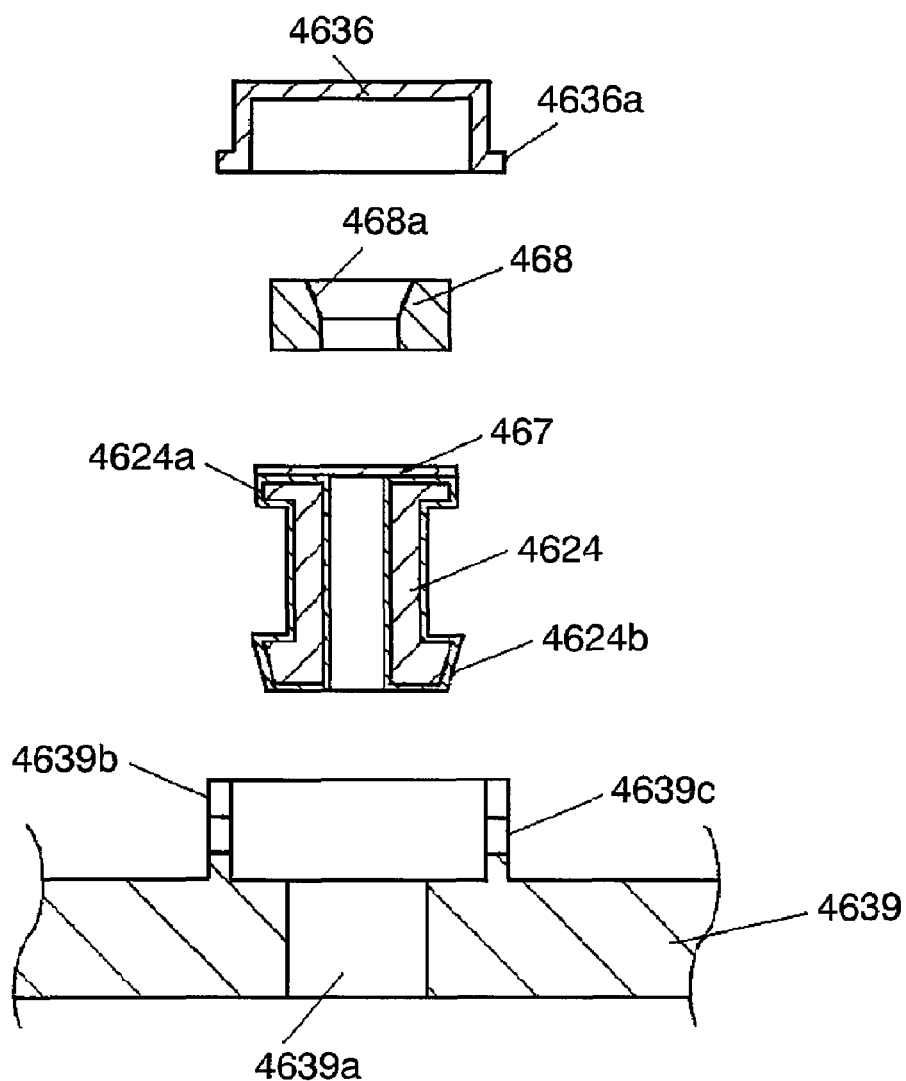
FIG. 41A is an exploded sectional view of a pressure regulating valve used in a capacitor according to a thirty-first embodiment of the present invention.
Figure 41B:
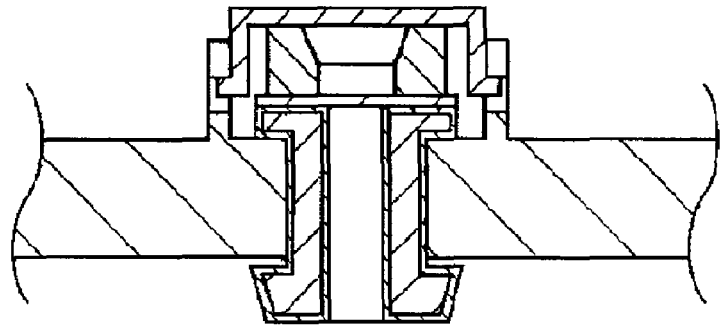
FIG. 41B is a sectional view after assembly of the pressure regulating valve used in the capacitor according to the thirty-first embodiment of the present invention.

FIG. 41A is an exploded sectional view of a pressure regulating valve used in a capacitor according to a thirty-first embodiment of the present invention. FIG. 41B is a sectional view after assembly of the pressure regulating valve used in the capacitor according to the thirty-first embodiment of the present invention.

In FIGS. 41A and 41B, the pressure regulating valve includes terminal plate 4639 having electrolyte filling hole 4639a and wall 4639b in the upper portion of the periphery of hole 4639a. Wall 4639b has engaging sections 4639c, which are holes formed therein.

In the pressure regulating valve of the present thirty-first embodiment thus structured, gas-permeable sheet 467 is joined to the upper surface of elastic member 4624 so as to seal the hole. Then, gas-permeable sheet 467, valve body 468, and cap 4636 stacked in this order are pressed into electrolyte filling hole 4639a of terminal plate 4639 so as to engage engaging section 4624b of elastic member 4624 with the inner surface of terminal plate 4639. At the same time, engaging section 4636a at the bottom periphery of cap 4636 is engaged with engaging sections 4639c of terminal plate 4639 so as to couple them and to hold valve body 468 in the compressed state. As a result, the pressure regulating valve is attached as shown in FIG. 41B.

In the pressure regulating valve of the present thirty-first embodiment thus structured, it is unnecessary to caulk the end of the wall of the terminal plate, thereby performing the assembly operation easily and maintaining the operating pressure of the valve body stably by high dimensional accuracy.

Thirty-Second Embodiment

The capacitor of a thirty-second embodiment differs from the capacitor of the eighteenth embodiment only in part of the pressure regulating valve. Therefore, like components are labeled with like reference numerals with respect to the eighteenth embodiment and the description of these components is not repeated here. The following description is focused on the differences between these embodiments with reference to drawings.

Figure 42A:
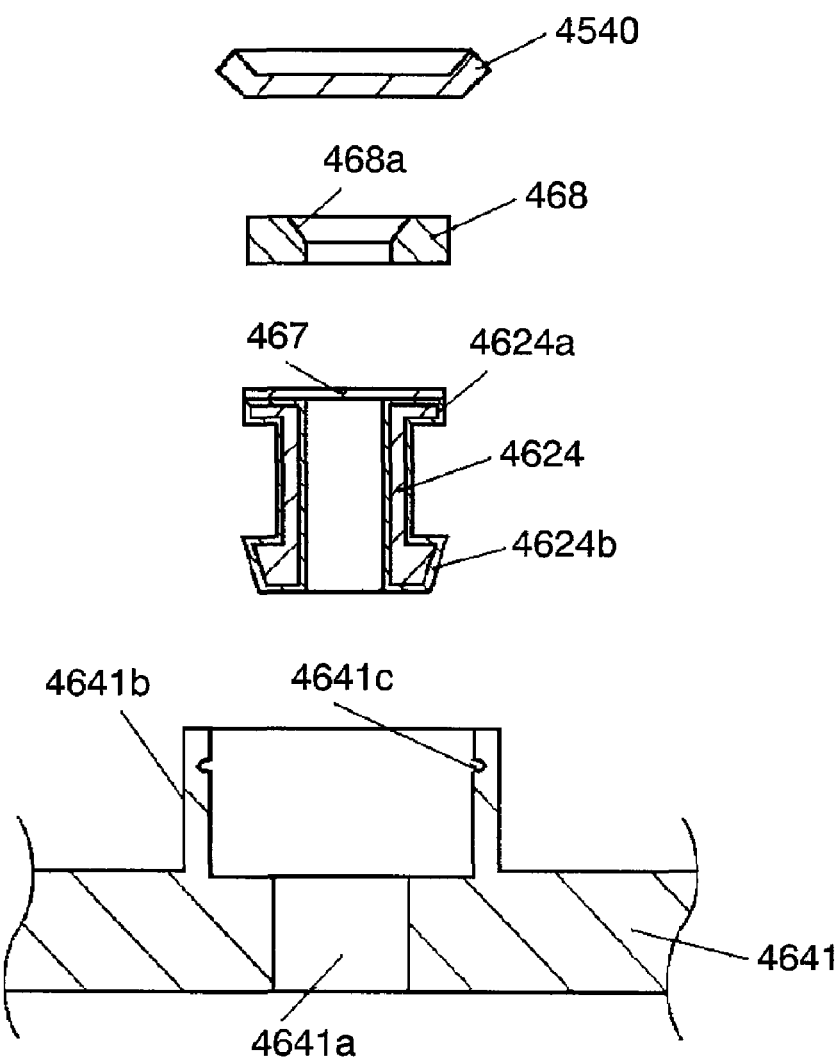
FIG. 42A is an exploded sectional view of a pressure regulating valve used in a capacitor according to a thirty-second embodiment of the present invention.
Figure 42B:
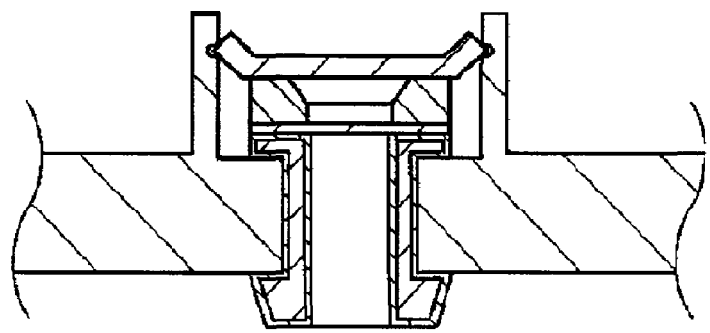
FIG. 42B is a sectional view after assembly of the pressure regulating valve used in the capacitor according to the thirty-second embodiment of the present invention.

FIG. 42A is an exploded sectional view of a pressure regulating valve used in a capacitor according to a thirty-second embodiment of the present invention. FIG. 42B is a sectional view after assembly of the pressure regulating valve used in the capacitor according to the thirty-second embodiment of the present invention.

In FIGS. 42A and 42B, elastic member 4624 is the cylindrical member made of the elastic material such as rubber and provided at one end thereof with flange 4624a and at the other end thereof with engaging section 4624b protruding outwardly. Flange 4624a, which is the upper surface of elastic member 4624, is provided thereon with gas-permeable sheet 7 so as to seal the opening of the cylindrical body. Valve body 468 is made of the elastic material such as rubber.

FIG. 25A is a plan view of a retainer plate used in the capacitor according to the thirty-second embodiment of the present invention. FIG. 25B is a sectional view of the retainer plate used in the capacitor according to the thirty-second embodiment of the present invention.

In FIGS. 25A and 25B, retainer plate 4540 is made of the rigid body. Retainer plate 4540 has the flat portion in contact with the upper surface of valve body 468, and the plurality of annular and strip-shaped engaging sections 4540a extending upwardly from the periphery of the flat portion. Engaging sections 4540a have notches 4540b therebetween. Retainer plate 4540 is made of metal in the present thirty-second embodiment, but alternatively can be made of resin.

In the pressure regulating valve of the present thirty-second embodiment thus structured, gas-permeable sheet 467 is joined to the upper surface of elastic member 4624 so as to seal the hole. Then, gas-permeable sheet 467, valve body 468, and retainer plate 4540 stacked in this order are pressed into electrolyte filling hole 4641a of terminal plate 4641. At the same time, engaging sections 4540a of retainer plate 4540 are fitted into engaging sections 4641c formed on the inner peripheral surface of annular wall 4641b around the periphery of hole 4641a so as to couple them and to hold valve body 468 in the compressed state. As a result, the pressure regulating valve is attached as shown in FIG. 42B.

In the pressure regulating valve of the present thirty-second embodiment thus structured, the assembly operation is performed easily and the operating pressure of the valve body is maintained stably by high dimensional accuracy.

Thirty-Third Embodiment

Figure 43A:
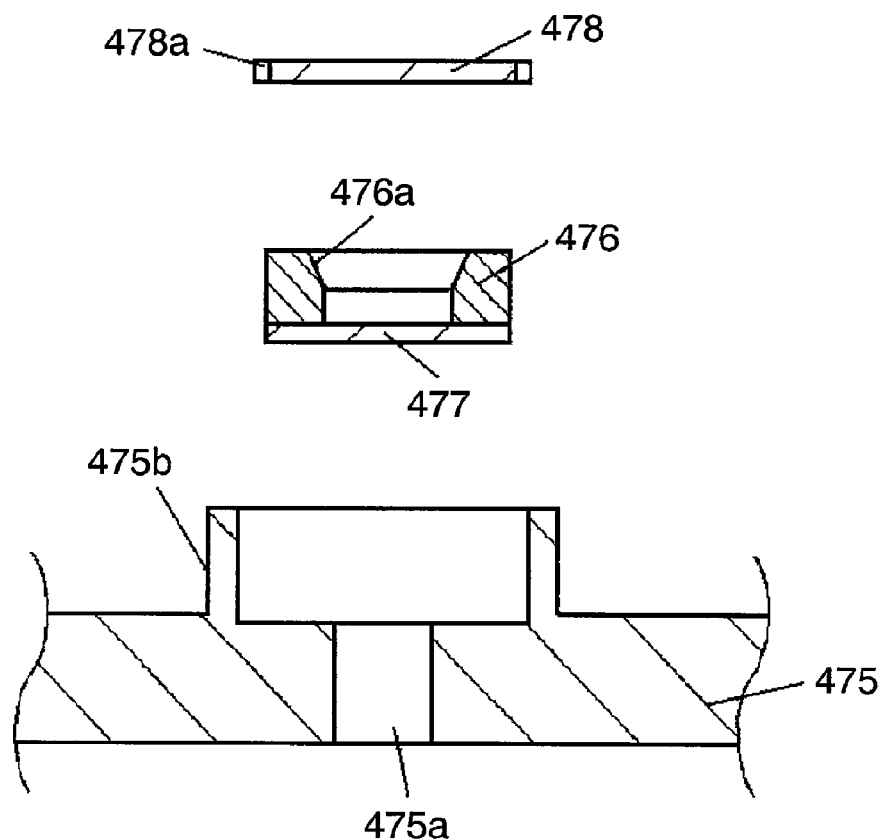
FIG. 43A is an exploded sectional view of a pressure regulating valve used in a capacitor according to a twenty-third embodiment of the present invention.
Figure 43B:
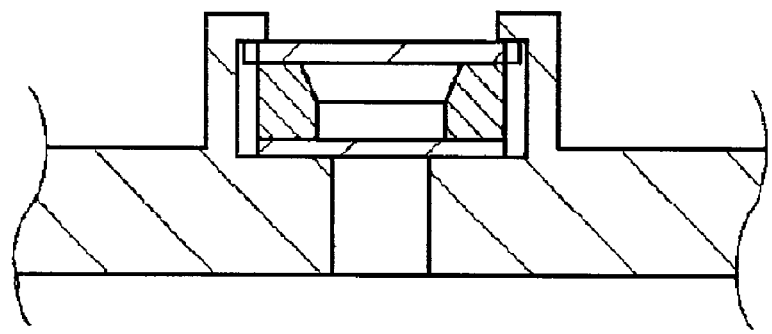
FIG. 43B is a sectional view after assembly of the pressure regulating valve used in the capacitor according to the thirty-third embodiment of the present invention.

FIG. 43A is an exploded sectional view of a pressure regulating valve used in a capacitor according to a twenty-third embodiment of the present invention. FIG. 43B is a sectional view after assembly of the pressure regulating valve used in the capacitor according to the thirty-third embodiment of the present invention.

In FIGS. 43A and 43B, the pressure regulating valve includes terminal plate 475 having electrolyte filling hole 475a and wall 475b, which is annularly formed in the upper portion of the periphery of hole 475a. The pressure regulating valve further includes valve body 476 made of an elastic material such as rubber. Valve body 476 is ring-shaped and has tapered portion 476a extending from the upper end of the inner peripheral surface toward the outer peripheral surface of valve body 476. Valve body 476 is made of isoprene-isobutylene rubber (hereinafter, IIR) in the present thirty-third embodiment, but alternatively can be made of EPT.

The pressure regulating valve further includes gas-permeable sheet 477, which is joined to the bottom surface of valve body 6. Gas-permeable sheet 477 has physical properties that allow the gas generated in the capacitor to pass through it but does not allow the driving electrolyte to pass through it.

The pressure regulating valve further includes cover 478, which is made of a rigid body and has notches 478a on its periphery. Cover 478 is made of resin the present thirty-third embodiment, but alternatively can be made of metal. Note that the notches can be replaced by holes.

In the pressure regulating valve of the present thirty-third embodiment thus structured, gas-permeable sheet 477 is joined by, for example, bonding to the bottom surface of valve body 476 so as to seal the hole of valve body 476. Then, valve body 476 and cover 478 stacked thereon are disposed to seal electrolyte filling hole 475a of terminal plate 475. Then, annular wall 475b formed around the periphery of hole 475a of terminal plate 475 is caulked to cover 478 so as to hold valve body 476 in the compressed state. As a result, the pressure regulating valve is attached as shown in FIG. 43B.

In the pressure regulating valve of the present thirty-third embodiment thus structured, valve body 476 and gas-permeable sheet 477 are joined to each other. This allows the gas generated in the capacitor to pass through gas-permeable sheet 477; then to pass through the hollow portion in the center of ring-shaped valve body 476; and then to pass through the contact surface between valve body 476 and cover 478 so as to be released to the outside through notches 478a of cover 478. Since gas-permeable sheet 477 does not allow the driving electrolyte to pass through it, the driving electrolyte is prevented from leaking by valve body 476. As a result, the capacitor can be highly reliable.

Furthermore, as described above, ring-shaped valve body 476 has tapered portion 476a extending from the upper end of the inner peripheral surface toward the outer peripheral surface of valve body 476. This maintains the operating pressure of valve body 476 more stably during the gas release.

Thirty-Fourth Embodiment

The capacitor of a thirty-fourth embodiment differs from the capacitor of the thirty-third embodiment only in part of the pressure regulating valve. Therefore, like components are labeled with like reference numerals with respect to the thirty-third embodiment and the description of these components is not repeated here. The following description is focused on the differences between these embodiments with reference to drawings.

Figure 44A:
FIG. 44A is an exploded sectional view of a pressure regulating valve used in a capacitor according to a thirty-fourth embodiment of the present invention.
Figure 44A:
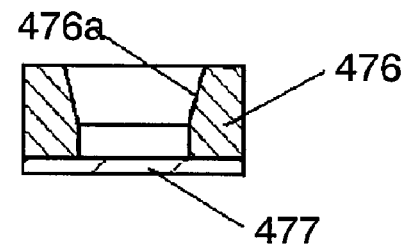
Figure 44B:
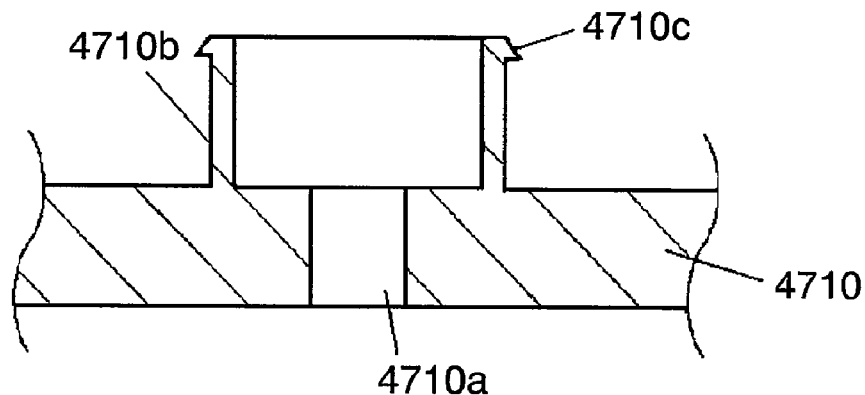
FIG. 44B is a sectional view after assembly of the pressure regulating valve used in the capacitor according to the thirty-fourth embodiment of the present invention.
Figure 44B:
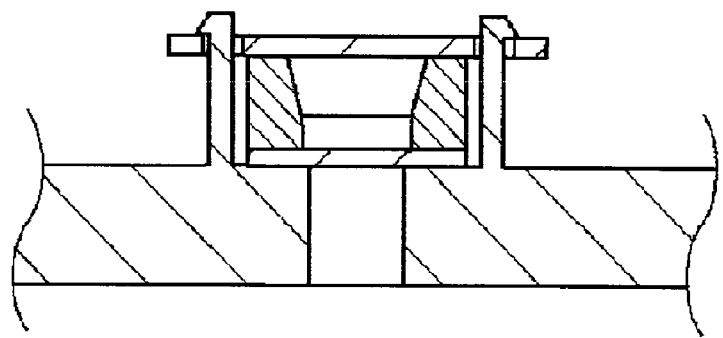

FIG. 44A is an exploded sectional view of a pressure regulating valve used in a capacitor according to a thirty-fourth embodiment of the present invention. FIG. 44B is a sectional view after assembly of the pressure regulating valve used in the capacitor according to the thirty-fourth embodiment of the present invention.

In FIGS. 44A and 44B, the pressure regulating valve includes cover 479, which is made of a rigid body and has holes 479a in its periphery. Cover 479 is made of resin in the present thirty-fourth embodiment, but alternatively can be made of metal.

The pressure regulating valve further includes terminal plate 4710 having electrolyte filling hole 4710a and wall 4710b in the upper portion of the periphery of hole 4710a. Wall 4710b is provided at its upper end with engaging section 4710c protruding outwardly. Note that engaging section 4710c may be designed to protrude inwardly.

In the pressure regulating valve of the present thirty-fourth embodiment thus structured, the coupling between cover 479 and terminal plate 4710 is facilitated by fitting engaging section 4710c of terminal plate 4710 into holes 479a of cover 479. Furthermore, the fixed dimension between terminal plate 4710 and cover 479 maintains the compressed state and hence the operating pressure of valve body 476.

Thirty-Fifth Embodiment

The capacitor of a thirty-fifth embodiment differs from the capacitor of the thirty-third embodiment only in part of the pressure regulating valve. Therefore, like components are labeled with like reference numerals with respect to the thirty-third embodiment and the description of these components is not repeated here. The following description is focused on the differences between these embodiments with reference to drawings.

Figure 45A:
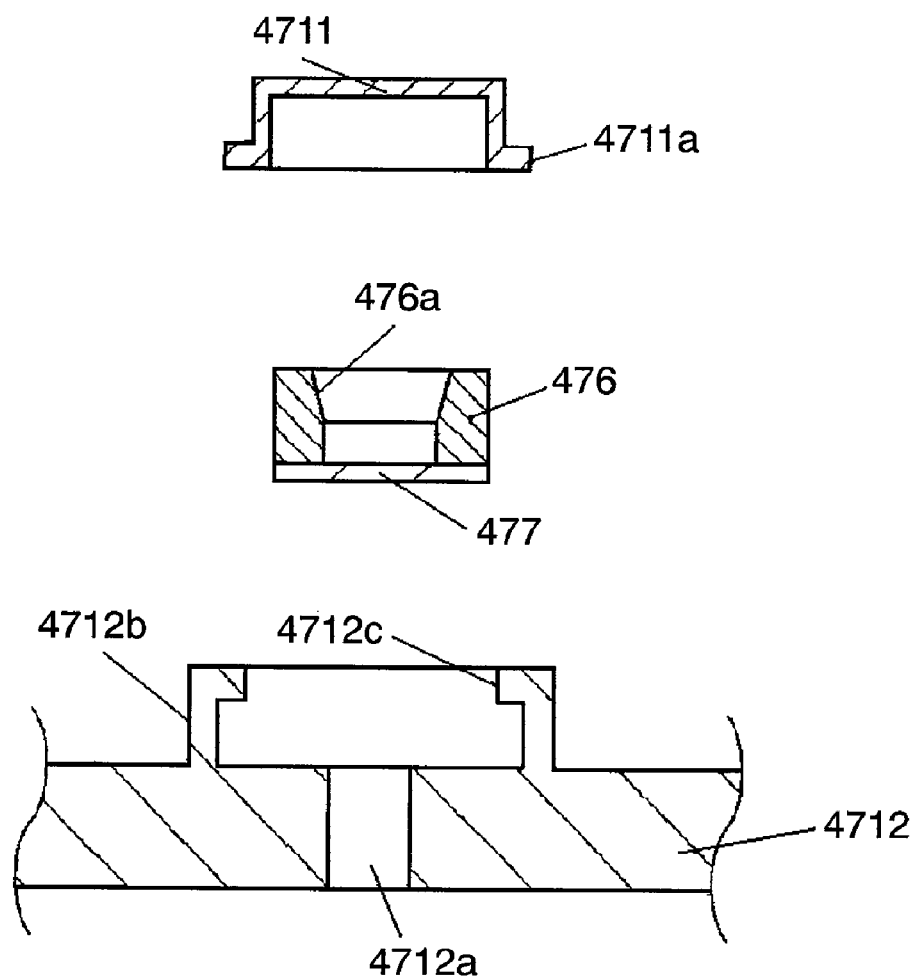
FIG. 45A is an exploded sectional view of a pressure regulating valve used in a capacitor according to a thirty-fifth embodiment of the present invention.
Figure 45B:
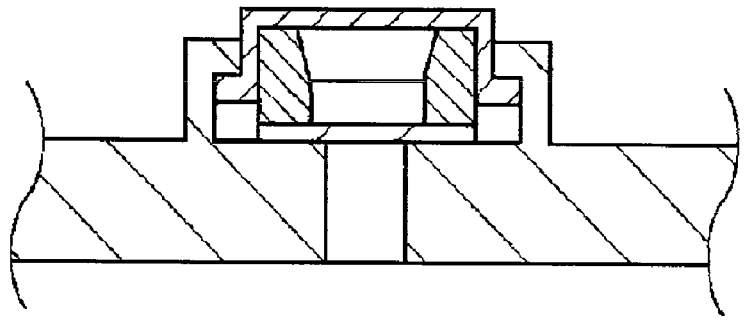
FIG. 45B is a sectional view after assembly of the pressure regulating valve used in the capacitor according to the thirty-fifth embodiment of the present invention.

FIG. 45A is an exploded sectional view of a pressure regulating valve used in a capacitor according to a thirty-fifth embodiment of the present invention. FIG. 45B is a sectional view after assembly of the pressure regulating valve used in the capacitor according to the thirty-fifth embodiment of the present invention.

In FIGS. 45A and 45B, the pressure regulating valve includes cap 4711, which is a roof-shaped member made of a rigid body. Cap 4711 has flange-like engaging section 4711a on its bottom periphery. Cap 4711 is made of metal in the present thirty-fifth embodiment, but alternatively can be made of resin.

The pressure regulating valve further includes terminal plate 4712 having electrolyte filling hole 4712a and wall 4712b in the upper portion of the periphery of hole 4712a. Wall 4712b is provided at its upper end with engaging section 4712c protruding inwardly.

In the pressure regulating valve of the present thirty-fifth embodiment thus structured, the coupling between cap 4711 and terminal plate 4712 is facilitated by fitting engaging section 4711a of cap 4711 into engaging section 4712c of terminal plate 4712. Furthermore, the fixed dimension between terminal plate 4712 and cap 4711 maintains the compressed state and hence the operating pressure of valve body 476.

Thirty-Sixth Embodiment

The capacitor of a thirty-sixth embodiment differs from the capacitor of the thirty-fifth embodiment only in part of the pressure regulating valve. Therefore, like components are labeled with like reference numerals with respect to the thirty-fifth embodiment and the description of these components is not repeated here. The following description is focused on the differences between these embodiments with reference to drawings.

Figure 46A:
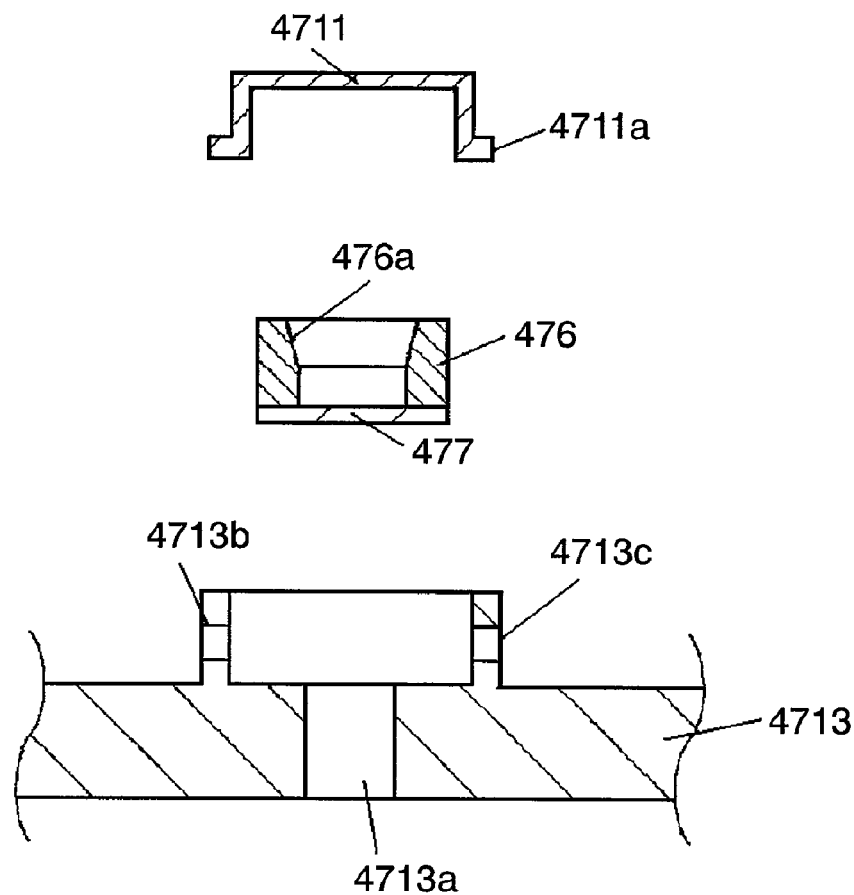
FIG. 46A is an exploded sectional view of a pressure regulating valve used in a capacitor according to a thirty-sixth embodiment of the present invention.
Figure 46B:
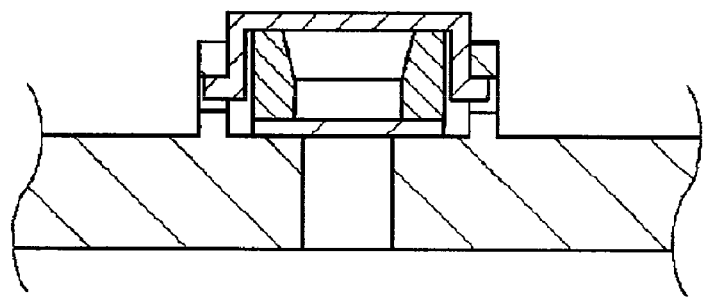
FIG. 46B is a sectional view after assembly of the pressure regulating valve used in the capacitor according to the thirty-sixth embodiment of the present invention.

FIG. 46A is an exploded sectional view of a pressure regulating valve used in a capacitor according to a thirty-sixth embodiment of the present invention. FIG. 46B is a sectional view after assembly of the pressure regulating valve used in the capacitor according to the thirty-sixth embodiment of the present invention.

In FIGS. 46A and 46B, the pressure regulating valve includes terminal plate 4713 having electrolyte filling hole 4713a and wall 4713b in the upper portion of the periphery of hole 4713a. Wall 4713b has holes 4713c formed therein.

In the pressure regulating valve of the present thirty-sixth embodiment thus structured, the coupling between cap 4711 and terminal plate 4713 is facilitated by fitting engaging section 4711a of cap 4711 into holes 4713c of terminal plate 4713. Furthermore, the fixed dimension between terminal plate 4713 and cap 4711 maintains the compressed state and hence the operating pressure of valve body 476.

Thirty-Seventh Embodiment

The capacitor of a thirty-seventh embodiment differs from the capacitor of the thirty-fifth embodiment only in part of the pressure regulating valve. Therefore, like components are labeled with like reference numerals with respect to the thirty-fifth embodiment and the description of these components is not repeated here. The following description is focused on the differences between these embodiments with reference to drawings.

Figure 47A:
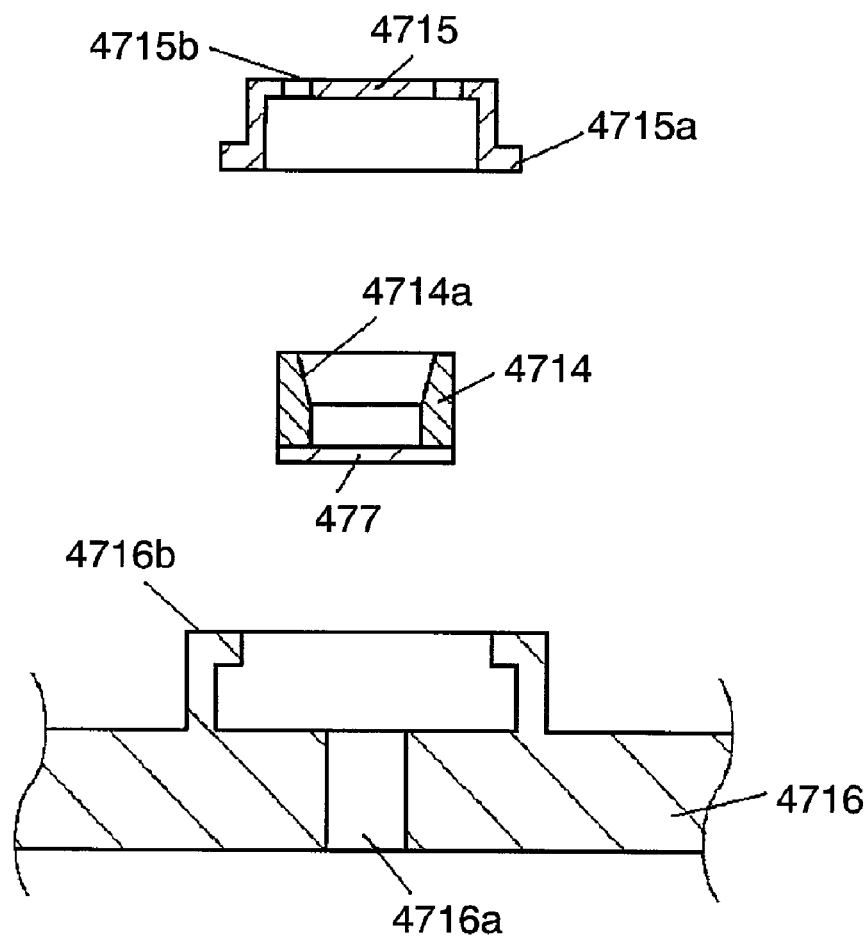
FIG. 47A is an exploded sectional view of a pressure regulating valve used in a capacitor according to a twenty-seventh embodiment of the present invention.
Figure 47B:
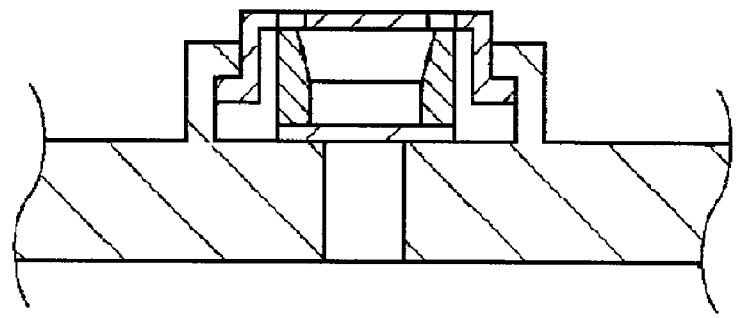
FIG. 47B is a sectional view after assembly of the pressure regulating valve used in the capacitor according to the thirty-seventh embodiment of the present invention.
Figure 48A:
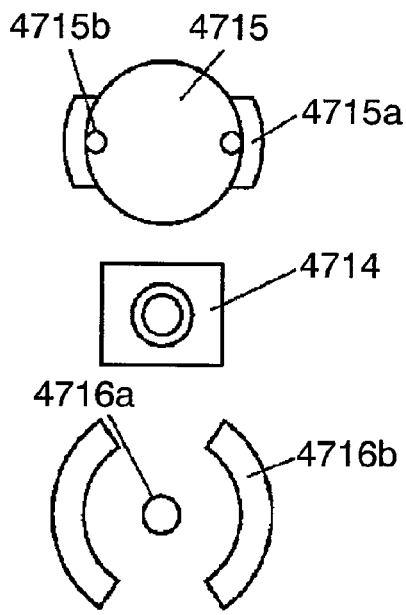
FIG. 48A is a plan view showing assembling of the pressure regulating valve used in the capacitor according to the thirty-seventh embodiment of the present invention.
Figure 48B:
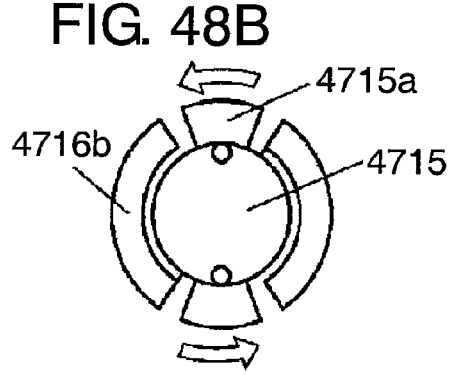
FIG. 48B is another plan view showing assembling of the pressure regulating valve used in the capacitor according to the thirty-seventh embodiment of the present invention.
Figure 48D:
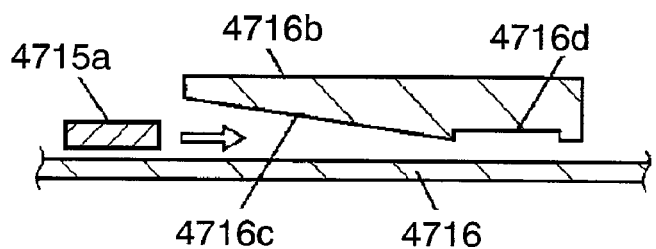
FIG. 48D is a sectional view of an essential part showing assembling of the pressure regulating valve used in the capacitor according to the thirty-seventh embodiment of the present invention.
Figure 48C:
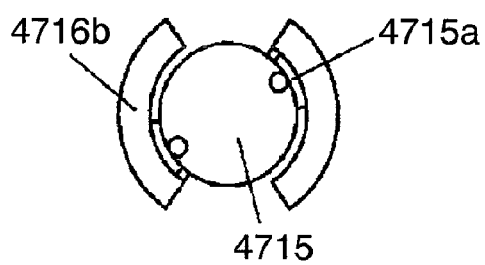
FIG. 48C is another plan view showing assembling of the pressure regulating valve used in the capacitor according to the thirty-seventh embodiment of the present invention.
Figure 48E:
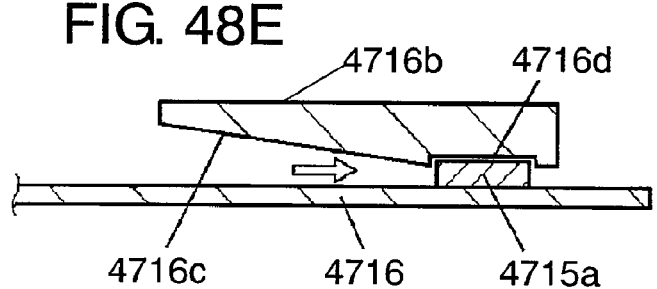

FIG. 47A is an exploded sectional view of a pressure regulating valve used in a capacitor according to a twenty-seventh embodiment of the present invention. FIG. 47B is a sectional view after assembly of the pressure regulating valve used in the capacitor according to the thirty-seventh embodiment of the present invention. FIG. 48A is a plan view showing assembling of the pressure regulating valve used in the capacitor according to the thirty-seventh embodiment of the present invention. FIG. 48B is another plan view showing assembling of the pressure regulating valve used in the capacitor according to the thirty-seventh embodiment of the present invention. FIG. 48C is another plan view showing assembling of the pressure regulating valve used in the capacitor according to the thirty-seventh embodiment of the present invention. FIG. 48D is a sectional view of an essential part showing assembling of the pressure regulating valve used in the capacitor according to the thirty-seventh embodiment of the present invention. FIG. 48E is another sectional view of the essential part showing assembling of the pressure regulating valve used in the capacitor according to the thirty-seventh embodiment of the present invention.

In FIGS. 47A, 47B, and 48A to 48E, the pressure regulating valve includes cap 4715, which is a roof-shaped member made of a rigid body. Cap 4715 has a pair of engaging sections 4715a protruding outwardly from its bottom periphery and holes 4715b for communication with outside. Cap 4715 is made of metal in the present thirty-seventh embodiment, but alternatively can be made of resin. The pressure regulating valve further includes valve body 4714, which is a square member made of an elastic material such as rubber.

The pressure regulating valve further includes terminal plate 4716 having electrolyte filling hole 4716a and a pair of engaging sections 4716b. Engaging sections 4716b are circular arcs formed in the upper portion of the periphery of hole 4716a. As shown in FIG. 48D, engaging sections 4716b are structured in such a manner that when cap 4715 is rotated while being in close contact with terminal plate 4716, engaging sections 4715a of cap 4715 are slid and fitted thereinto. Terminal plate 4716 further has tapered portions 4716c, which are designed to be thinner in the height direction (the thickness direction of engaging sections 4715a) as engaging sections 4715a are slid deeper thereinto. Tapered portions 4716c are provided at their ends with fixing portions 4716d into which engaging sections 4715a are fitted.

In the pressure regulating valve of the present thirty-seventh embodiment thus structured, gas-permeable sheet 477 is disposed on the bottom surface of valve body 4714 so as to seal the hole of square-shaped valve body 4714. Then, valve body 4714 and cap 4715 stacked thereon are disposed to seal electrolyte filling hole 4716a of terminal plate 4716. Then, cap 4715 is rotated in such a manner that engaging sections 4715a of cap 4715 are fitted into the pair of engaging sections 4716b of the periphery of hole 4716a so as to couple them and to hold valve body 4714 in the compressed state. As a result, the pressure regulating valve is attached as shown in FIG. 47B.

In the pressure regulating valve of the present thirty-seventh embodiment thus structured, the coupling between cap 4715 and terminal plate 4716 is greatly facilitated.

Thirty-Eighth Embodiment

The capacitor of a thirty-eighth embodiment differs from the capacitor of the thirty-third embodiment only in part of the pressure regulating valve. Therefore, like components are labeled with like reference numerals with respect to the thirty-third embodiment and the description of these components is not repeated here. The following description is focused on the differences between these embodiments with reference to drawings.

Figure 49A:
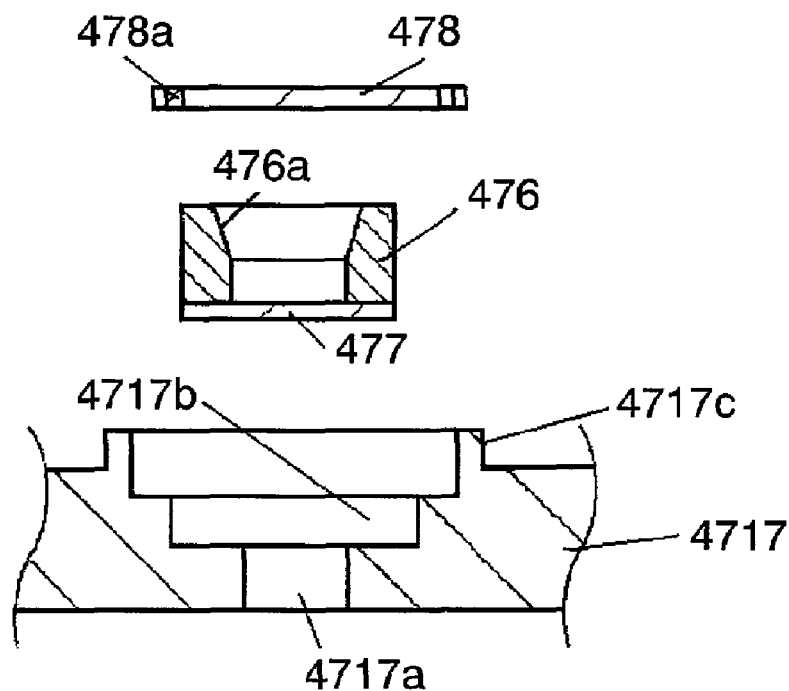
Figure 49B:
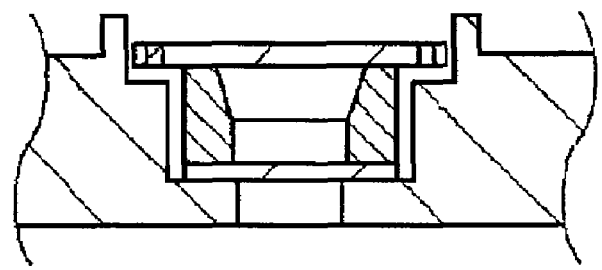
Figure 49C:
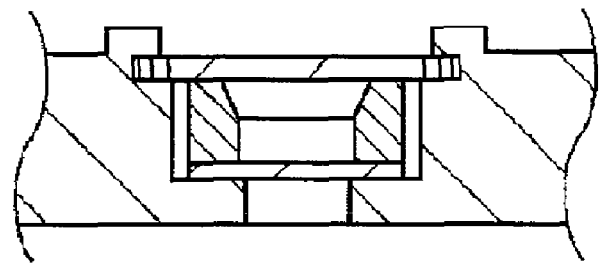

FIG. 49A is an exploded sectional view of a pressure regulating valve used in a capacitor according to a thirty-eighth embodiment of the present invention. FIG. 49B is a sectional view before assembly of the pressure regulating valve used in the capacitor according to the thirty-eighth embodiment of the present invention. FIG. 49C is a sectional view after assembly of the pressure regulating valve used in the capacitor according to the thirty-eighth embodiment of the present invention.

In FIGS. 49A to 49C, cover 478 is made of the rigid body and has holes 478a in its periphery. Cover 478 is made of metal in the present thirty-eighth embodiment, but alternatively can be made of resin.

The pressure regulating valve includes terminal plate 4717 having electrolyte filling hole 4717a and depression 4717b. Depression 4717b is formed on hole 4717a and has the valve body fitted therein.

In the pressure regulating valve of the present thirty-eighth embodiment thus structured, gas-permeable sheet 477 is disposed on the bottom surface of valve body 476 so as to seal the hole of valve body 476. Then, valve body 476 and cover 478 stacked thereon are disposed to seal electrolyte filling hole 4717a of terminal plate 4717. Then, valve body 476 is fitted into depression 4717b of terminal plate 4717, and caulking portion 4717c of terminal plate 4717 is caulked onto the periphery of cover 478 so as to hold valve body 476 in the compressed state. As a result, the pressure regulating valve is attached as shown in FIG. 49C.

The pressure regulating valve of the present thirty-eighth embodiment thus structured can be reduced in overall height.

Thirty-Ninth Embodiment

The capacitor of a thirty-ninth embodiment differs from the capacitor of the thirty-eighth embodiment only in part of the pressure regulating valve. Therefore, like components are labeled with like reference numerals with respect to the thirty-eighth embodiment and the description of these components is not repeated here. The following description is focused on the differences between these embodiments with reference to drawings.

Figure 50A:
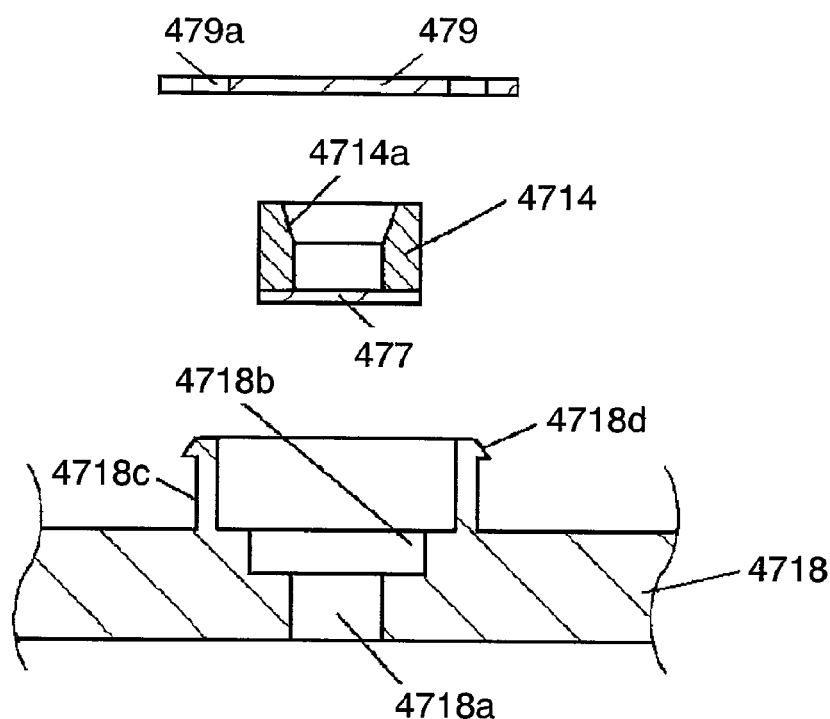
Figure 50B:
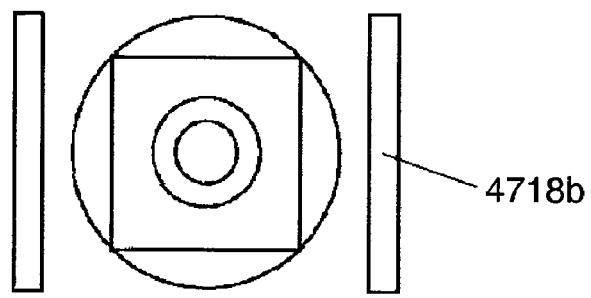
Figure 50C:
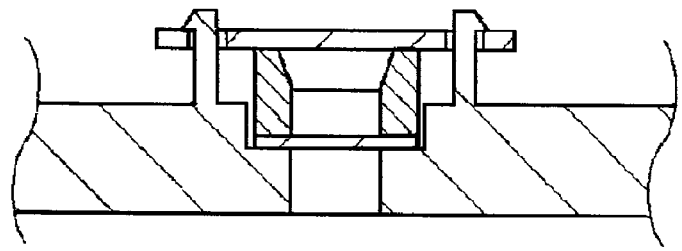
Figure 51:
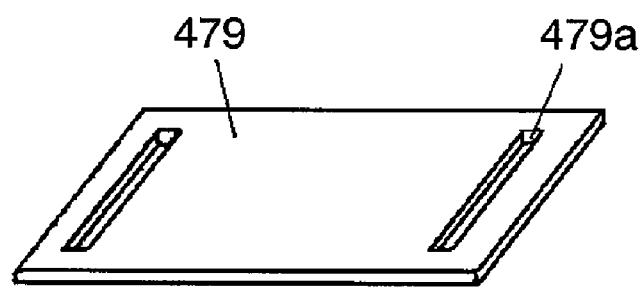
Figure 51:
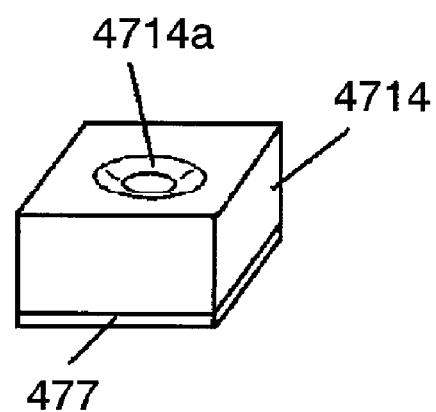
Figure 51:
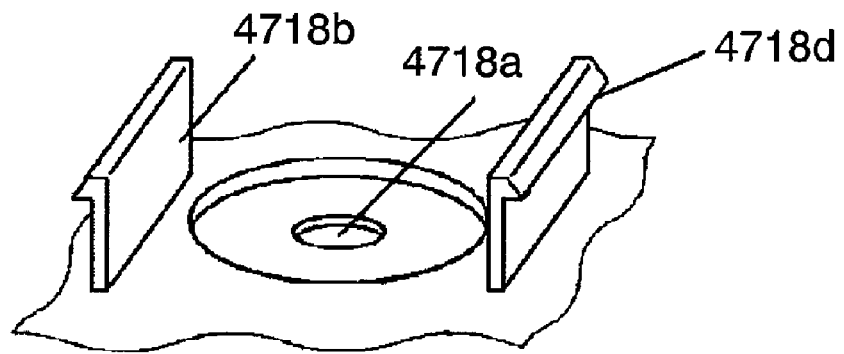

FIG. 50A is an exploded sectional view of a pressure regulating valve used in a capacitor according to a thirty-ninth embodiment of the present invention. FIG. 50B is a plan view of an essential part excluding a cover of the capacitor according to the thirty-ninth embodiment of the present invention. FIG. 50C is a sectional view after assembly of the pressure regulating valve used in the capacitor according to the thirty-ninth embodiment of the present invention. FIG. 51 is a perspective view of FIG. 50A.

In FIGS. 50A to 50C and 51, valve body 4714 is the square member made of the elastic material such as rubber.

The pressure regulating valve further includes terminal plate 4718 having electrolyte filling hole 4718a, depression 4718b, and wall 4718c. Depression 4718b is formed on hole 4718a and has valve body 4714 fitted therein. Wall 4718c is provided at its end with caulking portions 4718d protruding outwardly (or inwardly).

In the pressure regulating valve of the present thirty-ninth embodiment thus structured, each corner of square-shaped valve body 4714 is in contact with the inner wall surfaces of depression 4718b of terminal plate 4718. This makes it easier to position valve body 4714 than in the pressure regulating valve of the thirty-eighth embodiment and can maintain the operating pressure of valve body 4714 stably by high dimensional accuracy.

Fortieth Embodiment

The capacitor of a fortieth embodiment differs from the capacitor of the thirty-ninth embodiment only in part of the pressure regulating valve. Therefore, like components are labeled with like reference numerals with respect to the thirty-ninth embodiment and the description of these components is not repeated here. The following description is focused on the differences between these embodiments with reference to drawings.

Figure 52A:
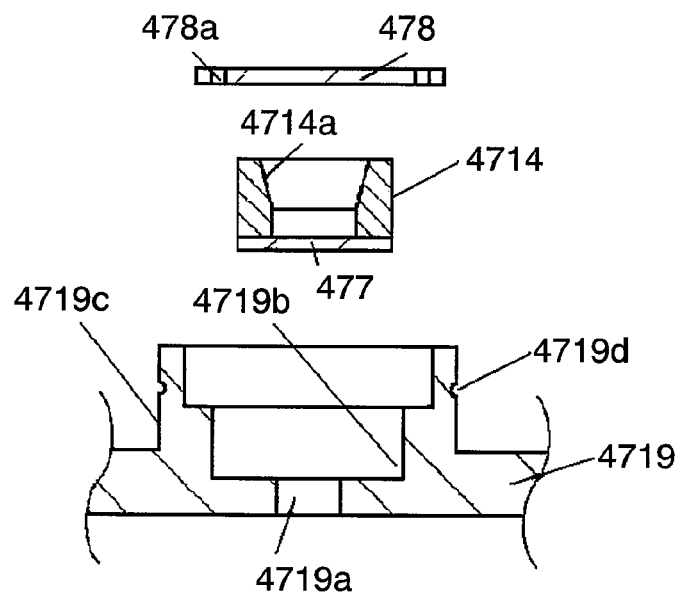
Figure 52B:
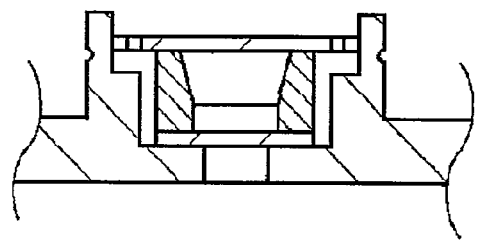
Figure 52C:
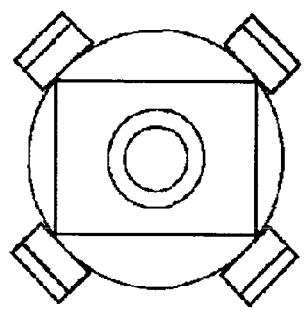
Figure 52D:
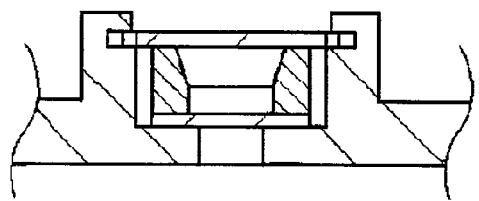

FIG. 52A is an exploded sectional view of a pressure regulating valve used in a capacitor according to a fortieth embodiment of the present invention. FIG. 52B is a sectional view before assembly of the pressure regulating valve used in the capacitor according to the fortieth embodiment of the present invention. FIG. 52C is a plan view of an essential part excluding a cover of the capacitor according to the fortieth embodiment of the present invention. FIG. 52D is a sectional view after assembly of the pressure regulating valve used in the capacitor according to the fortieth embodiment of the present invention.

In FIGS. 52A to 52D, the pressure regulating valve includes terminal plate 4719 having electrolyte filling hole 4719a, depression 4719b, and wall 4719c. Depression 4719b is formed on hole 4719a and has valve body 4714 fitted therein. Wall 4719c is provided on its peripheral surface with deformation inducing portion 4719d.

In the pressure regulating valve of the present fortieth embodiment thus structured, deformation inducing portion 4719d of terminal plate 4719 facilitates the caulking of the end of wall 4719c of terminal plate 4719 onto cover 478.

Forty-First Embodiment

The capacitor of a forty-first embodiment differs from the capacitor of the thirty-ninth embodiment only in part of the pressure regulating valve. Therefore, like components are labeled with like reference numerals with respect to the thirty-ninth embodiment and the description of these components is not repeated here. The following description is focused on the differences between these embodiments with reference to drawings.

FIG. 53A is an exploded sectional view of a pressure regulating valve used in a capacitor according to a forty-first embodiment of the present invention. FIG. 53B is a plan view of an essential part excluding a cover of the capacitor according to the forty-first embodiment of the present invention.

FIG. 53C is a sectional view after assembly of the pressure regulating valve used in the capacitor according to the forty-first embodiment of the present invention. FIG. 54 is a perspective view of FIG. 53A.

In FIGS. 53A to 53C and 54, the pressure regulating valve includes cap 4720, which is made of a rigid body and has engaging sections 4720a formed on its peripheral surface. Cap 4720 is made of metal in the present forty-first embodiment, but alternatively can be made of resin.

In the pressure regulating valve of the present forty-first embodiment thus structured, terminal plate 4721 has engaging sections 4721c, which are fitted and engaged with engaging sections 4720a of cap 4720 so as to couple them and to hold valve body 4714 in the compressed state. As a result, the pressure regulating valve is attached as shown in FIG. 53C.

In the pressure regulating valve of the present forty-first embodiment thus structured, it is unnecessary to caulk the end of the wall of the terminal plate, thereby performing the assembly operation easily and maintaining the operating pressure of the valve body stably by high dimensional accuracy.

Forty-Second Embodiment

The capacitor of a forty-second embodiment differs from the capacitor of the thirty-ninth embodiment only in part of the pressure regulating valve. Therefore, like components are labeled with like reference numerals with respect to the thirty-ninth embodiment and the description of these components is not repeated here. The following description is focused on the differences between these embodiments with reference to drawings.

FIG. 55A is an exploded sectional view of a pressure regulating valve used in a capacitor according to a forty-second embodiment of the present invention. FIG. 55B is a sectional view before assembly of the pressure regulating valve used in the capacitor according to the forty-second embodiment of the present invention. FIG. 55C is a plan view of an essential part excluding a cover of the capacitor according to the forty-second embodiment of the present invention. FIG. 55D is a sectional view after assembly of the pressure regulating valve used in the capacitor according to the forty-second embodiment of the present invention. FIG. 56A is a sectional view showing assembling of the capacitor according to the forty-second embodiment of the present invention. FIG. 56B is another sectional view showing assembling of the capacitor according to the forty-second embodiment of the present invention.

In FIGS. 55A to 55D, valve body 4714 is the square member made of the elastic material such as rubber. The pressure regulating valve further includes terminal plate 4722 having electrolyte filling hole 4722a, depression 4722b, and wall 4722. Depression 4722b is formed on hole 4722a and has valve body 4714 fitted therein. Wall 4722c has notches 4722d at its bottom.

In the capacitor of the present forty-second embodiment thus structured, wall 4722c of terminal plate 4722 is caulked onto cover 478 so as to hold valve body 4714 in the compressed state. During the caulking, as shown in FIG. 56A, cover 478 is pressed by using retainer plate 4723, which is biased by a spring. At the same time, the upper end of wall 4722c of terminal plate 4722 is caulked using processing jig 4724 while terminal plate 4722 is held upward using processing jig 4725 so as to be coupled with cover 478. This prevents terminal plate 4722 from being forcibly deformed.

Forty-Third Embodiment

The capacitor of a forty-third embodiment differs from the capacitor of the thirty-ninth embodiment only in part of the pressure regulating valve. Therefore, like components are labeled with like reference numerals with respect to the thirty-ninth embodiment and the description of these components is not repeated here. The following description is focused on the differences between these embodiments with reference to drawings.

FIG. 57A is an exploded sectional view of a pressure regulating valve used in a capacitor according to a forty-third embodiment of the present invention. FIG. 57B is a sectional view before assembly of the pressure regulating valve used in the capacitor according to the forty-third embodiment of the present invention. FIG. 57C is a plan view of an essential part excluding a cover of the capacitor according to the forty-third embodiment of the present invention. FIG. 57D is a sectional view after assembly of the pressure regulating valve used in the capacitor according to the forty-third embodiment of the present invention.

In FIGS. 57A to 57D, the pressure regulating valve includes cover 4726 having holes 4726a in its periphery and protrusion 4726b at the center of its bottom surface. Protrusion 4726b biases part of tapered portion 476a of valve body 476.

Terminal plate 4719 has electrolyte filling hole 4719a, depression 4719b, and wall 4719c. Depression 4719b is formed on hole 4719a and has valve body 476 fitted therein. Wall 4719c is provided with deformation inducing portion 4719d.

In the pressure regulating valve of the present forty-third embodiment thus structured, protrusion 4726b of cover 4726 is in contact with tapered portion 476a of valve body 476 and biases it. This makes it easier to position valve body 476, even when it is circular, than in the pressure regulating valve of the thirty-ninth embodiment and can maintain the operating pressure of valve body 6 stably by high dimensional accuracy.

Forty-Fourth Embodiment

The capacitor of a forty-fourth embodiment differs from the capacitor of the thirty-third embodiment only in part of the pressure regulating valve. Therefore, like components are labeled with like reference numerals with respect to the thirty-third embodiment and the description of these components is not repeated here. The following description is focused on the differences between these embodiments with reference to drawings.

FIG. 58A is an exploded sectional view of a pressure regulating valve used in a capacitor according to a forty-fourth embodiment of the present invention. FIG. 58B is a sectional view after assembly of the pressure regulating valve used in the capacitor according to the forty-fourth embodiment of the present invention. FIG. 25A is a plan view of a retainer plate used in the capacitor according to the forty-fourth embodiment of the present invention. FIG. 25B is a sectional view of the retainer plate used in the capacitor according to the forty-fourth embodiment of the present invention.

In FIGS. 58A, 58B, 25A and 25B, retainer plate 4540 is made of the rigid body. Retainer plate 4540 has the flat portion in contact with the upper surface of valve body 476, and the plurality of annular and strip-shaped engaging sections 4540a extending upwardly from the periphery of the flat portion.

Engaging sections 4540a have notches 4540b therebetween. Retainer plate 4540 is made of metal in the present embodiment, but alternatively can be made of resin.

In the pressure regulating valve of the forty-fourth embodiment thus structured, the assembly operation is performed easily and the operating pressure of the valve body is maintained stably by high dimensional accuracy.

Forty-Fifth Embodiment

FIG. 59A is an exploded sectional view of a pressure regulating valve used in a capacitor according to a forty-fifth embodiment of the present invention. FIG. 59B is a sectional view after assembly of the pressure regulating valve used in the capacitor according to the forty-fifth embodiment of the present invention.

In FIGS. 59A and 59B, the pressure regulating valve includes terminal plate 485 having electrolyte filling hole 485a and wall 485b annularly formed in the upper portion of the periphery of hole 485a. Wall 485b is provided at its upper end with engaging section 485c protruding inwardly. The pressure regulating valve further includes valve body 486, which is a cylindrical member made of an elastic material such as rubber. Valve body 486 is provided on its peripheral surface with engaging section 486a which is to be fitted into hole 485a of terminal plate 485. Valve body 486 also has flange 486b which is formed above engaging section 486a and tapered portion 486c which extends outwardly from the upper end of the inner peripheral surface of valve body 486. Valve body 486 is made of isoprene-isobutylene rubber (hereinafter, IIR) in the present forty-fifth embodiment, but alternatively can be made of ethylene-propylene terpolymer (hereinafter, EPT).

The pressure regulating valve further includes gas-permeable sheet 487, which is joined to tapered portion 486c so as to seal the hole of valve body 486. Gas-permeable sheet 487 has physical properties that allow the gas generated in the capacitor to pass through it but does not allow the driving electrolyte to pass through it.

The pressure regulating valve further includes cap 488, which is a roof-shaped member made of a rigid body. Cap 488 is provided at its bottom periphery with flange-like engaging section 488a and on its peripheral surface with holes 488b for communication with outside. Cap 488 is made of resin in the present forty-fifth embodiment, but alternatively can be made of metal.

In the pressure regulating valve of the present forty-fifth embodiment thus structured, gas-permeable sheet 487 is joined by, for example, bonding to tapered portion 486c of valve body 486 so as to seal the hole of cylindrical valve body 486. Then, valve body 486 and gas-permeable sheet 487 joined thereto are inserted into cap 488 so as to fit engaging section 486a of valve body 486 into hole 485a of terminal plate 485. At the same time, part of the bottom surface of engaging section 488a of cap 488 is pressure-welded to flange 486b of valve body 486 so as to hold valve body 486 in the compressed state. As a result, the pressure regulating valve is attached as shown in FIG. 59B.

In the pressure regulating valve of the present forty-fifth embodiment thus structured, gas-permeable sheet 487 and valve body 486 are joined to each other. This allows the gas generated in the capacitor to pass through gas-permeable sheet 487 and to be released to the outside through holes 488b of cap 488. Since gas-permeable sheet 487 does not allow the driving electrolyte to pass through it, the driving electrolyte is prevented from leaking by valve body 486. As a result, the capacitor can be highly reliable.

Forty-Sixth Embodiment

The capacitor of a forty-sixth embodiment differs from the capacitor of the forty-fifth embodiment only in part of the pressure regulating valve. Therefore, like components are labeled with like reference numerals with respect to the forty-fifth embodiment and the description of these components is not repeated here. The following description is focused on the differences between these embodiments with reference to drawings.

FIG. 60A is an exploded sectional view of a pressure regulating valve used in a capacitor according to a forty-sixth embodiment of the present invention. FIG. 60B is a sectional view after assembly of the pressure regulating valve used in the capacitor according to the forty-sixth embodiment of the present invention. FIG. 61A is a plan view showing assembling of the pressure regulating valve used in the capacitor according to the forty-sixth embodiment of the present invention. FIG. 61B is another plan view showing assembling of the pressure regulating valve used in the capacitor according to the forty-sixth embodiment of the present invention. FIG. 61C is another plan view showing assembling of the pressure regulating valve used in the capacitor according to the forty-sixth embodiment of the present invention. FIG. 61D is a sectional view of an essential part showing assembling of the pressure regulating valve used in the capacitor according to the forty-sixth embodiment of the present invention. FIG. 61E is another sectional view of the essential part showing assembling of the pressure regulating valve used in the capacitor according to the forty-sixth embodiment of the present invention.

In FIGS. 60A, 60B, and 61A to 61E, the pressure regulating valve includes cap 489, which is a roof-shaped member made of a rigid body. Cap 489 is provided on its bottom periphery with a pair of engaging sections 489a protruding outwardly from two points and holes 489b for communication with outside. The pressure regulating valve further includes valve body 4810, which is a cylindrical member made of an elastic material such as rubber. Valve body 4810 has engaging section 4810a on its peripheral surface and tapered portion 4810b extending outwardly from the upper end of its inner peripheral surface. Engaging section 4810a is to be fitted into hole 4811a of terminal plate 4811 described later. Valve body 4810 further has wall 4810c, which is annularly formed on the inner peripheral side of the bottom of tapered portion 4810b. Valve body 4810 is made of IIR in the present forty-sixth embodiment, but alternatively can be made of EPT.

Gas-permeable sheet 487 is joined to the upper surface of wall 4810c of valve body 4810 so as to seal the hole of valve body 4810.

Terminal plate 4811 has electrolyte filling hole 4811a and engaging sections 4811b, which are a pair of circular arcs formed in the upper portion of the periphery of hole 4811a. As shown in FIG. 561D, engaging sections 4811b are structured in such a manner that when cap 489 is rotated while being in close contact with terminal plate 4811, engaging sections 489a of cap 489 are slid and fitted thereinto. Terminal plate 4811 further has tapered portions 4811c, which are designed to be thinner in the height direction (the thickness direction of engaging sections 489a) as engaging sections 489a are slid deeper thereinto. Tapered portions 4811c are provided at their ends with fixing portions 4811d into which engaging sections 489a are fitted.

In the pressure regulating valve of the present forty-sixth embodiment thus structured, gas-permeable sheet 487 is joined by, for example, bonding to the wall 4810c of valve body 4810 so as to seal the hole of cylindrical valve body 4810. Then, valve body 4810 and gas-permeable sheet 487 joined thereto are fitted into hole 4811*a* of terminal plate 4811, and covered with cap 489 so that cap 489 can come into close contact with terminal plate 4811. Then, cap 489 is rotated to fit and engage engaging sections 489*a* of cap 489 with engaging sections 4811*b* of terminal plate 4811 so as to hold valve body 4810 in the compressed state. As a result, the pressure regulating valve is attached as shown in FIG. 60B.

In the pressure regulating valve of the present forty-sixth embodiment thus structured, gas-permeable sheet 487 and valve body 4810 are joined to each other. This allows the gas generated in the capacitor to pass through gas-permeable sheet 487 and to be released to the outside through holes 489*b* of cap 489. Since gas-permeable sheet 487 does not allow the driving electrolyte to pass through it, the driving electrolyte is prevented from leaking by valve body 4810. As a result, not only the capacitor can be highly reliable, but also the coupling between cap 489 and terminal plate 4811 can be greatly facilitated.

Forty-Seventh Embodiment

FIG. 62A is an exploded sectional view of a pressure regulating valve used in a capacitor according to a forty-seventh embodiment of the present invention. FIG. 62B is a sectional view before assembly of the pressure regulating valve used in the capacitor according to the forty-seventh embodiment of the present invention. FIG. 62C is a sectional view after assembly of the pressure regulating valve used in the capacitor according to the forty-seventh embodiment of the present invention.

In FIGS. 62A to 62C, the pressure regulating valve includes terminal plate 495 having electrolyte filling hole 495*a*. The pressure regulating valve further includes elastic member 496, which is a bottomed cylindrical member made of an elastic material such as rubber. Elastic member 496 is provided on its peripheral surface with engaging section 496*a* to be fitted into hole 495*a* of terminal plate 495 and on the bottom-side peripheral surface with holes 496*b* for communication with outside. Elastic member 496 is made of ethylene-propylene terpolymer (hereinafter, EPT) in the present forty-seventh embodiment. The pressure regulating valve includes gas-permeable sheet 497, which is a ring-shaped sheet sealedly joined to holes 496*a* formed in the bottom-side peripheral surface of elastic member 496. Gas-permeable sheet 497 has physical properties that allow the gas generated in the capacitor to pass through it but does not allow the driving electrolyte to pass through it.

The pressure regulating valve further includes valve body 498, which is a ring-shaped member made of an elastic material such as rubber and in close contact with the outer surface of gas-permeable sheet 497. Valve body 498 is made of isoprene-isobutylene rubber (hereinafter, IIR) in the present forty-seventh embodiment, but alternatively can be made of EPT.

In the pressure regulating valve of the present forty-seventh embodiment thus structured, ring-shaped gas-permeable sheet 497 is joined by, for example, bonding to the hole formed in the peripheral surface on the bottom surface side of bottomed cylindrical elastic member 496 so as to seal the hole. Then, gas-permeable sheet 497 and ring-shaped valve body 498 in close contact with its outer surface are pressed into hole 495*a* of terminal plate 495. At the same time, engaging section 496*a* of elastic member 496 are fitted into hole 495*a* of terminal plate 495 so as to hold valve body 498 in the compressed state. As a result, the pressure regulating valve is attached as shown in FIG. 62C.

In the pressure regulating valve of the present forty-seventh embodiment thus structured, elastic member 496 and gas-permeable sheet 497 are joined to each other. This allows the gas generated in the capacitor to pass through gas-permeable sheet 497 and to be released to the outside through the boundaries between gas-permeable sheet 497 and valve body 498. Since gas-permeable sheet 497 does not allow the driving electrolyte to pass through it, the driving electrolyte is prevented from leaking by elastic member 496. As a result, the capacitor can be highly reliable.

Forty-Eighth Embodiment

The capacitor of a forty-eighth embodiment differs from the capacitor of the forty-seventh embodiment only in part of the pressure regulating valve. Therefore, like components are labeled with like reference numerals with respect to the forty-seventh embodiment and the description of these components is not repeated here. The following description is focused on the differences between these embodiments with reference to drawings.

FIG. 63A is an exploded sectional view of a pressure regulating valve used in a capacitor according to a forty-eighth embodiment of the present invention. FIG. 63B is a sectional view before assembly of the pressure regulating valve used in the capacitor according to the forty-eighth embodiment of the present invention. FIG. 63C is a sectional view after assembly of the pressure regulating valve used in the capacitor according to the forty-eighth embodiment of the present invention.

In FIGS. 63A to 63C, the pressure regulating valve includes bottomed cylindrical metal member 499 having holes 499*a* for communication with outside. Gas-permeable sheet 497 is the ring-shaped sheet sealedly joined to holes 499*a* formed in the peripheral surface on the bottom surface side of metal member 499.

The pressure regulating valve further includes valve body 4910, which is a ring-shaped member made of an elastic material such as rubber and in close contact with the outer surface of metal member 499 including gas-permeable sheet 497. Valve body 4910 has flange 4910*a* on its peripheral surface and locking section 4910*b*, which is in contact with the open end of metal member 499. Valve body 4910 is made of isoprene-isobutylene rubber (hereinafter, IIR) in the present forty-eighth embodiment, but alternatively can be made of EPT.

In the pressure regulating valve of the present forty-eighth embodiment thus structured, ring-shaped gas-permeable sheet 497 is sealedly joined to holes 499*a* formed in the peripheral surface on the bottom surface side of bottomed cylindrical metal member 499. Then, cylindrical valve body 4910 is brought into close contact with the outer surface of metal member 499 including gas-permeable sheet 497. This is pressed and fitted into hole 495*a* of terminal plate 495 so as to hold valve body 4910 in the compressed state. As a result, the pressure regulating valve is attached as shown in FIG. 63C.

In the pressure regulating valve of the present forty-eighth embodiment thus structured, valve body 4910 is sandwiched between terminal plate 495 made of the rigid body and metal member 499. This maintains the operating pressure of valve body 4910 more stably.

Forty-Ninth Embodiment

FIG. 64A is a plan view of a pressure regulating valve used in a capacitor according to a forty-ninth embodiment of the present invention. FIG. 64B is a sectional view after assembly of the pressure regulating valve used in the capacitor according to the forty-ninth embodiment of the present invention.

In FIGS. 64A and 64B, the pressure regulating valve includes terminal plate 505 having electrolyte filling hole 505a and depression 505b, which is formed on the bottom side of hole 505a. The pressure regulating valve further includes valve body 506 made of an elastic material such as rubber. Valve body 506 is provided on its peripheral surface with engaging section 506a into which a part of terminal plate 505 is fitted. Engaging section 506a has locking section 506b at its upper end and locking section 506c at its lower end which are pressure-welded to the upper surface and lower surface, respectively, of the periphery of hole 505a of terminal plate 505. Valve body 506 further has slit 506d extending in the up and down direction at its center, and recess 506e on the bottom side of slit 506d. Valve body 506 is made of isoprene-isobutylene rubber (hereinafter, IIR) in the present forty-ninth embodiment, but alternatively can be made of EPT.

The pressure regulating valve further includes elastic member 507 made of an elastic material such as rubber. Elastic member 507 is joined to the peripheral surfaces of engaging section 506a and locking section 506c on the bottom side of valve body 506 so as to cover the peripheral surfaces. Elastic member 507 is made of ethylene-propylene terpolymer (hereinafter, EPT) in the present forty-ninth embodiment.

The pressure regulating valve further includes gas-permeable sheet 508, which is joined to the bottom surface of elastic member 507 so as to seal slit 506d of valve body 506. Gas-permeable sheet 508 has physical properties that allow the gas generated in the capacitor to pass through it but does not allow the driving electrolyte to pass through it.

In the pressure regulating valve of the present forty-ninth embodiment thus structured, elastic member 507 is joined to the peripheral surfaces of engaging section 506a and locking section 506c on the bottom side of valve body 506 so as to cover the peripheral surfaces. Valve body 506 and elastic member 507 having gas-permeable sheet 508 joined, for example, by bonding, to its bottom surface in order to seal slit 506d are pressed into hole 505a of terminal plate 505 so as to hold valve body 506 in the compressed state. As a result, the pressure regulating valve is attached as shown in FIG. 64B.

In the pressure regulating valve of the present forty-ninth embodiment thus structured, the bottom surface of elastic member 507 and gas-permeable sheet 508 are joined to each other. This allows the gas generated in the capacitor to pass through gas-permeable sheet 508 and then to pass through slit 506d via recess 506e formed in valve body 506 so as to be released to the outside. Since gas-permeable sheet 508 does not allow the driving electrolyte to pass through it, the driving electrolyte is prevented from leaking by elastic member 507. As a result, the capacitor can be highly reliable.

Valve body 506 and elastic member 507 could be integrated together in order to simplify the pressure regulating valve of the present forty-ninth embodiment. However, this decreases the adhesive bonding strength between valve body 506 made of IIR and gas-permeable sheet 508, thereby easily causing variations in the operating pressure of valve body 506.

Depression 505b formed on the bottom side of hole 505a of terminal plate 505 is not an essential element, but contributes to the thickness reduction of the capacitor by accommodating locking section 506c formed on the bottom side of valve body 506 therein.

FIG. 65A is a plan view of a pressure regulating valve used in another capacitor according to the forty-ninth embodiment of the present invention. FIG. 65B is a sectional view after assembly of the pressure regulating valve used in the another capacitor according to the forty-ninth embodiment of the present invention.

Valve body 506 is rectangular in the present forty-ninth embodiment, but alternatively can be circular as shown in FIG. 65A.

INDUSTRIAL APPLICABILITY

The capacitor of the present invention is free from leakage of a driving electrolyte and reliable enough to be used in automobiles which require particularly high reliability.

The invention claimed is:

1. A capacitor comprising:
   a capacitor element having a pair of positive and negative electrodes, the pair of positive and negative electrodes being disposed in opposite directions and wound together with a separator interposed therebetween, the pair of positive and negative electrodes being each composed of a current collector made of metal foil and a polarizable electrode layer formed thereon;
   a bottomed cylindrical metal case accommodating the capacitor element together with a driving electrolyte, the metal case being joined to one of the pair of positive and negative electrodes at an inner bottom surface thereof; and
   a terminal plate joined to the other of the pair of positive and negative electrodes at an inner surface thereof so as to seal an opening of the metal case,
   the terminal plate being provided with a pressure regulating valve functioning also as a driving-electrolyte filling hole, wherein
   the pressure regulating valve comprises:
   a ring-shaped elastic member;
   a gas-permeable sheet sealedly joined to the upper surface of the elastic member;
   a rubber valve body disposed on the gas-permeable sheet; and
   a cap for holding the valve body in a compressed state, the elastic member being pressed into an annular wall formed in an upper portion of a periphery of the hole of the terminal plate.

2. The capacitor of claim 1, wherein
   the cap is provided on a peripheral surface thereof with a hole for communication with outside.

3. The capacitor of claim 1, further comprising: a valve support member between the ring-shaped elastic member and the gas-permeable sheet.

4. The capacitor of claim 1, wherein
   the pressure regulating valve comprises:
   a roof-shaped valve compression member having a hole at a center of an upper surface thereof and a screw portion on a peripheral surface thereof;
   the gas-permeable sheet sealedly joined to the hole of the valve compression member;
   the rubber valve body disposed on the gas-permeable sheet; and
   the cap having, on a peripheral surface thereof, a screw portion to be screwed with the screw portion of the valve compression member and a hole for communication with outside so as to hold the valve body in the compressed state, the valve compression member being pressed into the annular wall formed in the upper portion of the periphery of the hole of the terminal plate with the ring-shaped elastic member interposed therebetween.

5. The capacitor of claim 1, wherein
the pressure regulating valve comprises:
a cylindrical valve holding member having a flange at one end thereof;
the gas-permeable sheet joined to and disposed on the flange of the valve holding member;
the rubber valve body disposed on the gas-permeable sheet; and
the cap provided on a peripheral surface thereof with a hole for communication with outside, the cap being coupled to the valve body to accommodate the valve body so as to hold the valve body in the compressed state,
a cylindrical portion of the valve holding member being pressed into the hole of the terminal plate with the elastic member of cylindrical shape interposed therebetween.

6. The capacitor of claim 1, wherein
the pressure regulating valve comprises:
the cylindrical elastic member provided at one end thereof with a flange and at an other end thereof with an engaging section protruding outwardly;
the gas-permeable sheet joined to and disposed on the flange of the elastic member;
the rubber valve body disposed on the gas-permeable sheet; and
the cap provided on a peripheral surface thereof with a hole for communication with outside, the cap being coupled to the valve body to accommodate the valve body so as to hold the valve body in the compressed state,
a cylindrical portion of the elastic member including the engaging section being pressed into the hole of the terminal plate with a rubber O-ring interposed therebetween.

7. The capacitor of claim 6, further comprising:
a valve support member between the flange of the cylindrical elastic member and the gas-permeable sheet.

8. The capacitor of claim 1, wherein
the pressure regulating valve comprises:
the cylindrical elastic member provided at one end thereof with a flange and at an other end thereof with an engaging section protruding outwardly;
the gas-permeable sheet joined to and disposed on the flange of the elastic member;
the rubber valve body disposed on the gas-permeable sheet; and
a cover disposed on the valve body, the cover having one of a hole and a notch on a periphery thereof,
a cylindrical portion of the elastic member including the engaging section being pressed into the hole of the terminal plate, and
the annular wall formed in the upper portion of the periphery of the hole of the terminal plate being caulked to the cover so as to hold the valve body in the compressed state.

9. The capacitor of claim 8, wherein
the cover and the terminal plate are coupled to each other by providing the annular wall formed in the upper portion of the periphery of the hole of the terminal plate with an engaging section protruding outwardly or inwardly from an upper end thereof; by providing the cover with a hole allowing the engaging section to be fitted therein; and by fitting the hole of the cover into the engaging section of the terminal plate.

10. The capacitor of claim 9, wherein
the valve body is square-shaped, and
the terminal plate is provided with a depression allowing each corner of the valve body to be closely fitted therein.

11. The capacitor of claim 1, wherein
the pressure regulating valve comprises:
the cylindrical elastic member provided at one end thereof with a flange and at an other end thereof with an engaging section protruding outwardly;
the gas-permeable sheet joined to and disposed on the flange of the elastic member;
the rubber valve body disposed on the gas-permeable sheet; and
the roof-shaped cap having an engaging section protruding outwardly from a bottom periphery thereof,
a cylindrical portion of the elastic member including the engaging section being pressed into the hole of the terminal plate and
the engaging section of the cap being engaged and coupled to the annular wall formed in the upper portion of the periphery of the hole of the terminal plate and to an engaging section protruding inwardly from the upper end of the wall so as to hold the valve body in the compressed state.

12. The capacitor of claim 11, wherein
the flange of the elastic member has a larger outer diameter than the valve body.

13. The capacitor of claim 11, wherein
the cap and the terminal plate are coupled to each other by providing the annular wall formed in the upper portion of the periphery of the hole of the terminal plate with an engaging section protruding outwardly from an upper end thereof; and by providing the cap with a hole on the peripheral surface thereof, the hole allowing the engaging section to be fitted therein; and by fitting the engaging section of the terminal plate into the hole of the cap.

14. The capacitor of claim 11, wherein
the cap and the terminal plate are coupled to each other by providing the wall formed in the upper portion of the periphery of the hole of the terminal plate with a hole and by fitting the engaging section of the cap into the hole provided to the wall.

15. The capacitor of claim 14, wherein
the valve body is square-shaped, and
the terminal plate is provided with a depression allowing each corner of the valve body to be closely fitted therein.

16. The capacitor of claim 11, wherein
the cap and the terminal plate are coupled to each other by providing the cap with engaging sections protruding outwardly from two points of a bottom periphery of thereof; by providing the terminal plate with engaging sections; and by fitting the engaging sections of the cap into the engaging sections of the terminal plate when the cap is rotated while being in close contact with the terminal plate so as to clamp the engaging sections of the cap in a thickness direction.

17. The capacitor of claim 1, wherein
the pressure regulating valve comprises:
the cylindrical elastic member provided at one end thereof with a flange and at an other end thereof with an engaging section protruding outwardly;
the gas-permeable sheet joined to and disposed on the flange of the elastic member;
the rubber valve body disposed on the gas-permeable sheet; and a retainer plate having a flat portion in contact with an upper surface of the valve body and a plurality of annular engaging sections extending upwardly from a periphery of the flat portion, a cylindrical portion of the elastic member including the engaging section being pressed into the hole of the terminal plate; and the engaging section of the retainer plate being engaged and coupled to the annular wall formed in the upper portion of the periphery of the hole of the terminal plate and to the engaging section protruding inwardly from the upper end of the wall so as to hold the valve body in the compressed state.

18. The capacitor of claim 1, wherein
the pressure regulating valve comprises:
the ring-shaped elastic member;
the gas-permeable sheet sealedly joined to the upper surface of the elastic member;
the rubber valve body disposed on the gas-permeable sheet, the valve body being ring-shaped and having a tapered portion extending from an upper end of an inner peripheral surface toward an outer peripheral surface of the valve body; and
the cap for holding the valve body in the compressed state,
the elastic member being pressed into the annular wall formed in the upper portion of the periphery of the hole of the terminal plate.

19. The capacitor of claim 18, further comprising:
a valve support member disposed between the ring-shaped elastic member and the gas-permeable sheet.

20. The capacitor of claim 18, wherein
the pressure regulating valve comprises:
a roof-shaped valve compression member having a hole at a center of an upper surface thereof and a screw portion on a peripheral surface thereof;
the gas-permeable sheet sealedly joined to the hole of the valve compression member;
the rubber disposed on the gas-permeable sheet, the valve body being ring-shaped and having the tapered portion extending from an upper end of an inner peripheral surface toward an outer peripheral surface of the valve body; and
the cap having, on a peripheral surface thereof, a screw portion to be screwed with the screw portion of the valve compression member and a hole for communication with outside so as to hold the valve body in the compressed state,
the valve compression member being pressed into the annular wall formed in the upper portion of the periphery of the hole of the terminal plate with the ring-shaped elastic member interposed therebetween.

21. The capacitor of claim 18, wherein
the pressure regulating valve comprises:
a cylindrical valve holding member having a flange at one end thereof;
the gas-permeable sheet joined to and disposed on the flange of the valve holding member;
the rubber valve body disposed on the gas-permeable sheet, the valve body being ring-shaped and having the tapered portion extending from an upper end of an inner peripheral surface toward an outer peripheral surface of the valve body; and
the cap provided on a peripheral surface thereof with a hole for communication with outside, the cap being coupled to the valve body to accommodate the valve body so as to hold the valve body in the compressed state,
a cylindrical portion of the valve holding member being pressed into the hole of the terminal plate with the cylindrical elastic member interposed therebetween.

22. The capacitor of claim 18, wherein
the pressure regulating valve comprises:
the cylindrical elastic member provided at one end thereof with a flange and at an other end thereof with an engaging section protruding outwardly;
the gas-permeable sheet joined to and disposed on the flange of the elastic member;
the rubber valve body disposed on the gas-permeable sheet, the valve body being ring-shaped and having the tapered portion extending from an upper end of an inner peripheral surface toward an outer peripheral surface of the valve body; and
the cap provided on a peripheral surface thereof with a hole for communication with outside, the cap being coupled to the valve body to accommodate the valve body so as to hold the valve body in the compressed state,
a cylindrical portion of the elastic member including the engaging section being pressed into the hole of the terminal plate with a rubber O-ring interposed therebetween.

23. The capacitor of claim 22, further comprising:
a valve support member between the flange of the cylindrical elastic member and the valve body.

24. The capacitor of claim 18, wherein
the pressure regulating valve comprises:
the cylindrical elastic member provided at one end thereof with a flange and at an other end thereof with an engaging section protruding outwardly;
the gas-permeable sheet joined to and disposed on the flange of the elastic member;
the rubber valve body disposed on the gas-permeable sheet, the valve body being ring-shaped and having the tapered portion extending from an upper end of an inner peripheral surface toward an outer peripheral surface of the valve body; and
a cover disposed on the valve body, the cover having a hole in a periphery thereof,
a cylindrical portion of the elastic member including the engaging section being pressed into the hole of the terminal plate, and
the engaging section protruding outwardly or inwardly from the upper end of the annular wall formed in the upper portion of the periphery of the hole of the terminal plate being fitted into the hole of the cover so as to hold the valve body in the compressed state.

25. The capacitor of claim 24, wherein
the terminal plate is provided with a depression allowing the valve body to be fitted therein.

26. The capacitor of claim 25, wherein
the valve body is square-shaped, and
the depression allows each corner of the valve body to be closely fitted therein.

27. The capacitor of claim 25, wherein
the cover is provided at a center of a bottom surface thereof with a protrusion for biasing part of the tapered portion of the valve body.

28. The capacitor of claim 25, wherein
the terminal plate has a notch at a bottom of the wall thereof.

29. The capacitor of claim 18, wherein
the pressure regulating valve comprises:
the cylindrical elastic member provided at one end thereof with a flange and at an other end thereof with an engaging section protruding outwardly;

the gas-permeable sheet joined to and disposed on the flange of the elastic member;

the rubber valve body disposed on the gas-permeable sheet, the valve body being ring-shaped and having the tapered portion extending from an upper end of an inner peripheral surface toward an outer peripheral surface of the valve body; and the roof-shaped cap having an engaging section protruding outwardly from a bottom periphery thereof, a cylindrical portion of the elastic member including the engaging section being pressed into the hole of the terminal plate and the engaging section of the cap being engaged and coupled to the annular wall formed in the upper portion of the periphery of the hole of the terminal plate and to an engaging section protruding inwardly from the upper end of the wall so as to hold the valve body in the compressed state.

30. The capacitor of claim 29, wherein the cap and the terminal plate are coupled to each other by providing the annular wall formed in the upper portion of the periphery of the hole of the terminal plate with an engaging section protruding outwardly from an upper end thereof; and by providing the cap with a hole on a peripheral surface thereof, the hole allowing the engaging section to be fitted therein; and by fitting the engaging section of the terminal plate into the hole of the cap.

31. The capacitor of claim 29, wherein the cap and the terminal plate are coupled to each other by providing the wall formed in the upper portion of the periphery of the hole of the terminal plate with a hole and by fitting the engaging section of the cap into the hole provided to the wall.

32. The capacitor of claim 18, wherein the pressure regulating valve comprises:

the cylindrical elastic member provided at one end thereof with a flange and at an other end thereof with an engaging section protruding outwardly;

the gas-permeable sheet joined to and disposed on the flange of the elastic member;

the rubber valve body disposed on the gas-permeable sheet, the valve body being ring-shaped and having the tapered portion extending from an upper end of an inner peripheral surface toward an outer peripheral surface of the valve body; and a retainer plate having a flat portion in contact with an upper surface of the valve body and a plurality of annular engaging sections extending upwardly from a periphery of the flat portion, a cylindrical portion of the elastic member including the engaging section being pressed into the hole of the terminal plate; and the engaging section of the retainer plate being engaged and coupled to the annular wall formed in the upper portion of the periphery of the hole of the terminal plate and to the engaging section formed on an inner peripheral surface of the wall so as to hold the valve body in the compressed state.

33. The capacitor of claim 1, wherein the pressure regulating valve comprises:

the gas-permeable sheet;

the rubber valve body disposed on the gas-permeable sheet, the valve body being ring-shaped and having a tapered portion extending from an upper end of an inner peripheral surface toward an outer peripheral surface of the valve body; and a cover disposed on the valve body, the gas-permeable sheet, the valve body, and the cover being disposed to seal the driving-electrolyte filling hole of the terminal plate, and the annular wall formed in the upper portion of the periphery of the hole of the terminal plate being caulked so as to hold the valve body in the compressed state.

34. The capacitor of claim 33, wherein the cover and the terminal plate are coupled to each other by providing the cover with a hole on a periphery thereof; by providing the terminal plate with an engaging section protruding outwardly or inwardly from an upper end of the wall thereof; and by fitting the engaging section of the terminal plate into the engaging section of the cover.

35. The capacitor of claim 33, wherein the cover is replaced by a roof-shaped cap having a flange-like engaging section at a bottom periphery thereof; and the terminal plate is provided at an upper end of the wall thereof with an engaging section protruding inwardly so as to fit the engaging section of the cap into the engaging section of the terminal plate.

36. The capacitor of claim 35, wherein the cap and the terminal plate are coupled to each other by providing the terminal plate with a hole in the wall thereof; and by fitting the engaging section of the cap into the hole provided in the wall.

37. The capacitor of claim 35, wherein the cap and the terminal plate are coupled to each other by providing the cap with engaging sections protruding outwardly from two points of a bottom periphery of thereof; by providing the terminal plate with engaging sections; and by fitting the engaging sections of the cap into the engaging sections of the terminal plate when the cap is rotated while being in close contact with the terminal plate so as to clamp the engaging sections of the cap in a thickness direction.

38. The capacitor of claim 33, wherein the terminal plate is provided with a depression allowing the valve body to be fitted therein.

39. The capacitor of claim 38, wherein the valve body is square-shaped, and the depression allows each corner of the valve body to be closely fitted therein.

40. The capacitor of claim 39, wherein the terminal plate is provided on the peripheral surface of the wall thereof with a deformation inducing portion used for caulking.

41. The capacitor of claim 39, wherein the cap and the terminal plate are coupled to each other by providing a pair of walls in the upper portion of the periphery of the hole of the terminal plate, each of the pair of walls having an engaging section protruding outwardly from an end thereof; by providing the cap with a hole on a peripheral surface thereof, the hole allowing the engaging section to be fitted therein; and by fitting the engaging section of the terminal plate into the hole of the cap.

42. The capacitor of claim 39, wherein the terminal plate has a notch at a bottom of the wall thereof.

43. The capacitor of claim 39, wherein the cover is provided at a center of a bottom surface thereof with a protrusion for biasing part of the tapered portion of the valve body.

44. The capacitor of claim 33, wherein the pressure regulating valve comprises:

the gas-permeable sheet;

the rubber valve body disposed on the gas-permeable sheet, the valve body being ring-shaped and having the tapered portion extending from an upper end of an inner peripheral surface toward an outer peripheral surface of the valve body; and a retainer plate having a flat portion in contact with an upper surface of the valve body and a plurality of annular engaging sections extending upwardly from a periphery of the flat portion;

the gas-permeable sheet, the valve body, and the retainer plate being disposed to seal the driving-electrolyte filling hole of the terminal plate, and the engaging section of the retainer plate being engaged and coupled to the annular wall formed in the upper portion of the periphery of the hole of the terminal plate and to the engaging section formed on the inner peripheral surface of the wall so as to hold the valve body in the compressed state.

45. The capacitor of claim 1, wherein
the pressure regulating valve comprises:
the rubber cylindrical valve body provided on a periphery thereof with an engaging section to be fitted into the hole of the terminal plate, the engaging section having a flange-like upper portion and a tapered portion extending from an upper end of an inner peripheral surface toward an outer peripheral surface of the valve body;

the gas-permeable sheet joined to the tapered portion of the valve body so as to seal a hole of the valve body; and the roof-shaped cap disposed on the valve body, the cap being provided at a bottom thereof with a flange-like engaging section, part of a bottom surface of the flange-like engaging section being in close contact with a flange formed in the upper portion of the engaging section of the valve body, the engaging section of the cap being fitted into an engaging section protruding inwardly from an upper end of the annular wall formed in the upper portion of the periphery of the hole of the terminal plate so as to hold the valve body in the compressed state, the gas-permeable sheet being joined to the valve body.

46. The capacitor of claim 45, wherein
the pressure regulating valve comprises:
the rubber cylindrical valve body provided on a periphery thereof with an engaging section to be fitted into the hole of the terminal plate and a tapered portion extending from an upper end of an inner peripheral surface toward an outer peripheral surface of the valve body, the tapered portion having an annular wall on the inner side of the bottom thereof;

the gas-permeable sheet joined to the upper surface of the wall so as to seal the hole of the valve body; and the roof-shaped cap disposed on the valve body, the cap being provided at a bottom periphery thereof with engaging sections protruding outwardly from at least two points, the cap being rotated while being in close contact with the terminal plate so that the engaging sections of the cap can be clamped in a thickness direction and fitted into engaging sections of the terminal plate so as to hold the valve body in the compressed state, the gas-permeable sheet being joined to the valve body.

47. The capacitor of claim 1, wherein
the pressure regulating valve comprises:
the bottomed cylindrical rubber elastic member provided on an opening-side peripheral surface thereof with an engaging section to be fitted into the hole of the terminal plate, the elastic member being provided on a bottom-side peripheral surface with a hole for communication with outside;

the ring-shaped gas-permeable sheet in close contact with the bottom-side peripheral surface of the elastic member so as to seal the hole of the elastic member; and the ring-shaped rubber valve body in close contact with the outer surface of the gas-permeable sheet.

48. The capacitor of claim 47, wherein
the pressure regulating valve comprises:
a bottomed cylindrical metal member provided on a peripheral surface with a hole for communication with outside;

the ring-shaped gas-permeable sheet in close contact with the peripheral surface of the metal member so as to seal the hole of the metal member; and the ring-shaped rubber valve body in close contact with the outer surface of the gas-permeable sheet and pressed into the hole of the terminal plate, the valve body having a flange in contact with an upper surface of the hole of the terminal plate.

49. The capacitor of claim 1, wherein
the pressure regulating valve comprises:
the rubber valve body provided on a peripheral surface thereof with an engaging section to be fitted into the hole of the terminal plate, the engaging section having a locking section at an upper end thereof and a locking section at a lower end thereof, the locking sections being pressure-welded to the upper surface and lower surface, respectively, of the terminal plate, the valve body further having a slit extending in an up and down direction at a center thereof and a recess on a bottom side of the slit; and the gas-permeable sheet joined to a bottom surface of the valve body so as to seal the slit of the valve body, the valve body being pressed into the hole of the terminal plate so as to dispose the valve body in the compressed state.

50. The capacitor of claim 49, wherein
the rubber elastic member is joined to a peripheral surface of the engaging section and to a peripheral surface of the locking section on a bottom side of the valve body so as to cover the peripheral surfaces; and the gas-permeable sheet is joined to a bottom surface of the elastic member.

51. The capacitor of claim 50, wherein
the valve body is made of isoprene-isobutylene rubber, and the elastic member is made of ethylene-propylene terpolymer.

52. The capacitor of claim 49, wherein
the terminal plate has a depression on a bottom side of the electrolyte filling hole thereof, the depression allowing the locking section at the lower end of the valve body to be fitted therein.

\* \* \* \* \*